(12) United States Patent
Asai

(10) Patent No.: US 6,829,681 B1
(45) Date of Patent: Dec. 7, 2004

(54) CACHE SYSTEM WHICH PERFORMS CACHE FLASH UPON EMERGENCY AND DUAL SYSTEM

(75) Inventor: Masao Asai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 716 days.

(21) Appl. No.: 09/589,390

(22) Filed: Jun. 7, 2000

(30) Foreign Application Priority Data

Sep. 24, 1999 (JP) .......................................... 11-270363

(51) Int. Cl.[7] .............................................. G06F 12/00
(52) U.S. Cl. ..................................... 711/143; 711/144
(58) Field of Search ........................ 711/143–145, 154, 711/156

(56) References Cited

U.S. PATENT DOCUMENTS 5,522,058 A * 5/1996 Iwasa et al. ................ 711/121
5,696,937 A * 12/1997 White et al. ................. 710/57

FOREIGN PATENT DOCUMENTS

| JP | 64-88676 | 4/1989 |
|---|---|---|
| JP | 6-67979 | 3/1994 |

* cited by examiner

Primary Examiner—Matthew D. Anderson
(74) Attorney, Agent, or Firm—Katten Muchin Zavis Rosenman

(57) ABSTRACT

A dual system includes a 0-subsystem and a 1-subsystem, each of which in turn includes a first bus, a second bus, a main memory having a memory section reading from and writing into which is performed over the first bus, a cache memory, a processor for outputting a first command for instruction to write back data of the cache memory into the main memory, a cache memory control section having a first reset terminal, through which an element thereof takes part in control of the first bus, for performing write back processing of data of the cache memory into the main memory based on the first command, and a system control section for controlling system changeover between an act system and a standby system over the system confounding line.

25 Claims, 63 Drawing Sheets

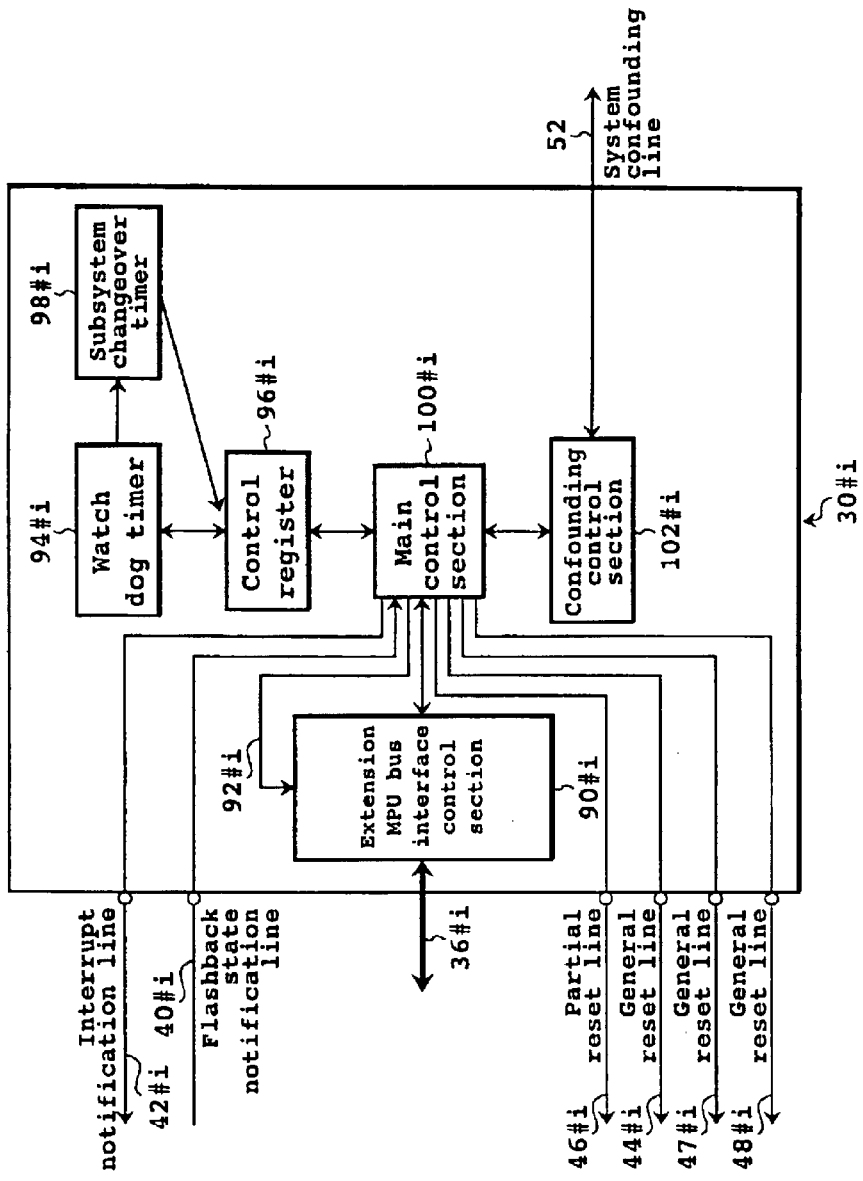
F I G. 5

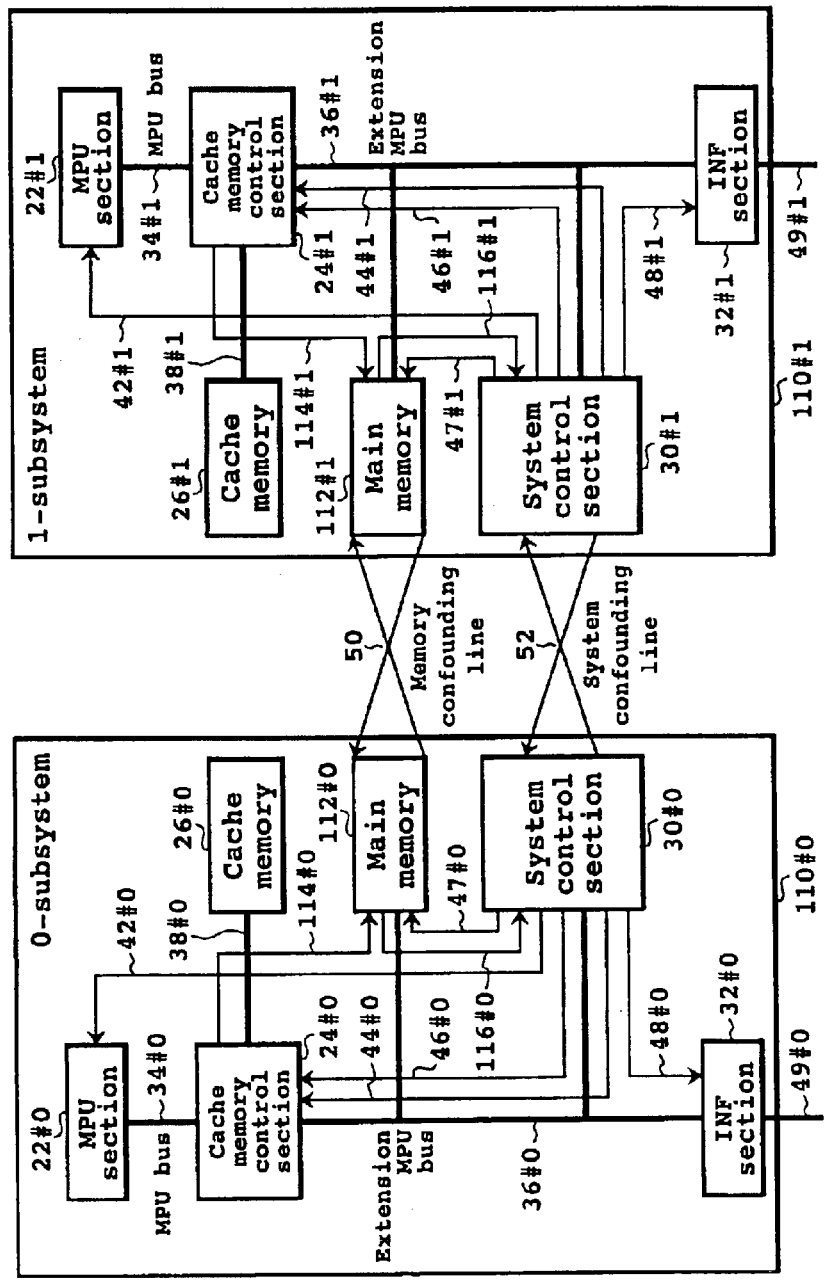
F I G. 11

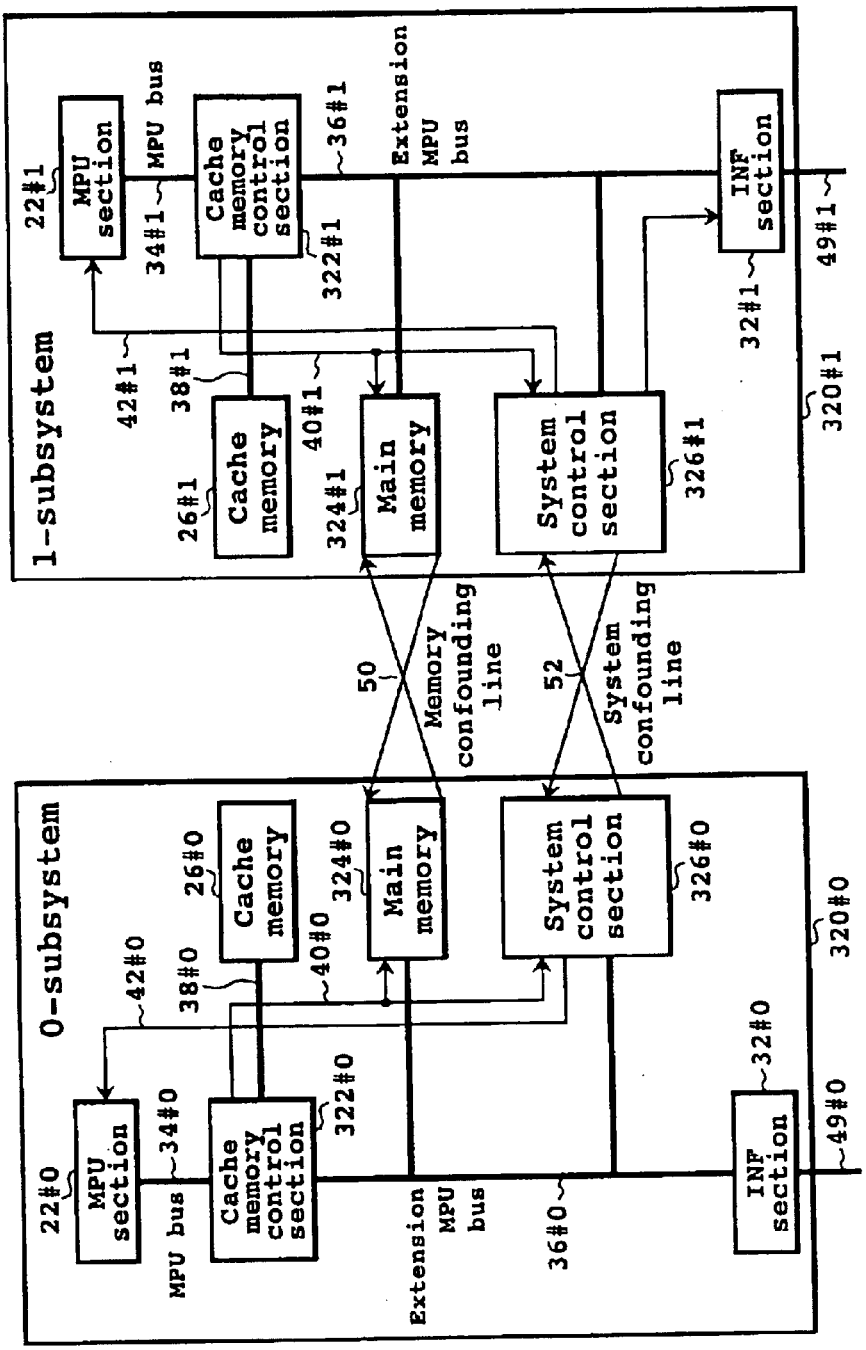
F I G. 45

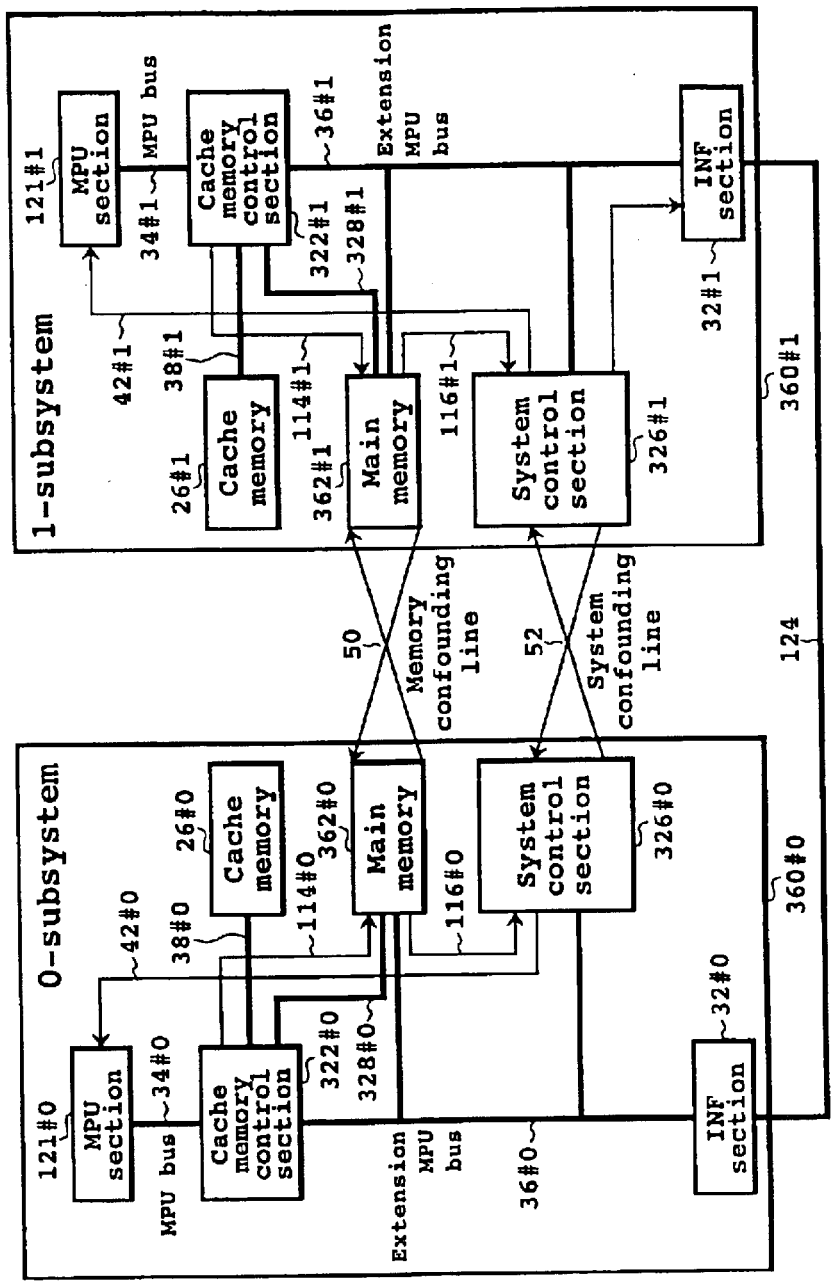
F I G. 52

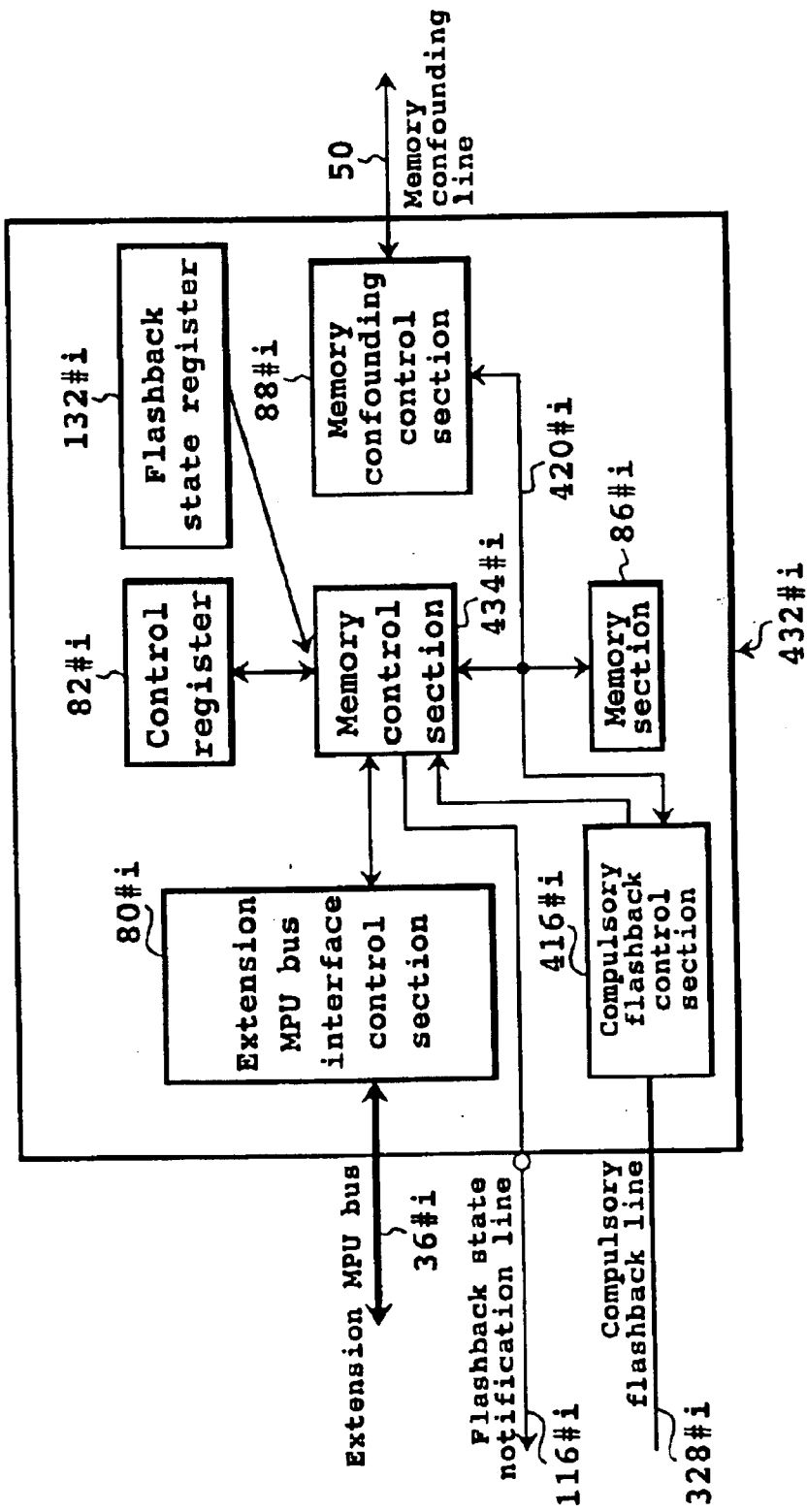

CACHE SYSTEM WHICH PERFORMS CACHE FLASH UPON EMERGENCY AND DUAL SYSTEM

BACKGROUND OF THE INVENTION

1. Field of the Invention

This invention relates to cache flash upon emergency of a cache system which has a cache memory and a dual system having a redundancy structure including a 0-subsystem and a 1-subsystem.

2. Description of the Related Art

A communications system or a like system has a dual structure including a 0-subsystem and a 1-subsystem in order to secure the reliability of services. Each of the 0- and 1-subsystems includes a microprocessor (MPU), a cache memory control section, a cache memory, a main memory, a system control section, and an interface (INF) section. The MPU and the cache memory control section are interconnected by an MPU bus. The cache memory control section, main memory, system control section and INF section are interconnected by an extension MPU bus. The main memories of the 0- and 1-subsystems are interconnected by a memory confounding line. The system control sections of the 0- and 1-subsystems are interconnected by a system confounding line. A cache memory is popularly used as a technique for augmentation of the processing performance and is used to send necessary data rapidly to an MPU. Generally, the difference between the working speed of an MPU and the working speed of a main memory is considerably great, and in the case of MPU working speed >>main memory working speed, in order to absorb the great working speed difference to allow high speed operation, a storage device of a small capacity called cache memory is D interposed between the main memory and the MPU so that data requested by the MPU may be sent back at a high speed from the cache memory.

When the MPU tries to read data at the A address from the main memory, it issues a read command to the MPU bus. The cache memory control section receives the read command and checks whether or not contents of the A address are registered in the cache memory. If the contents are registered (cache hit), then the cache memory control section reads the data at the A address from the cache memory and sends the data back to the MPU. If the contents of the A address are not registered (cache mishit), then the cache memory control section issues a data read command for reading an amount of data including data at the A address from the main memory to the extension MPU bus. The main memory receives the data read command and sends back the data of the pertaining area of the memory. The cache memory control section receives all of the data sent back thereto and returns only the data at the A address from within the received data to the MPU and besides writes all of the received data into the cache memory. It is assumed that the MPU issues a write command to write the data into the B address. The cache memory control section receives the write command and checks whether or not contents at the B address are registered in the cache memory. If the contents are registered, then the cache memory control section rewrites the pertaining data with the data from the cache memory without issuing a read command to the main memory.

In this manner, processing contents are different depending upon whether data requested by the MPU is registered (upon cache hit) or not registered (upon cache mishit), and augmentation in processing performance is achieved by the difference in processing contents. Further, although depending upon the controlling method for the cache memory, from the point of view of high speed execution, as a method of updating of data registered once in the cache memory into the main memory, a flashback method wherein the MPU issues a flashback command to perform the updating, a store-in method wherein data is written only into the flash memory and, when the block becomes an object of replacement, the data is written into the main memory and some other methods are available. In a dual system, services are provided usually such that one subsystem is in a processing state (ACT state) while the other system is in a standby state (SBY state). If a serious trouble or the like occurs while services are provided in this state, then an ACT/SBY changing operation is performed to place the old ACT subsystem into a stopping or SBY state and place the old SBY system into an ACT state in order to continue the operation without stopping the services.

It is assumed that usually the system is operating while the 0-subsystem acts as the ACT system and the 1-subsystem acts as the SBY system. The MPU of the 0-subsystem reads out a processing program from the main memory, and control of individual functioning blocks and writing processing of a result of operation into the main memory are performed in accordance with the contents of the processing program. The contents of data written in the main memory of the ACT system are normally reflected on the main memory of the SBY system over the memory confounding line so that contents of the main memories are normally held commonly between the ACT system and the SBY system. However, when the MPU writes data on data registered in the cache memory, writing of the data back into the main memory is not performed unless flash back processing is performed. Accordingly, when such data exists, the data of the ACT system and the SBY system do not coincide with each other. Therefore, in such a dual system as described above, when a serious trouble occurs and consequently it is tried to perform an ACT/SBY changing operation, the following processing is executed.

(1) When timeout of a watch dog timer (WDT) of the system control section occurs, an ACT/SBY changing trigger is detected.

(2) The system control section notifies the MPU of interruption over an interrupt notification line.

(3) The MPU starts an emergency control operation program.

(4) Flashback processing of the cache memory and collection of logs of other trouble information are performed based on the emergency control operation program.

(5) ACT/SBY changing processing is performed so that, for example, the 1-subsystem becomes the ACT system and continues services.

As data of the cache memory is flashed back in this manner, contents of the flash memory are written into the main memory, and the data is transferred to the 1-subsystem over the memory confounding line. Consequently, the contents of the main memory of the 1-subsystem become common to the contents of the main memory of the 0-subsystem, which allows continuing of services.

However, the ACT/SBY changing operation cannot sometimes be performed normally. This is, for example, a case wherein a troubled functioning block from among blocks connected to the MPU bus or the extension MPU bus locks the bus and keeps the bus locked. Here, to lock the bus signifies a condition that the bus has been placed into and remains in a used state and is not released indefinitely. Where the MPU bus is locked, the emergency control operation program cannot transmit a command for instruction of flashback to the cache memory control section. On the other hand, where the extension MPU bus is locked, the cache memory control section cannot perform flashback into the main memory. In such instances, processing of the emergency control operation program cannot be performed, and flashback processing of the cache memory is disabled and services cannot be continued any more. As a trend in recent years, a system including a cache memory having an increased capacity is constructed as a result of further augmentation of the request processing capacity, increase of the performance of memory devices, reduction in cost of high speed devices and so forth. Consequently, the fact that contents of a cache memory cannot be taken over upon ACT/SBY changing operation or the like has an influence upon continuity of services as much.

SUMMARY OF THE INVENTION

Accordingly, it is an object of the present invention to provide a cache system wherein contents of a cache memory are written back into a main memory with certainty upon emergency.

It is another object of the present invention to provide a dual system which prevents, upon ACT/SBY changing, interruption of services arising from missing of stored contents of a cache memory caused by a trouble.

In accordance with an aspect of the present invention, there is provided a cache system, comprising a first bus, a second bus, a main memory having a memory section for storing data, the main memory being operable to write data inputted from the first bus into the memory section and output data read from the memory section to the first bus, a cache memory, instruction means for outputting to the second bus a command for instruction to write back data of the cache memory into the main memory, and a cache memory control section including a directory section for storing information regarding an address of the main memory of data stored in the cache memory and a reset terminal to which a first reset signal is inputted such that, when the first reset signal is asserted, at least an element of the cache memory control section which takes part in control of the first bus except the directory section is reset, the cache memory control section performing reading and writing of data between the main memory and the cache memory over the first bus, the cache memory control section performing write back processing of the data of the cache memory into the main memory in accordance with the command inputted over the second bus.

In accordance with another aspect of the present invention, there is provided a cache system, comprising a first bus, a second bus, a third bus, a main memory having a memory section for storing data, the main memory being operable to write data inputted from the first bus into the memory section and output data read from the memory section to the first bus, a cache memory, instruction means for outputting to the second bus a command for instruction to write back data of the cache memory into the main memory, a cache memory control section for performing reading and writing of data between the main memory and the cache memory over the first bus and performing write back processing of the data of the cache memory into the main memory in accordance with the command inputted over the second bus, an interface section for interfacing between the first bus and the third bus, and an isolate section interposed between an output side of the interface section and the first bus for isolating the output side of the interface section and the first bus from each other when a control signal inputted to a control terminal becomes valid.

In accordance with a further aspect of the present invention, there is provided a cache system, comprising a first bus, a second bus, a signal line different from the first bus, a main memory having a memory section for storing data, the main memory being operable to write data inputted from the first bus into the memory section, output data read from the memory section to the first bus, and receive data and an address from the signal line and write the data and the address into the memory section, a cache memory, instruction means for outputting to the second bus a command for instruction to write back data of the cache memory into the main memory, and a cache memory control section for performing reading and writing of data between the main memory and the cache memory over the first bus and outputting data and an address of the cache memory to the signal line in accordance with the command inputted over the second bus thereby to perform write back processing into the main memory.

The above and other objects, features and advantages of the present invention and the manner of realizing them will become more apparent, and the invention itself will best be understood, from a study of the following description and appended claims with reference to the attached drawings showing some preferred embodiments of the invention.

BRIEF DESCRIPTION OF THE DRAWINGS

FIG. 5 is a block diagram of a system control section shown in FIG. 2;

FIG. 11 is a block diagram of a dual system according to a second embodiment of the present invention;

FIG. 45 is a block diagram of a dual system according to a seventeenth embodiment of the present invention;

FIG. 52 is a block diagram of a dual system according to a twentieth embodiment of the present invention;

FIG. 63 is a block diagram of a main memory shown in FIG. 62.

DESCRIPTION OF THE PREFERRED EMBODIMENTS

Figure 1:
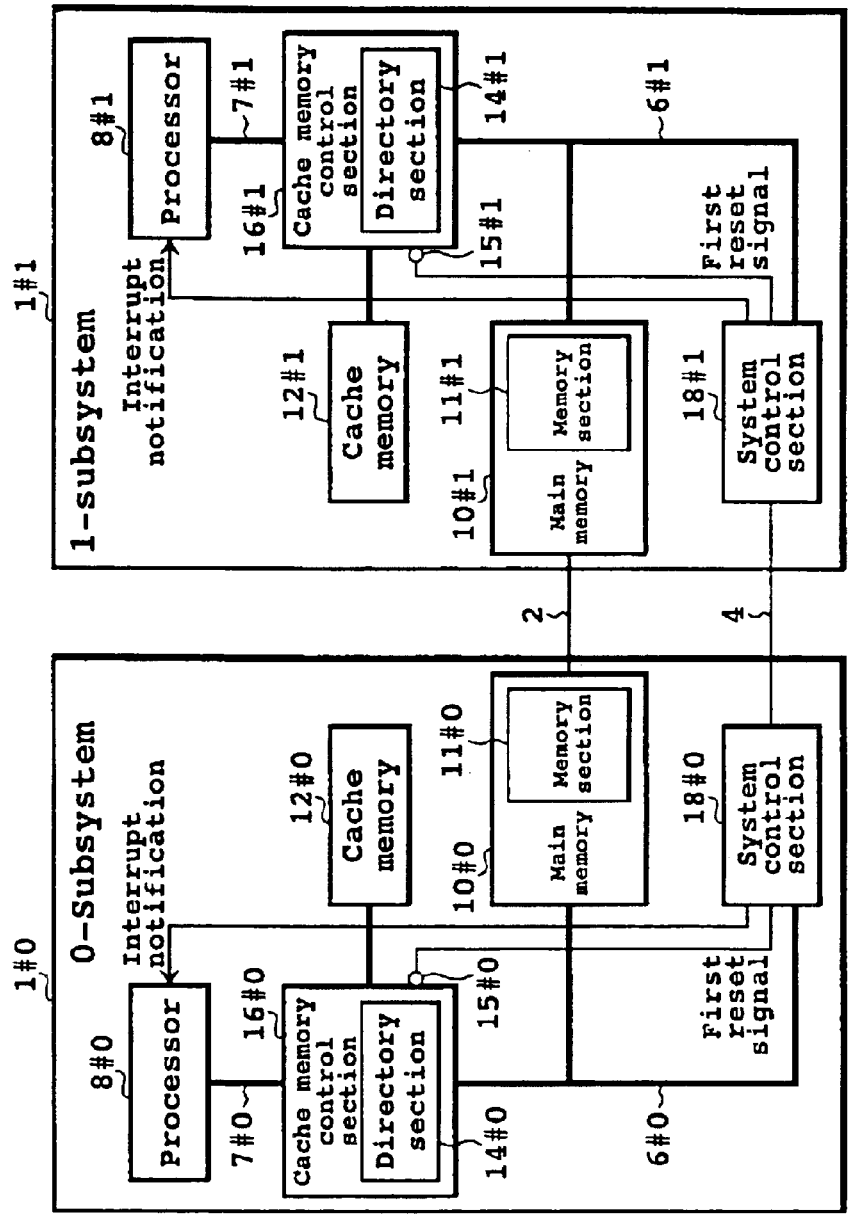
FIG. 1 is a diagrammatic view of a principle of the present invention.

Before embodiments of the present invention are described, a principle of the present invention is described. FIG. 1 is a block diagram of the principle of the present invention. Referring to FIG. 1, a dual system includes a 0-subsystem 1#0 and a 1-subsystem 1#1 having the same construction, a memory confounding line 2, and a system confounding line 4. The i-subsystem 1#i (i=0, 1) includes a first bus 6#i, a second bus 7#i, a main memory 10#i, a cache memory 12#i, a cache memory control section 16#i and a system control section 18#i. The main memory 10#i has a memory section 11#i for storing data and is operable to write data inputted from the first bus 6#i into the memory section 11#i and output data read from the memory section 11#i to the first bus 6#i. Further, the main memory 10#i receives data of the other ACT system from the memory confounding line 2 and writes the data into the memory section 11#i. An emergency control program is started in a processor 8#i in response to an interrupt notification, and the processor 8#i outputs a first command for instruction to write back data of the cache memory 12#i into the main memory 10#i to the second bus 7#i.

The cache memory control section 16#i includes a directory section 14#i for storing information regarding an address of the main memory 10#i of data stored in the cache memory 12#i, and a first reset terminal 15#1 to which a first reset signal is inputted such that, when the first reset signal is asserted, at least elements of the cache memory control section 16#i which take part in control of the first bus 6#i except the directory section 14#i are set. The cache memory control section 16#i performs reading and writing of data between the main memory 10#i and the cache memory 12#i over the first bus 6#i. Further, the cache memory control section 16#i performs write back processing of the data of the cache memory 12#i into the main memory 10#i in accordance with the first command inputted over the second bus 7#i. The system control section 18#i supervises the processor 8#i and, upon system changing over from the act system to the standby system, asserts the first reset signal and notifies the processor 8#i of interruption.

In the following, operation of the dual system of FIG. 1 is described. Upon operation, one of the 0-subsystem 1#0 and the 1-subsystem 1#1 serves as the ACT system while the other serves as the SBY system. Here, it is assumed that the 0-subsystem 1#0 serves as the ACT system and the 1-subsystem 1#1 serves as the SBY system. Further, it is assumed that a trouble occurs with the processor 8#0 of the 0-subsystem 1#0. The system control section 18#0 first asserts the first reset signal and then delivers an interrupt notification to the processor 8#0. The first reset signal is inputted to the first reset terminal 15#0 of the cache memory control section 16#0, and those elements of the cache memory control section 16#0 which take part in control of the first bus 6#0 except the directory section 14#0 are reset. Consequently, even if the cache memory control section 16#0 locks the first bus 6#0 because of a trouble, since the elements of the cache memory control section 16#0 which take part in control of the first bus 6#0 are reset, the locking of the first bus 6#0 is cancelled.

The processor 8#0 starts the emergency control program in response to the interrupt notification and outputs a first command for instruction to write back data from the cache memory 12#0 to the main memory 10#0 to the second bus 7#0. The cache memory control section 16#0 reads data to be written back from the cache memory 12#0 and outputs the data and an address to the first bus 6#0. The main memory 10#0 receives the data and the address from the first bus 6#0 and writes the data into the memory section 11#0. Consequently, even if the main memory 10#0 locks the first bus 6#0 or the like, the locking is cancelled and write back processing is enabled.

First Embodiment

Figure 2:
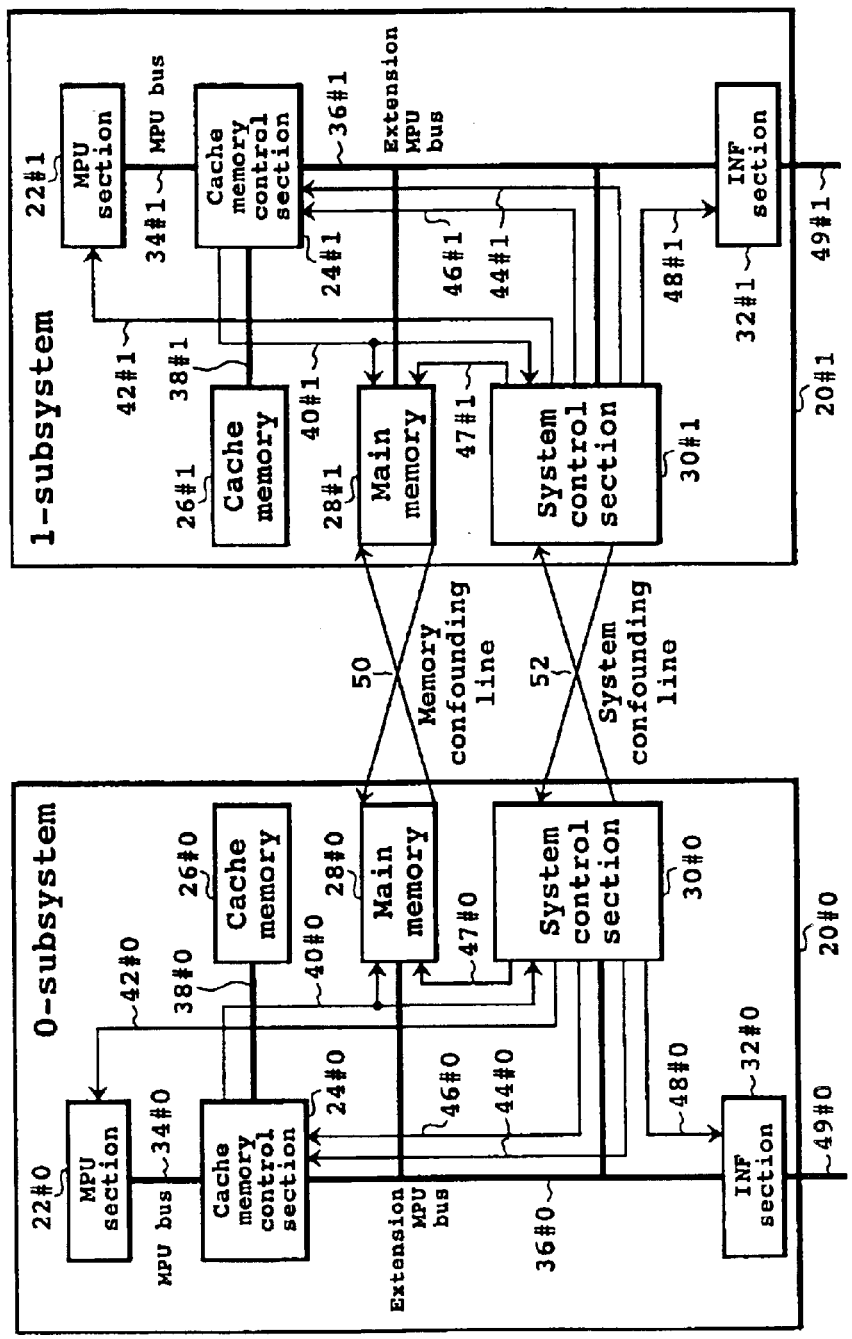
FIG. 2 is a block diagram of a dual system according to a first embodiment of the present invention.

FIG. 2 is a block diagram showing a construction of a dual system according to a first embodiment of the present invention. Referring to FIG. 2, the dual system includes a 0-subsystem 20#0 and a 1-subsystem 20#1. Upon operation, one of the 0-subsystem 20#0 and the 1-subsystem 20#1 serves as the ACT system while the other serves as the SBY system, and they have the same construction. Each i-subsystem (i=0, 1) includes an MPU section 22#i, a cache memory control section 24#i, a cache memory 26#i, a main memory 28#i, a system control section 30#i, an INF section 32#i, an MPU bus 34#i, an extension MPU bus 36#i, a cache memory bus 38#i, a flashback state notification line 40#i, an interrupt notification line 42#i, general reset lines 44#i, 47#i and 48#i, a partial reset line 46#i and an other functioning section connection bus 49#i.

The MPU section 22#i has the following functions.

(1) The MPU section 22#i outputs a command for reading a command or data from the main memory 28#i or writing data into the main memory 28#i to the MPU bus 34#i, and fetches a command or data outputted to the MPU bus 34#i and executes a program.

(2) The MPU section 22#i outputs to the MPU bus 34#i a command for instruction to write a reset signal for periodically resetting a watch dog timer 94#i into a pertaining control register 96#i in the system control section 30#i shown in FIG. 5. It is to be noted that the watch dog timer 94#i cannot be reset periodically if some trouble occurs with a program or the like executed by the MPU section 22#i or in a like case. In such an instance, the watch dog timer 94#i overflows (timeout), and the emergency control program is executed to effect changing over between the ACT system and the SBY system.

(3) If the interrupt notification line 42#i is asserted, then interruption occurs with the MPU section 22#i, and the MPU section 22#i executes the emergency control program registered as an interrupt vector address therein. The emergency control program is a program which started by interruption upon changing over from the ACT system to the SBY system.

In the current ACT system, the MPU section 22#i outputs a command for instruction to perform flashback from the cache memory 26#i to the main memory 28#i, to the MPU bus 34#i and outputs a command to collect trouble information and write the trouble information into the main memory 28#i directly without intervention of the cache memory 26#i to the MPU bus 34#i. In the old SBY system, changing over from the SBY system to the ACT system is performed under the control of the system control section 30#i, and the MPU section 22#i reads from a predetermined address area of the main memory 28#i information which represents whether or not flashback has been completed with the old ACT system. If the flashback has been completed, then the MPU section 22#i executes operation based on the command or data written in the main memory 28#i to continue services. If the flashback has not been completed, then the MPU section 22#i performs IPL (Initial Program Loading) into the main memory 28#i and stops services once, and then resumes services. The reason why it is discriminated whether or not flashback has been completed with the old ACT system in this manner is such as follows. In particular, if the information does not indicate that the flashback has not been completed, then it is considered that some failure has obstructed such flashback of the ACT system. Therefore, it is considered that it is rather good to stop services once and then resume services after initialization is performed than to continue services based on stored contents of the main memory 28#i.

Figure 3:
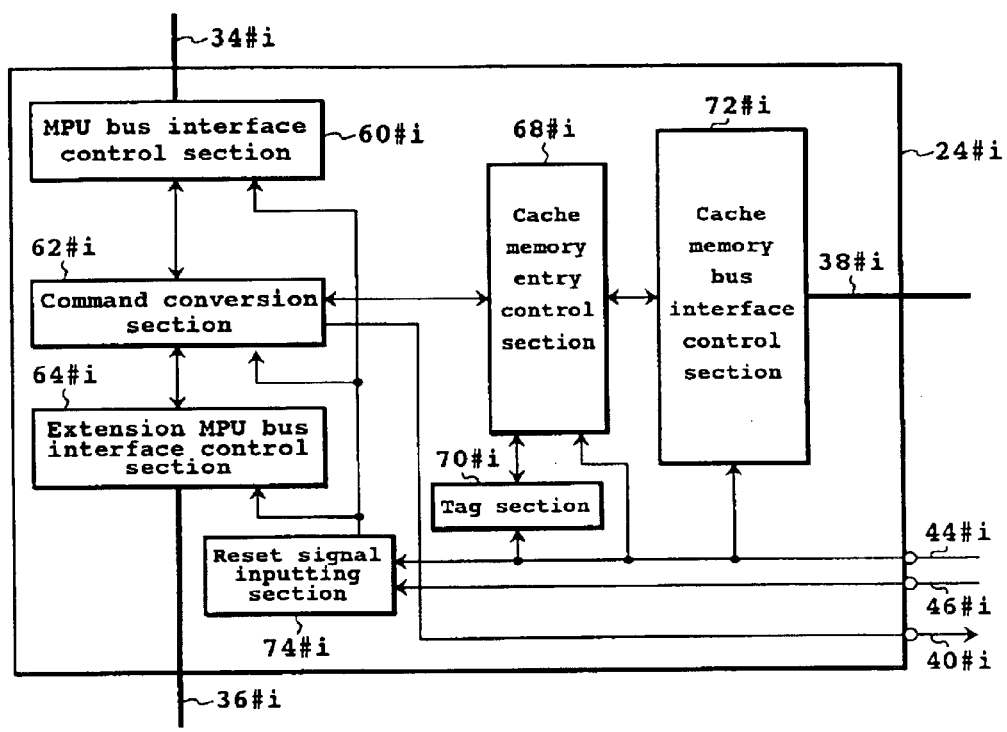
FIG. 3 is a block diagram of a cache memory control section shown in FIG. 2.

FIG. 3 is a block diagram of the cache memory control section 24#i shown in FIG. 2. Referring to FIG. 3, the cache memory control section 24#i includes an MPU bus interface control section 60#i, a command conversion section 62#i, an extension MPU bus interface control section 64#i, a cache memory entry control section 68#i, a tag section 70#i, a cache memory bus interface control section 72#i and a reset signal inputting section 74#i. The MPU bus interface control section 60#i outputs, when it receives a read or write command for the main memory 28#i outputted to the MPU bus #34#i, a flashback instruction command or a read command for a control register for storing trouble information and so forth of the INF section 32#i or the like, the command to the command conversion section 62#i. Further, the MPU bus interface control section 60#i controls the MPU bus 34#i to output data for the main memory 28#i or the control register outputted from the command conversion section 62#i to the main memory 28#i or the control register. Furthermore, the MPU bus interface control section 60#i has a reset terminal not shown, and when the reset terminal is asserted, the MPU bus interface control section 60#i is reset and a register and so forth which control the MPU bus 34#i are reset. Consequently, locking of the MPU bus 34#i is cancelled compulsorily, and information which makes a cause of locking of the extension MPU bus 36#i is reset.

The command conversion section 62#i has the following functions.

(1) The command conversion section 62#i analyzes a command inputted from the MPU bus interface control section 60#i and outputs, if the command is a command for directly accessing the main memory 28#i without intervention of the cache memory 26#i, the command to the extension MPU bus interface control section 64#i. If the command is any other than the command just described, then the command conversion section 62#i instructs the cache memory entry control section 68#i to access the cache memory 26#i.

(2) Upon cache mishit, the command conversion section 62#i outputs a command for accessing the main memory 28#i to the extension MPU bus interface control section 64#i. The command conversion section 62#i outputs data outputted from the extension MPU bus interface control section 64#i to the cache memory 26#i.

(3) Upon cache hit, if the command is a read command, then the command conversion section 62#i outputs data outputted from the cache memory entry control section 68#i to the MPU bus interface control section 60#i.

(4) If a flashback instruction command is inputted from the MPU bus interface control section 60#i, then the command conversion section 62#i instructs the cache memory entry control section 68#i to perform flashback. If data to be flashed back is outputted from the cache memory entry control section 68#i together with an address in the main memory 28#i, then the command conversion section 62#i outputs a command for instruction to write the data into the address of the main memory 28#i to the extension MPU bus interface control section 64#i.

(5) A command for instruction to read from the control register of the INF section 32#i or the like is outputted from the MPU bus interface control section 60#i to the extension MPU bus interface control section 64#i. If contents of the log information and so forth of the control register are outputted from the extension MPU bus interface control section 64#i, then the command conversion section 62#i outputs the contents to the MPU bus interface control section 60#i.

(6) When flashback to the main memory 28#i is completed, the command conversion section 62#i asserts the flashback state notification line 40#i.

(7) The command conversion section 62#i has a reset terminal not shown, and if the reset terminal is asserted, then the command conversion section 62#1 is reset, and a register and so forth which takes part in control of a command are reset. Consequently, information which makes a cause of locking of the MPU bus 34#i and the extension MPU bus 36#i is reset.

The extension MPU bus interface control section 64#i controls interfacing between the extension MPU bus 36#i and the command conversion section 62#i, and if a reset signal inputted to a reset terminal not shown of the extension MPU bus interface control section 64#i is asserted, then a register and so forth which take part in control of the extension MPU bus 36#i are reset. The cache memory entry control section 68#i has the following functions.

(1) The cache memory entry control section 68#i receives a read/write instruction from the command conversion section 62#i and retrieves the tag section 70#i to check whether or not cache hit occurs. If cache hit is detected, then the cache memory entry control section 68#i reads or writes data into or from the cache memory 26#i through the cache memory bus interface control section 72#i and the cache memory bus 38#i. Further, if cache mishit is detected, then the cache memory entry control section 68#i outputs information representing this to the command conversion section 62#i. The cache memory entry control section 68#i writes data of the main memory 28#i inputted thereto from the command conversion section 62#i to the cache memory 26#i through the cache memory bus interface control section 72#i and the cache memory bus 38#i and registers information regarding an address and so forth at the main memory 28#i of the write data into the tag section 70#i.

(2) If the cache memory entry control section 68#i receives a flashback instruction from the command conversion section 62#i, then it refers to the tag section 70#i to read at least updated data from the cache memory 26#i through the cache memory bus interface control section 72#i and the cache memory bus 38#i and outputs the data and the address to the command conversion section 62#i.

The tag section 70#i is a directory for controlling whether or not data of the main memory 28#i is present in the cache memory 26#i. While various controlling systems are possibly available, for example, addresses in the main memory 28#i, updating flags and so forth of the data stored in the individual blocks of the cache memory 26#i are stored. The cache memory bus interface control section 72#i controls interfacing between the cache memory entry control section 68#i and the cache memory 26#i. The cache memory entry control section 68#i, tag section 70#i and cache memory bus interface control section 72#i have a reset terminal not shown connected to the general reset line 44#i so that they are reset when the general reset line 44#i is asserted. The reset signal inputting section 74#i receives a general reset signal and a partial reset signal from the general reset line 44#i and the partial reset line 46#i, respectively, and if one of the reset lines 44#i and 46#i is asserted, then the reset signal inputting section 74#i asserts a reset signal which is an output signal thereof and outputs it to the reset terminals of the MPU bus interface control section 60#i, command conversion section 62#i and extension MPU bus interface control section 64#i.

Figure 4:
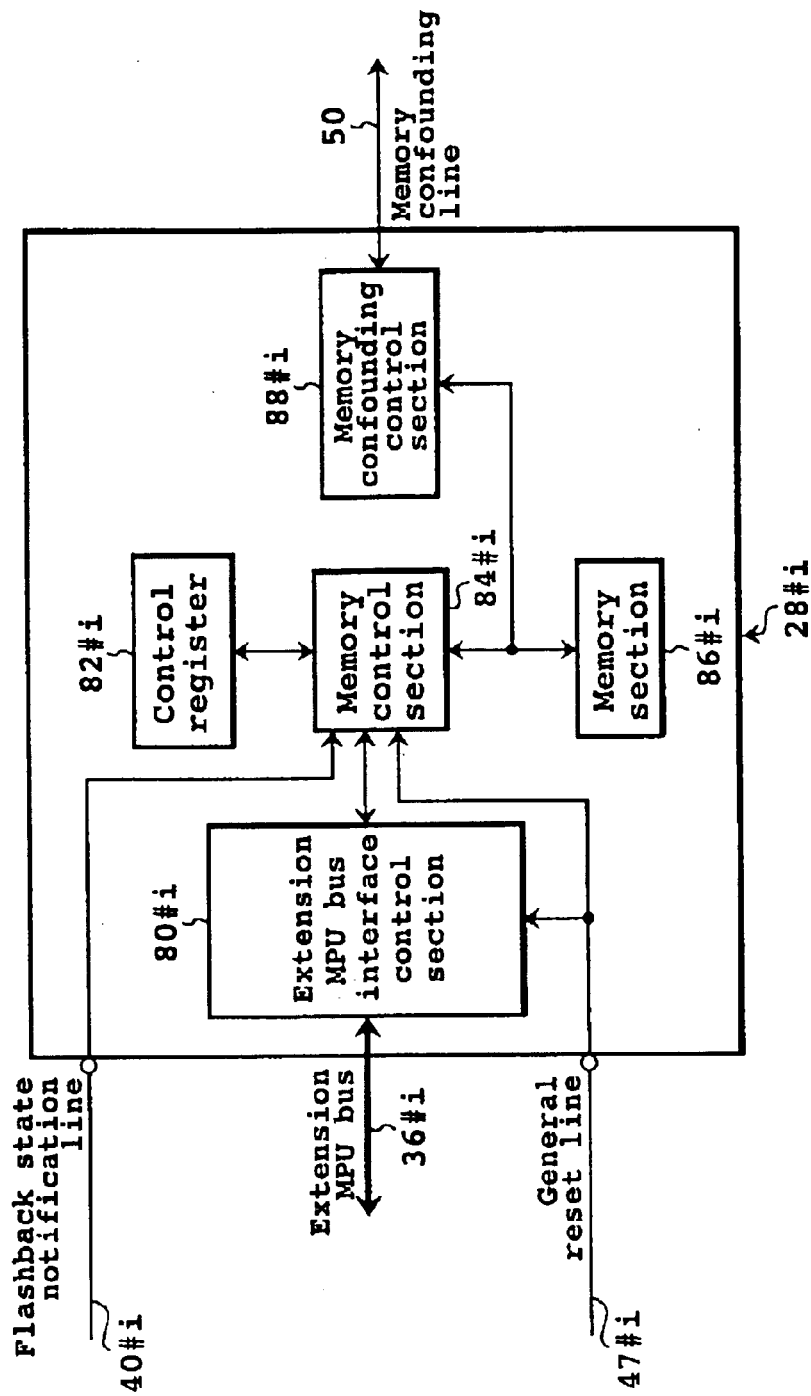
FIG. 4 is a block diagram of a main memory shown in FIG. 2.

The partial reset line 46#i is a signal line which takes part in cancellation of locking of the MPU bus 34#i and the extension MPU bus 36#i in flashback processing and is provided separately from the general reset line 44#i because it is possible to cancel locking of the MPU bus 34#i and the extension MPU bus 36#i and hold information regarding flashback, for example, stored contents of the tag section 70#i to perform flashback regularly. Accordingly, even if the partial reset line 46#i is asserted, the tag section 70#i and so forth which hold information relating to flashback are not reset. The general reset line 44#i is a signal line which is asserted upon starting up of the system 20#i. The cache memory 26#i shown in FIG. 2 is a high speed memory such as an SRAM for storing part of stored data of the main memory 28#i. FIG. 4 is a block diagram of the main memory 28#i shown in FIG. 2. Referring to FIG. 4, the main memory 28#i includes an extension MPU bus interface control section 80#i, a control register 82#i, a memory control section 84#i, a memory section 86#i and a memory confounding control section 88#i. The extension MPU bus interface control section 80#i is an interface between the memory control section 84#i and the extension MPU bus 36#i.

The memory control section 84#i receives a command outputted from the extension MPU bus 36#i through the extension MPU bus interface control section 80#i and reads or writes data from or into the memory section 86#i. Further, the memory control section 84#i outputs data read from the memory section 86#i to the extension MPU bus 36#i. Furthermore, if the flashback state notification line 40#i is asserted, then the memory control section 84#i writes flashed back information into a particular address area of the memory section 86#*i*. The control register 82#*i* is a register for storing error information such as a data error, an address of error data, a memory capacity, a memory configuration, a memory bank, an access rate and so forth. The memory section 86#*i* is a memory into which a program or the like stored on a storage medium such as a hard disk (HDD) not shown is loaded, and is formed from a DRAM or a like device. The memory confounding control section 88#*i* steals, in the ACT system, accessing of the memory control section 84#*i* to the memory section 86#*i* and outputs, when data is written into the memory section 86#*i*, the data and the address to a memory confounding line 50. On the other hand, in the SBY system, the memory confounding control section 88#*i* writes, when the data and the address are inputted thereto from the memory confounding line 50, the data into the address of the memory section 86#*i*.

FIG. 5 is a block diagram of the system control section 30#*i* shown in FIG. 2. Referring to FIG. 5, the system control section 30#*i* includes an extension MPU bus interface control section 90#*i*, a reset line 92#*i*, a watch dog timer 94#*i*, a control register 96#*i*, a subsystem changeover timer 98#*i*, a main control section 100#*i* and a confounding control section 102#*i*. The extension MPU bus interface control section 90#*i* controls interfacing between the extension MPU bus 36#*i* and the main control section 100#*i*. Further, if the reset line 92#*i* is asserted, then a register and so forth of the extension MPU bus interface control section 90#*i* which control the extension MPU bus 36#*i* are set. Consequently, if the extension MPU bus 36#*i* is locked by the extension MPU bus interface control section 90#*i*, then the locking is cancelled compulsorily.

The watch dog timer 94#*i* is reset in response to a reset signal stored in the control register 96#*i* and outputs an overflow signal to the control register 96#*i* when it counts a fixed time which is not shorter than a reset period by the MPU section 22#*i* in response to a clock not shown. The control register 96#*i* is a register for storing a reset signal and an overflow signal of the watch dog timer 94#*i*, a timeout signal of the subsystem changeover timer 98#*i* and so forth. The subsystem changeover timer 98#*i* starts counting of time in response to an overflow signal of the watch dog timer 94#*i* and writes a timeout signal into the control register 96#*i* when it counts up a time which is not shorter than a time required for flashback after the watch dog timer 94#*i* overflows in response to a clock not shown.

The main control section 100#*i* has the following functions.

(1) In the ACT system, when the control register 96#*i* indicates an overflow of the watch dog timer 94#*i*, the main control section 100#*i* first asserts the partial reset line 46#*i* and the general reset lines 47#*i* and 48#*i* and then asserts the interrupt notification line 42#*i*.

(2) In the ACT system, if the flashback state notification line 40#*i* is asserted, then the main control section 100#*i* instructs the confounding control section 102#*i* to signal an ACT/SBY system changeover signal.

(3) In the SBY system, when the main control section 100#*i* receives a notification of the ACT/SBY system changeover signal from the confounding control section 102#*i*, then it first asserts the general reset line 44#*i* and the general reset lines 47#*i* and 48#*i* and then asserts the interrupt notification line 42#*i*.

Figure 6:
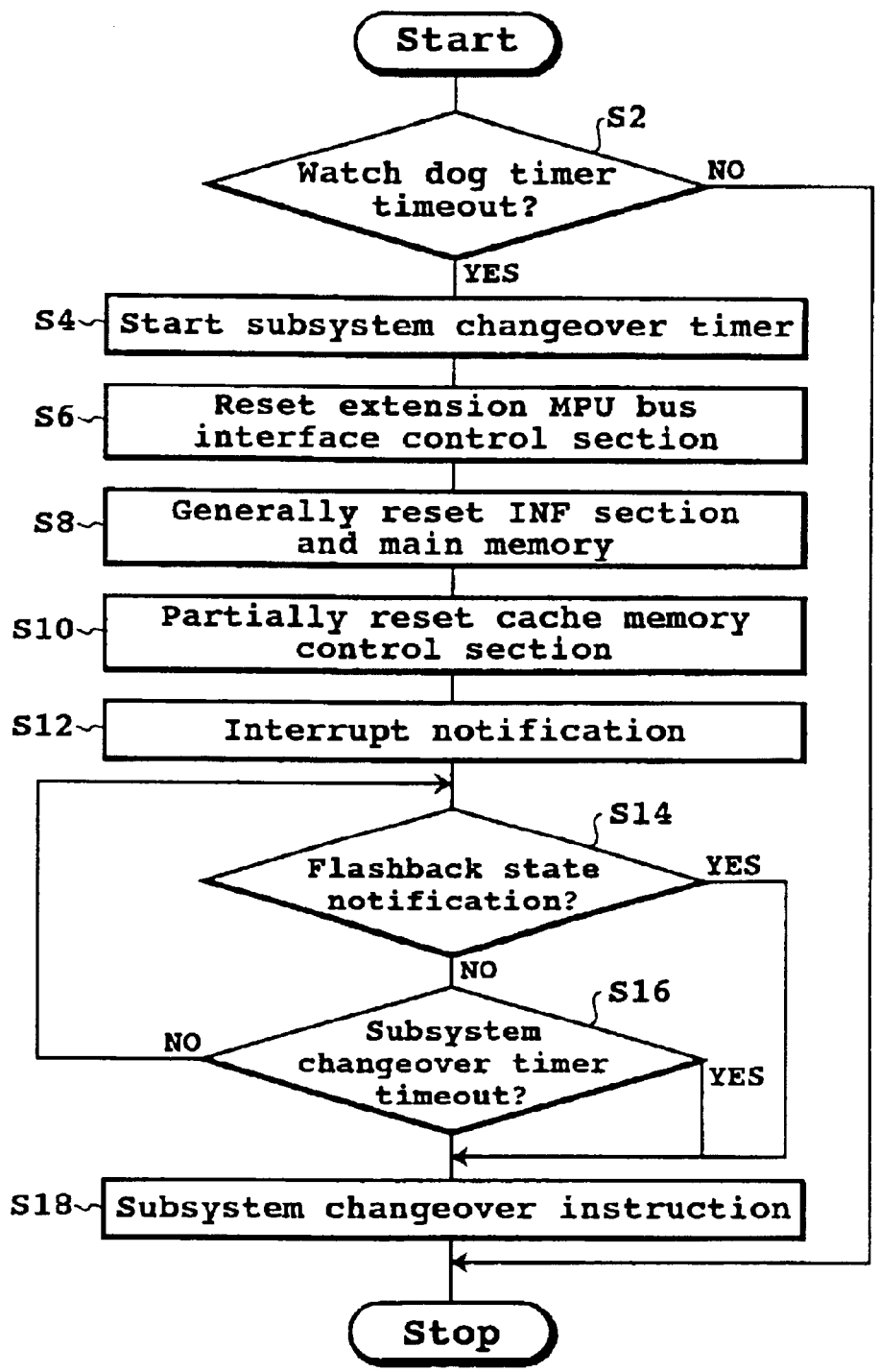
FIG. 6 is a flow chart illustrating operation of the system control section shown in FIG. 2.
Figure 7:
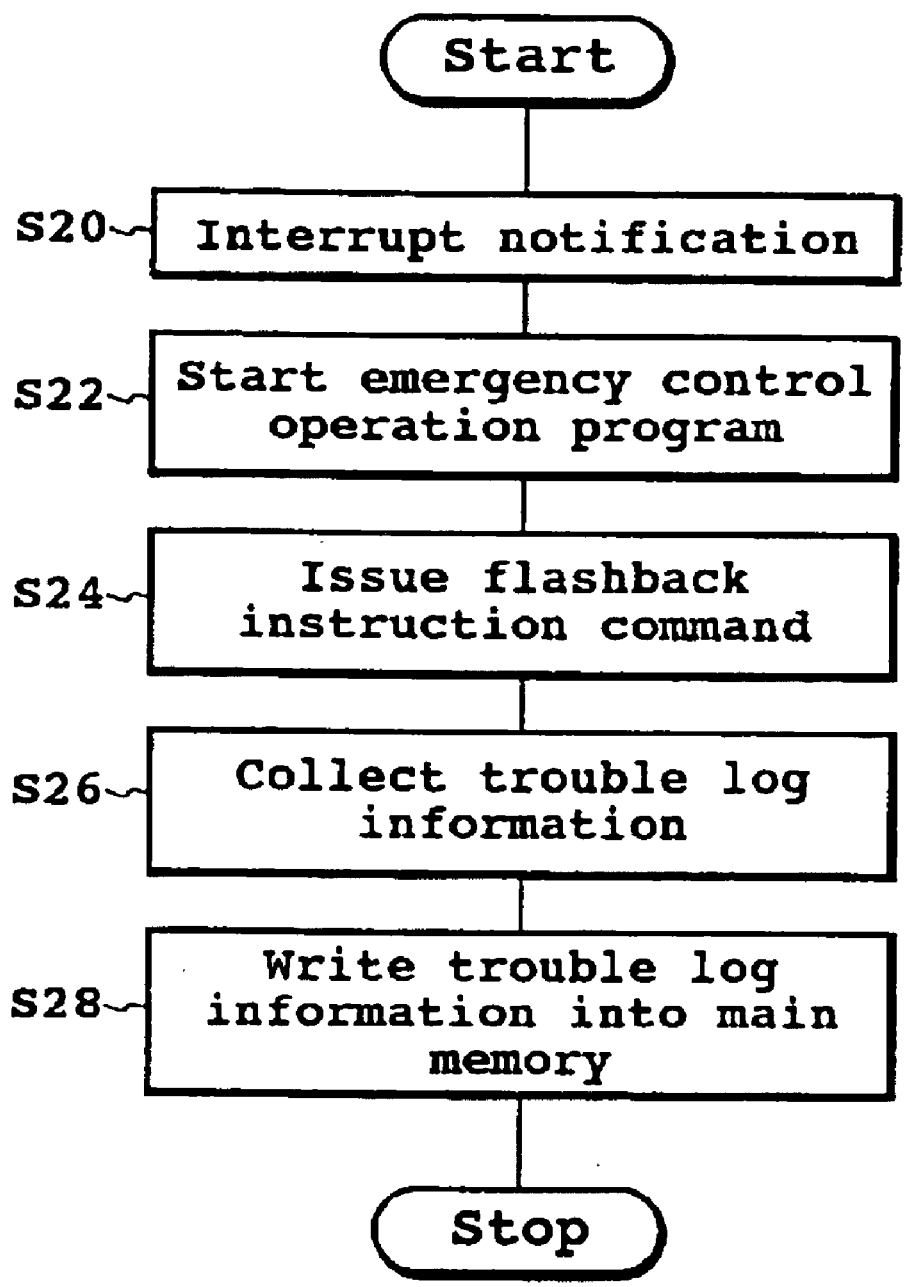
FIG. 7 is a flow chart illustrating operation of a MPU section shown in FIG. 2.
Figure 8:
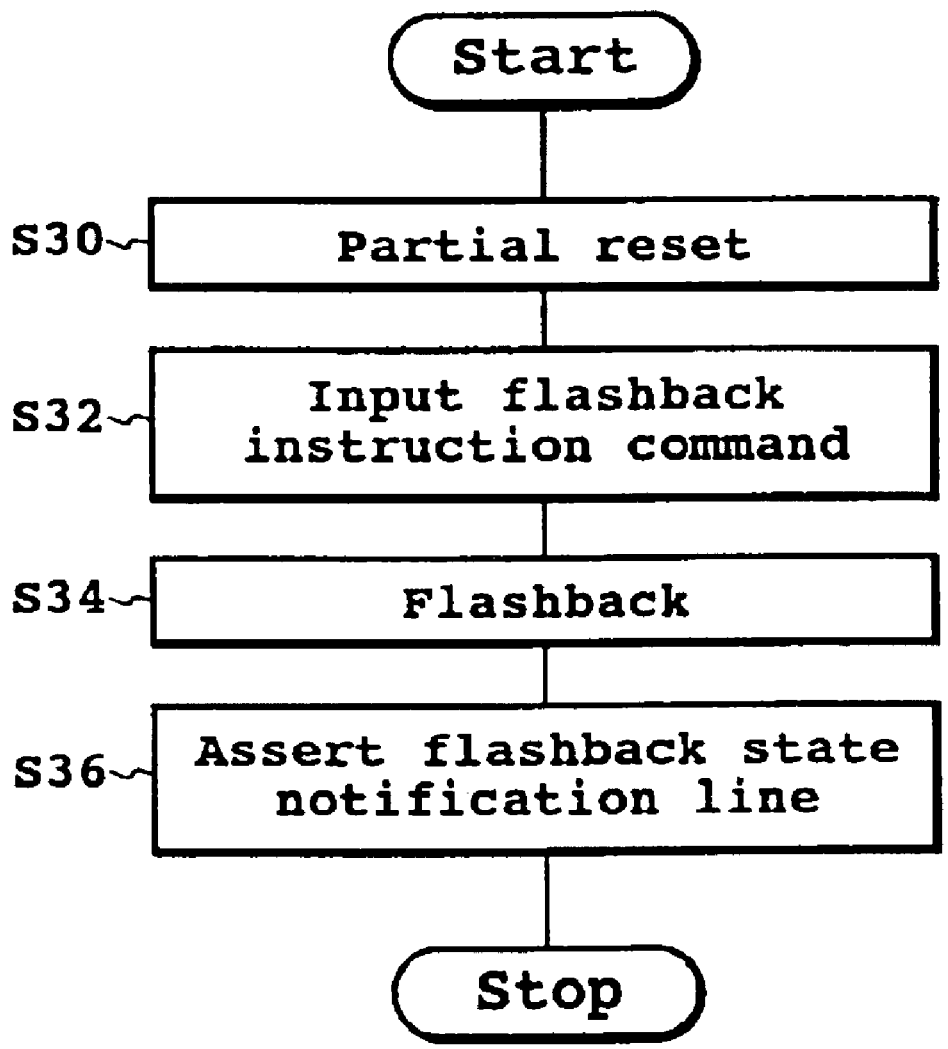
FIG. 8 is a flow chart illustrating operation of the cache memory control section shown in FIG. 2.
Figure 9:
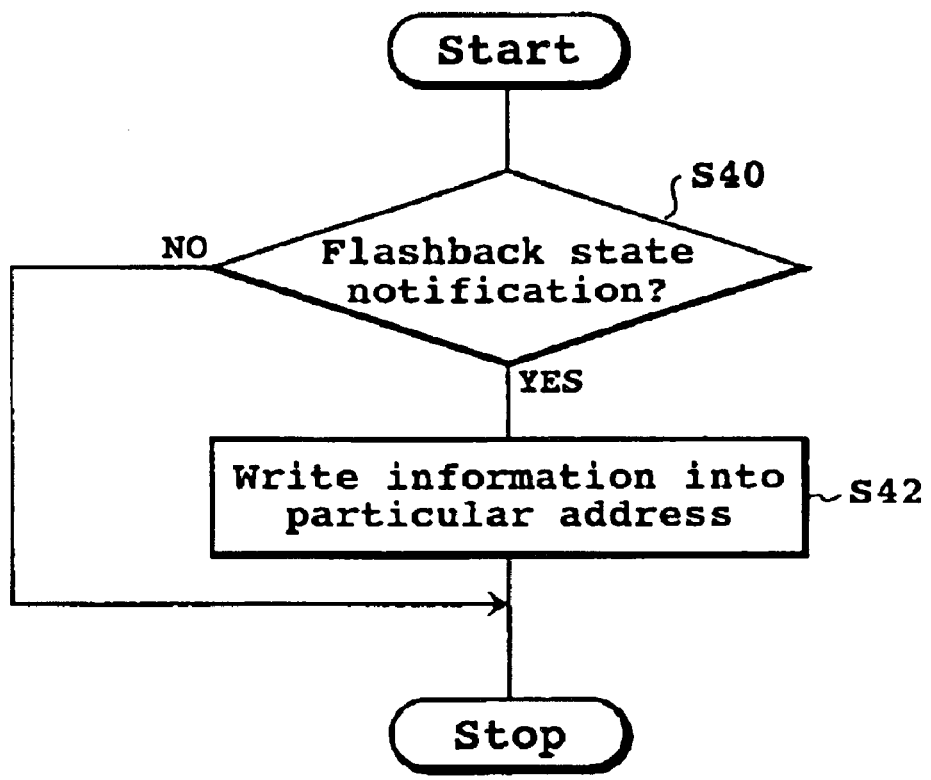
FIG. 9 is a flow chart illustrating operation of the main memory shown in FIG. 2.
Figure 10:
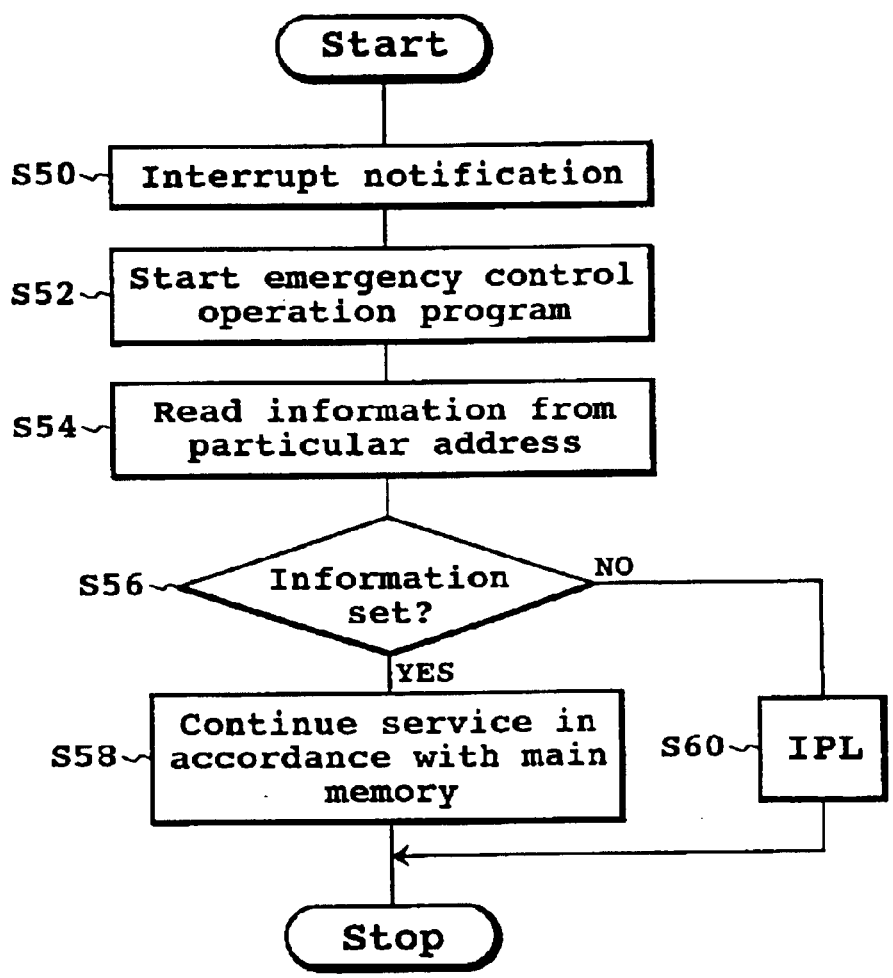
FIG. 10 is a flow chart illustrating operation of the MPU section shown in FIG. 2.

The confounding control section 102#*i* in the ACT system signals an ACT/SBY system changeover signal to a system confounding line 52 in accordance with an instruction of the main control section 100#*i*. In the SBY system, when the confounding control section 102#*i* receives the ACT/SBY system changeover signal from the system confounding line 52, it notifies the main control section 100#*i* of the signal. The INF section 32#*i* shown in FIG. 2 controls interfacing between the extension MPU bus 36#*i* and the other functioning section connection bus 49#*i*. Further, the INF section 32#*i* has a reset terminal so that it is reset when the general reset line 48#*i* is asserted. FIG. 6 is a flow chart illustrating operation of the system control section 30#*i* shown in FIG. 2. FIG. 7 is a flow chart illustrating operation of the MPU section 22#*i*(current ACT system) shown in FIG. 2. FIG. 8 is a flow chart illustrating operation of the cache memory control section 24#*i* shown in FIG. 2. FIG. 9 is a flow chart illustrating operation of the main memory 28#*i* shown in FIG. 2. FIG. 10 is a flow chart illustrating operation of the MPU section 22#*i*(old SBY system) shown in FIG. 2. In the following, operation of the system of FIG. 2 upon flashback is described with reference to the figures mentioned above.

(A1) Operation of the MPU Section 22#0

In the present embodiment, it is assumed that the 0-subsystem 20#0 serves as the ACT system and the 1-subsystem 20#1 acts as the SBY system. The MPU section 22#0 in a normal operation periodically outputs a command for writing into the control register 96#0 a signal for resetting the watch dog timer 94#0 in the system control section 30#0 to the MPU bus 34#0. The cache memory control section 24#0 receives the command and outputs a command for writing a reset signal over the extension MPU bus 36#0 to the extension MPU bus 36#0. The system control section 30#0 writes the reset signal into the control register 96#0. The watch dog timer 94#0 is reset by the reset signal. Here, it is assumed that a trouble that the watch dog timer 94#0 cannot be reset occurs with the MPU section 22#0. The cause of the trouble may be that a program executed by the MPU section 22#0 is abnormal in that it runs away or the like, that the MPU bus 34#0 or the extension MPU bus 36#0 is locked, that the hardware fails or the like. In such an instance, the watch dog timer 94#0 overflows because it is not reset intermediately.

(B1) Operation of the System Control Section 30#0.

In step S2 illustrated in FIG. 6, the main control section 100#0 reads the control register 96#0 and checks whether or not the watch dog timer 94#0 has overflowed. If the watch dog timer 94#0 has overflowed, then the processing advances to step S4, but if the watch dog timer 94#0 has not overflowed, then the processing is ended. In step S4, since the watch dog timer 94#0 has overflowed, the subsystem changeover timer 98#0 is started and begins to count time in accordance with the clock. In step S6, the main control section 100#0 asserts the reset line 92#0 to reset the extension MPU bus interface control section 90#0. In step S8, the main control section 100#0 asserts the general reset lines 47#0 and 48#0 to reset the INF section 32#0 and the main memory 28#0. Consequently, if the extension MPU bus 36#0 is locked because of a trouble with the main memory 28#0 or the INF section 32#0, the locking is cancelled compulsorily.

In step S10, the main control section 100#0 asserts the partial reset line 46#0 to partially reset the cache memory control section 24#0. Consequently, when the MPU bus 34#0 or the extension MPU bus 36#0 is locked because of a failure of the cache memory control section 24#0 or the like, the locking is cancelled compulsorily. In step S12, the main control section 100#0 asserts the interrupt notification line 42#0.

(A2) Operation of the MPU Section 22#0.

The MPU section 22#0 has an address of the emergency control operation program registered therein as an interrupt vector address. In step S20 in FIG. 7, the MPU section 22#0 is notified of an interruption by assertion of the interrupt notification line 42#0. In step S22, as the interrupt notification line 42#0 is asserted, interruption occurs with the MPU section 22#0 and the emergency control operation program is started. In step S24, the emergency control operation program issues a flashback instruction command to the MPU bus 34#0. In step S26, the MPU section 22#0 collects log information from control registers of the cache memory control section 24#0, main memory 28#0 and INF section 32#0 which relate to a failure log through the MPU bus 34#0, cache memory control section 24#0 and extension MPU bus 36#0. In step S28, the MPU section 22#0 writes the failure log information directly into the main memory 28#0 over the MPU bus 34#0 and the extension MPU bus 36#0.

(C) Operation of the Cache Memory Control section 24#0

In step S30 in FIG. 8, if it is assumed that the reset signal inputting section 74#0 is asserted, for example, with then the cache memory control section. 24#0 logically ORs the partial reset signal of the partial reset line 46#0 and the general reset signal of the general reset line 44#0 and outputs a reset signal to the reset terminals of the MPU bus interface control section 60#0, command conversion section 62#0 and extension MPU bus interface control section 64#0. Since the partial reset line 46#0 is asserted, the reset signal inputting section 74#0 asserts the reset signal. In the MPU bus interface control section 60#0, command conversion section 62#0 and extension MPU bus interface control section 64#0, registers and so forth which take part in control of the MPU bus 34#0 and the extension MPU bus 36#0 are reset because the reset signal to them is asserted. Consequently, even if the MPU bus 34#0 or the extension MPU bus 36#0 is locked by a failure of any of them, the locking is cancelled compulsorily. It is to be noted that the blocks of the tag section 70#0 and so forth which take part in flashback are not reset.

In step S32, when the MPU bus interface control section 60#0 receives a flashback instruction command from the MPU bus 34#0, it outputs the flashback instruction command to the command conversion section 62#0. In step S34, the command conversion section 62#0 receives the flashback instruction command and instructs the cache memory entry control section 68#0 to perform flashback. The cache memory entry control section 68#0 refers to the tag section 70#0 to successively determine at least updated block addresses. Then, the cache memory entry control section 68#0 successively reads the block data from the cache memory 26#0 through the cache memory bus interface control section 72#0 and the cache memory bus 38#0. The cache memory entry control section 68#0 outputs the block data to the command conversion section 62#0 together with the actual addresses of the blocks in the main memory 28#0.

The command conversion section 62#0 outputs a command for instruction to write the block data into the main memory 28#0 in accordance with the addresses through the extension MPU bus interface control section 64#0 and the extension MPU bus 36#0. The memory control section 84#0 in the main memory 28#0 receives the command from the extension MPU bus 36#0 through the extension MPU bus interface control section 80#0 and writes the block data into the addresses of the memory section 86#0. The memory confounding control section 88#0 steals the writing of the memory control section 84#0 into the memory section 86#0 and outputs the written data and the addresses to the memory confounding line 50. The memory confounding, control section 88#1 in the SBY system receives the data and the data addresses from the memory confounding line 50 and writes them into the memory section 86#1. At least all of the updated blocks of the cache memory 26#0 are read from the cache memory 26#0 and written into the main memory 28#0, thereby completing the flashback. In step S36, the command conversion section 62#0 asserts the flashback state notification line 40#0 when the flashback is completed.

(D) operation of the Main Memory 28#0.

In step S40 in FIG. 9, the memory control section 84#0 checks whether or not the flashback state notification line 40#0 is asserted. If the flashback state notification line 40#0 is asserted, then the processing advances to step S42, but if the flashback state notification line 40#0 is not asserted, then the processing is ended. In step S42, the memory control section 84#0 writes information representing completion of flashback into a particular address area of the memory section 86#0. This information is written into the main memory 28#1 of the SBY system over the memory confounding line 50.

(B2) Operation of the system control section 30#0.

In step S14 in FIG. 6, the main control section 100#0 checks whether or not the flashback state notification line 40#0 is asserted. If the flashback state notification line 40#0 is asserted, then the processing advances to step S18, but if the flashback state notification line 40#0 is not asserted, then the processing advances to step S16. The flashback state notification line 40#0 may not be asserted when the hardware of the MPU section 22#0 itself is in failure or in a like case. If the flashback state notification line 40#0 is not asserted, then timeout of the subsystem changeover timer 98#0 occurs soon, and a timeout signal is written into the control register 96#0. In step S16, the main control section 100#0 reads the control register 96#0, and checks whether or not timeout of the subsystem changeover timer 98#0 has occurred. If timeout of the subsystem changeover timer 98#0 has not occurred, then the processing returns to step S14. If timeout of the subsystem changeover timer 98#0 has occurred, then the processing advances to step S18.

In step S18, the main control section 100#0 instructs the confounding control section 102#0 to perform changeover of the systems between ACT/SBY. When the confounding control section 102#0 receives the instruction of the changeover of the subsystems between ACT/SBY, it outputs an ACT/SBY system changeover signal to the system confounding line 52. Consequently, when the watch dog timer 94#0 overflows, if the flashback state notification line 40#0 is asserted, then the ACT/SBY system changeover signal is outputted to the system confounding line 52. Also if the flashback state notification line 40#0 is not asserted, timeout of the subsystem changeover timer 98#0 occurs, and an ACT/SBY system changeover signal is outputted to the system confounding line 52.

(B3) Operation of the System Control Section 30#1.

When the confounding control section 102#1 in the system control section 30#1 of the SBY system receives the ACT/SBY system changeover signal from the system confounding line 52, it notifies the main control section 100#1 of changeover of the systems between ACT/SBY. The main control section 100#1 asserts the interrupt notification line 42#1 when it receives the notification of the change over of the systems.

(A3) Operation of the MPU Section 22#1.

In step S50 in FIG. 10, the interrupt notification line 42#1 is asserted to cause an interruption to the MPU section 22#1.

In step S52, the emergency control operation program is started. It is to be noted that, while the interrupt processing program is commonly used between the old SBY system and the current ACT system, naturally different programs may be used. In step S54, the emergency control operation program causes the MPU section 22#1 to read the information indicative of completion of flashback from the particular address area of the main memory 28#1 through the MPU bus 34#1, the cache memory control section 24#1 and the extension MPU bus 36#1. In step S56, the emergency control operation program advances the processing to step S58 if the information indicates completion of flashback, but if the information does not indicate completion of flashback, then the emergency control operation program advances the processing to step S60.

In step S58, the emergency control operation program starts up a service program. The service program continues the service in accordance with the stored contents of the main memory 28#1. In step S60, the emergency control operation program causes the MPU section 22#1 to perform IPL into the main memory 28#1 and then stop the service once. Then, the service program is started to resume the service. As described above, according to the first embodiment, even if the extension MPU bus or the MPU bus is in a locked state, the locking is cancelled compulsorily, and consequently, flashback can be performed. Since continuation or stopping of the service is performed based on the flashback completion information, the reliability of the service can be augmented. Since changeover of the systems is performed when the flashback state notification line is asserted before timeout of the subsystem changeover timer occurs, the service can be continued rapidly.

Second Embodiment

Figure 12:
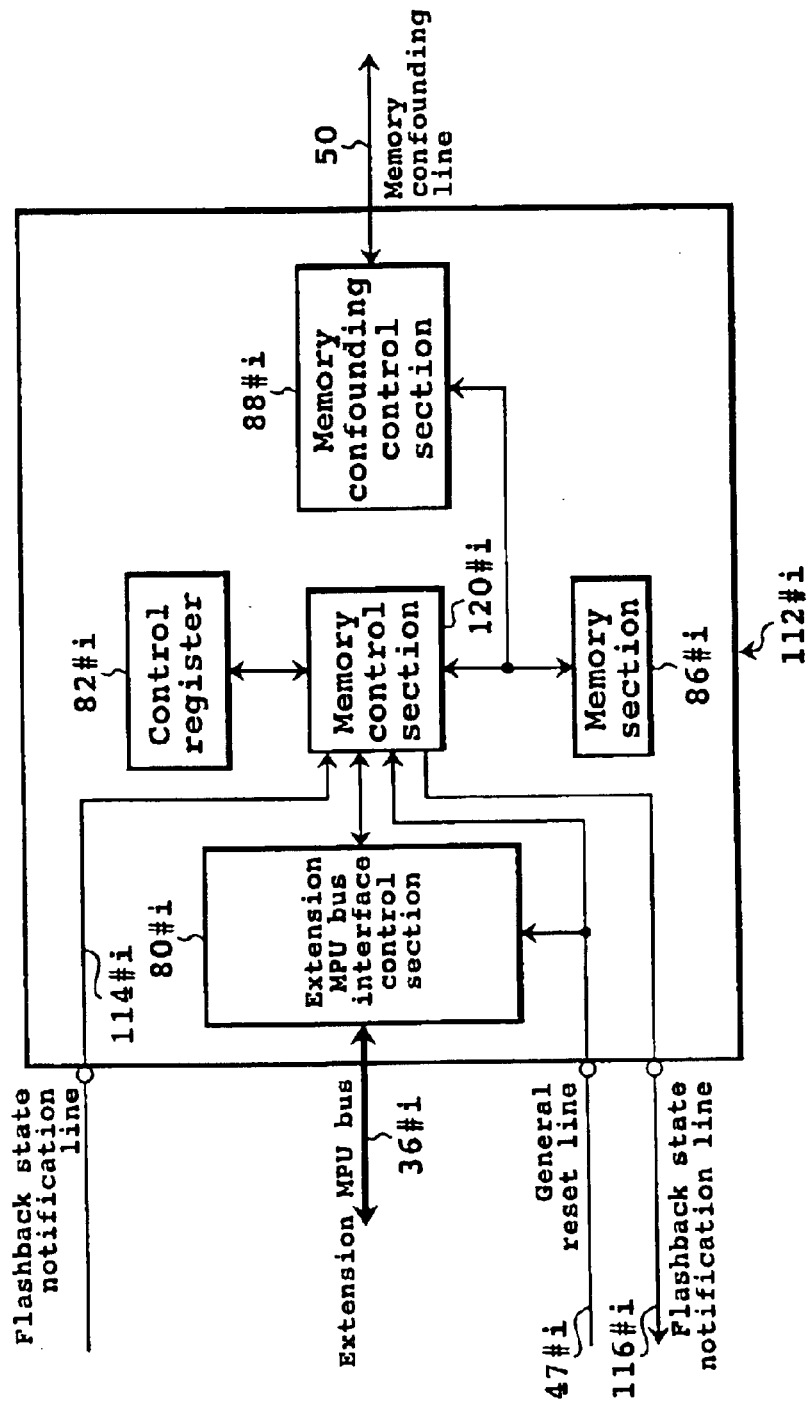
FIG. 12 is a block diagram of a main memory shown in FIG. 11.

FIG. 11 is a block diagram of a dual system according to a second embodiment of the present invention, and in FIG. 11, substantially like components to those in FIG. 2 are denoted by like reference characters. A flashback state notification line 114#*i* in FIG. 11 is different from the flashback state notification line 40#*i* in FIG. 2 in that it interconnects only the cache memory control section 24#*i* and a main memory 112#*i* without intersecting the cache memory control section 24#*i* and the system control section 30#*i*. FIG. 12 is a block diagram of the main memory 112#*i* shown in FIG. 11, and in FIG. 12, substantially like components to those in FIG. 4 are denoted by like reference characters. A memory control section 120#*i* in FIG. 12 is different from the memory control section 84#*i* shown in FIG. 4 in that, if the flashback state notification line 114#*i* is asserted by the cache memory control section 24#0, then the memory control section 120#*i* writes information representative of completion of flashback into a particular address of the memory section 86#*i* and asserts a flashback state notification line 116#*i*. The reason why the main memory 112#*i* asserts the flashback state notification line 116#*i* is that, since the ACT/SBY systems are changed over after information of completion of flashback is written into the memory section 86#*i*, the subsystem which has been changed over to the ACT system can read the information representative of completion of flashback with a higher degree of certainty. Since the other components shown in FIG. 11 are substantially similar to those in FIG. 2, description of them is omitted.

Figure 13:
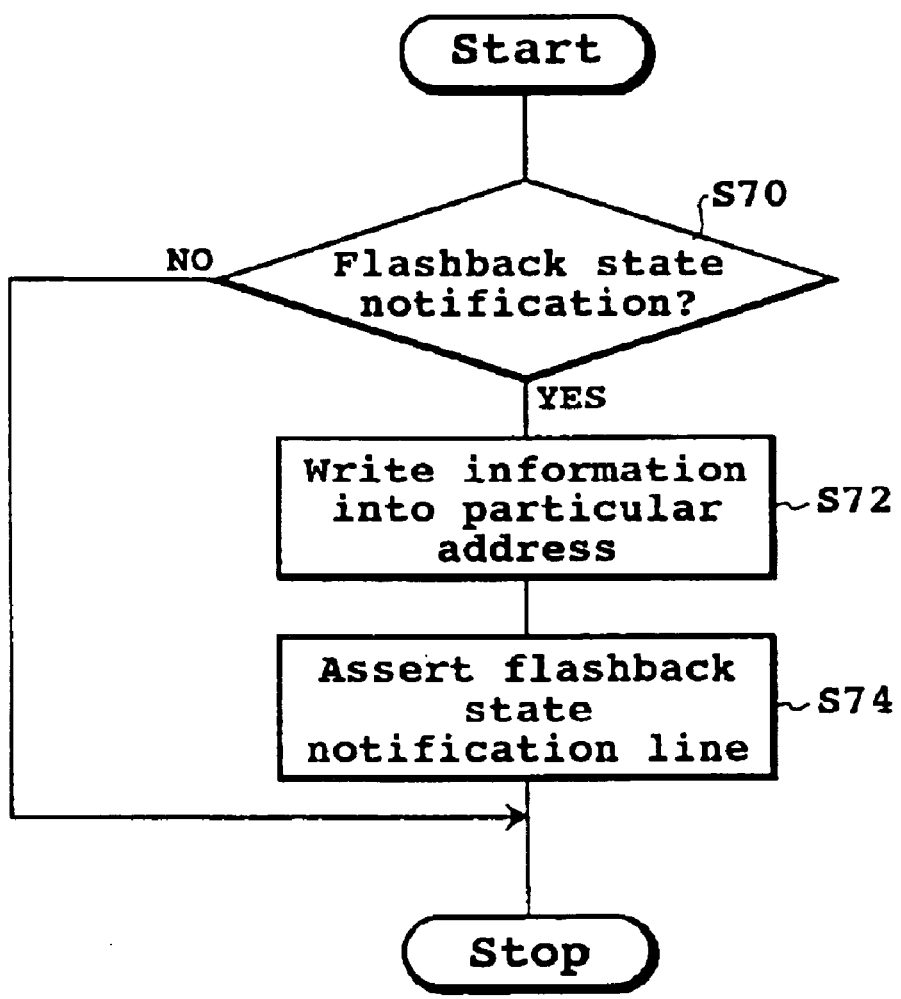
FIG. 13 is a flow chart illustrating operation of the main memory shown in FIG. 11.

FIG. 13 is a flow chart illustrating operation of the main memory 112#*i* shown in FIG. 11. In the following, operation of the system shown in FIG. 11 is described with reference to FIG. 13. Also in the present embodiment, it is assumed that a 0-subsystem 110#0 serves as the ACT system and a 1-subsystem 110#1 serves as the SBY system. Further, it is assumed that the watch dog timer 94#0 overflows due to a trouble of the 0-subsystem 110#0.

(B1) Similarly as in (B1) of the first embodiment, when the watch dog timer 94#0 overflows, the system control section 30#0 asserts the general reset lines 47#0 and 48#0 to generally reset the main memory 112#0 and the INF section 32#0. Further, the system control section 30#0 asserts the partial reset line 46#0 to partially reset the cache memory control section 24#0 and asserts the interrupt notification line 42#0.

(A2) Similarly as in (A2) of the first embodiment, if the interrupt notification line 42#0 is asserted, then interruption occurs with the MPU section 22#0, and the emergency control operation program is started. The emergency control operation program causes the MPU section 22#0 to instruct the cache memory control section 24#0 to perform flashback and then collect log information regarding the trouble and then write the log information into the main memory 112#0.

(C) Similarly as in (C) of the first embodiment, the cache memory control section 24#0 performs flashback to the main memory 112#0. The cache memory control section 24#0 asserts the flashback state notification line 114#0 when the flashback is completed.

(D) Operation of the Main Memory 112#0.

In step S70 in FIG. 13, the memory control section 120#0 checks whether or not the flashback state notification line 114#0 is asserted. If the flashback state notification line 114#0 is asserted, then the processing advances to step S72. If the flashback state notification line 114#0 is not asserted, then the processing is ended. In step S72, the memory control section 120#0 writes information representative of completion of flashback into the particular address area in the memory section 86#0. In step S74, the memory control section 120#0 asserts the flashback state notification line 116#0.

(B2) The system control section 30#0 outputs an ACT/SBY system changeover signal to the system confounding line 52 when the flashback state notification line 116#0 is asserted. At this time, since the flashback state notification line 116#0 is asserted after the information representative of completion of flashback is written into the main memory 112#0, the information representative of completion of flashback is read into the 1-subsystem 110#1 with a higher degree of certainty and the service can be continued with a higher degree of certainty by the 1-subsystem 110#1. According to the second embodiment described above, similar effects to those of the first embodiment can be achieved.

Third Embodiment

Figure 14:
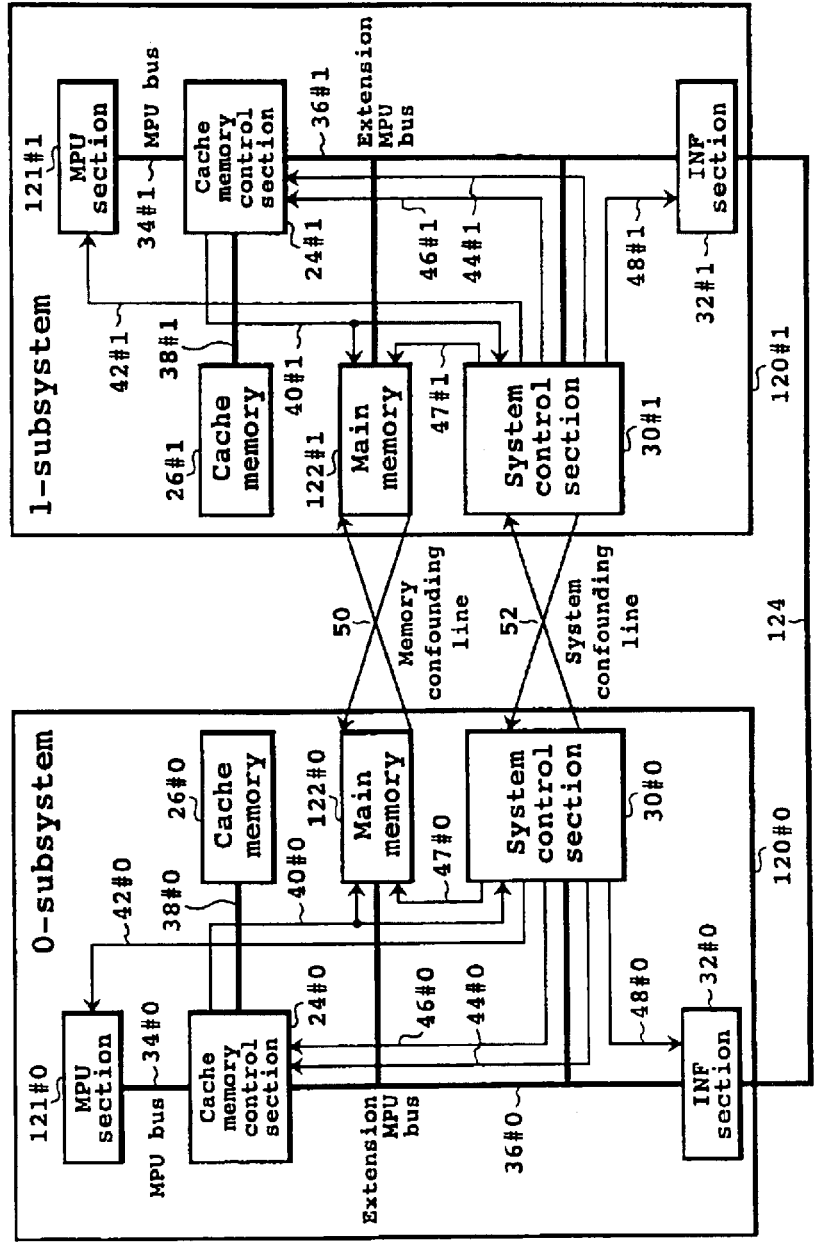
FIG. 14 is a block diagram of a dual system according to a third embodiment of the present invention.
Figure 15:
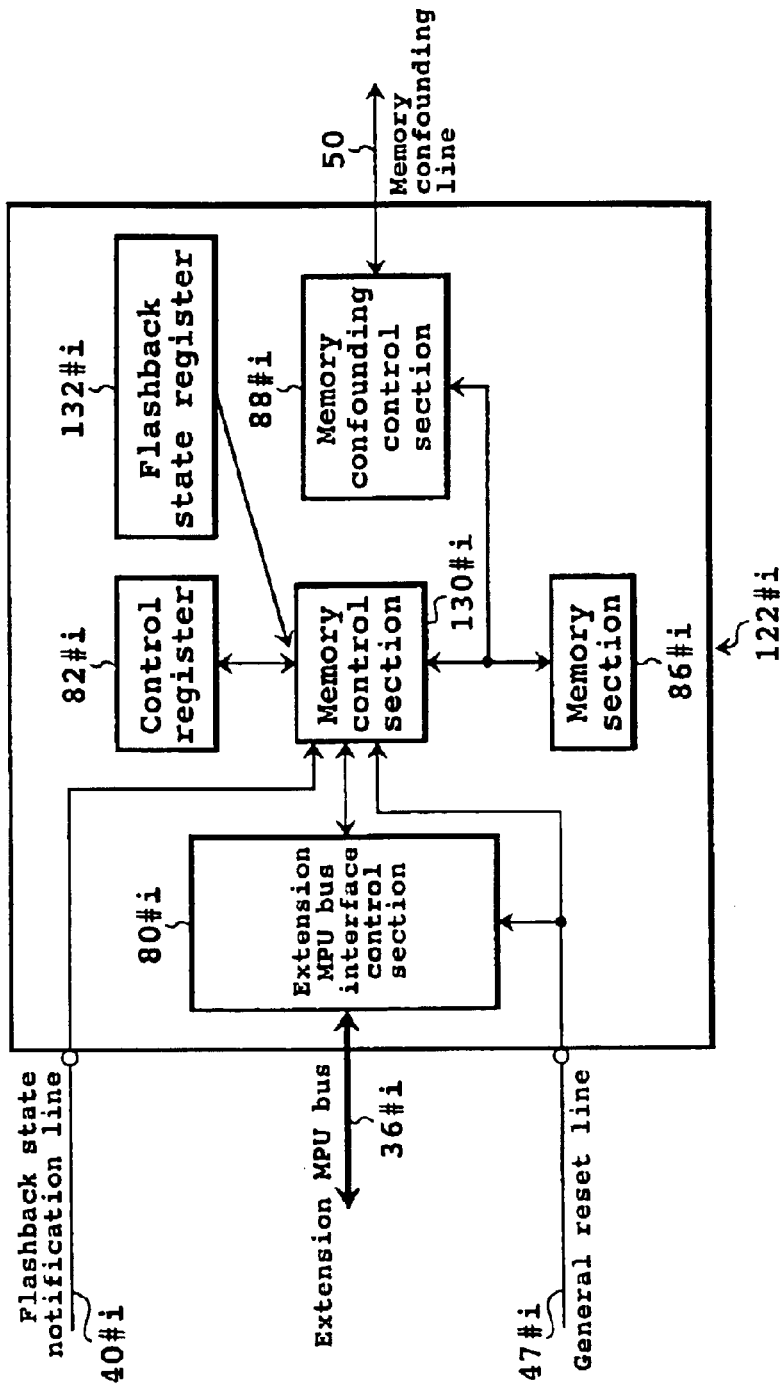
FIG. 15 is a block diagram of a main memory shown in FIG. 14.

FIG. 14 is a block diagram of a dual system according to a third embodiment of the present invention, and in FIG. 14, substantially like components to those in FIG. 2 are denoted by like reference characters. FIG. 15 is a block diagram of a main memory 122#*i* shown in FIG. 14, and in FIG. 15, substantially like components to those in FIG. 4 are denoted by like reference characters. A memory control section 130#*i* shown in FIG. 15 is different from the memory control section 84#*i* shown in FIG. 4 in that information of completion of flashback is written not into the memory section 86#*i* but into a flashback state register 132#*i*. Where information is written into the flashback state register 132#*i* while the information is excepted from the main memory 122#*i* in this manner, restriction when a program is loaded into the main memory 122#*i* is reduced.

An MPU section 121#*i* shown in FIG. 14 executes an emergency control operation program when the subsystem to which it belongs changes over from the SBY system to the ACT system, and the emergency control operation program is different from the emergency control operation program executed by the MPU section 22#*i* shown in FIG. 2 in that information representative of completion of flashback is read not from the main memory 122#*i* but from the flashback state register 132#*j* (j≠i) of the other subsystem. An other functioning section connection bus 124 shown in FIG. 14 interconnects the INF sections 32#0 and 32#1 and is different in this regard from the other functioning section connection buses 49#0 and 49#1 shown in FIG. 2 which do not have such restriction. The reason why the INF sections 32#0 and 32#1 are interconnected is that it is intended to allow the MPU section 121#*i* of the self subsystem 120#*i* to read information representative of completion of flashback from the flashback state register 132#*j* of the other subsystem 120#*j* (j t i) over the other functioning section connection bus 124. However, any structure may be employed only if it can read such information from the flashback state register 132#*j* of the other subsystem.

Figure 16:
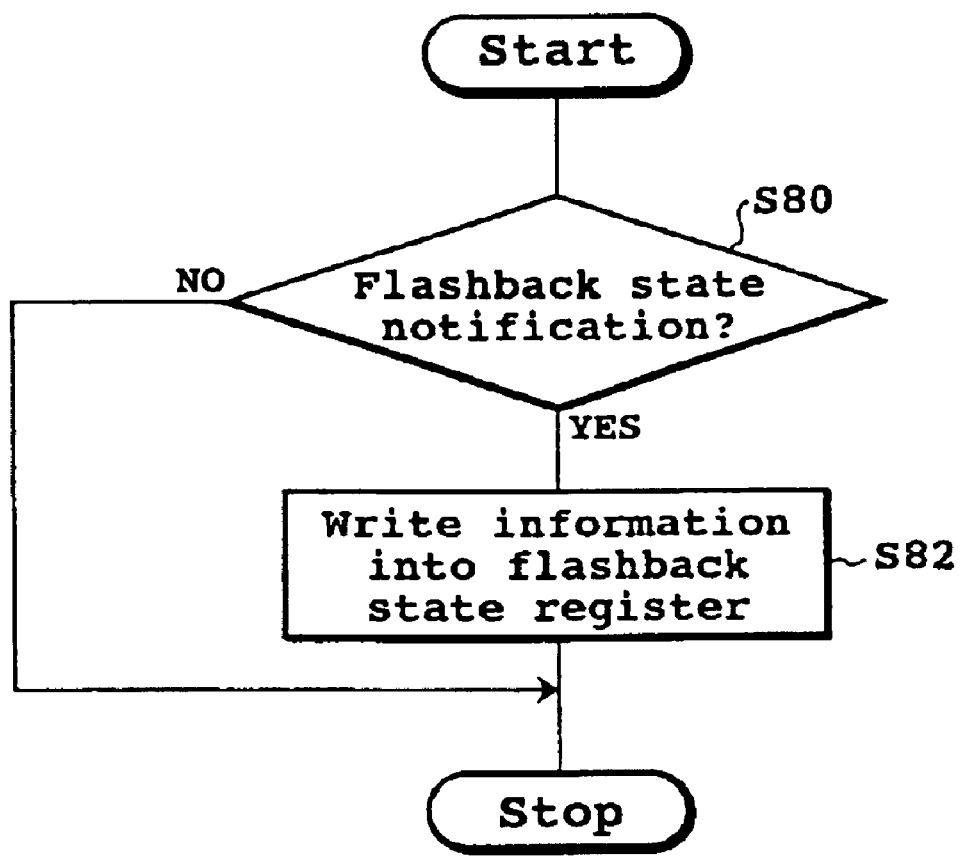
FIG. 16 is a flow chart illustrating operation of the main memory shown in FIG. 14.

FIG. 16 is a flow chart illustrating operation of the main memory 122#*i* shown in FIG. 14. In the following, operation of the system of FIG. 14 is described with reference to FIG. 16. Also in the present embodiment, it is assumed that a 0-subsystem 120#0 serves as the ACT system and a I-subsystem 120#1 serves as the SBY system. Further, it is assumed that the watch dog timer 94#0 overflows due to a trouble of the 0-subsystem 120#0.

(B1) The system control section 30#0 operates similarly as in (B1) of the first embodiment when the watch dog timer 94#0 overflows.

(A2) When the interrupt notification line 42#0 is asserted, then interruption occurs with the MPU section 121#0, and the MPU section 121#0 operates in a similar manner as in (A2) of the first embodiment.

(C) The cache memory control section 24#0 performs flashback to the main memory 122#0 similarly as in (C) of the first embodiment. The cache memory control section 24#0 asserts the flashback state notification line 40#0 when the flashback is completed.

(D) Operation of the Main Memory 122#0.

In step S80 in FIG. 16, the memory control section 130#0 checks whether or not the flashback state notification line 40#0 is asserted. If the flashback state notification line 40#0 is asserted, then the processing advances to step S82. If the flashback state notification line 40#0 is not asserted, then the processing is ended. In step S82, the memory control section 130#0 writes information representative of completion of flashback into the flashback state register 132#0.

(B2) The system control section 30#0 outputs an ACT/SBY system changeover signal to the system confounding line 52 in a similar manner as in (B2) of the first embodiment.

(B3) The system control section 30#1 operates in a similar manner as in (B3) of the first embodiment such that it asserts the interrupt notification line 42#1 when the ACT/SBY system changeover signal from the system confounding line 52 is received.

(A3) Operation of the MPU Section 121#1.

When the interrupt notification line 42#1 is asserted, interruption occurs with the MPU section 121#1, and the emergency control operation program is started. The emergency control operation program causes the MPU section 121#1 to read the information representing whether or not flashback has completed from the flashback state register 132#0 shown in FIG. 15 through the MPU bus 34#1, cache memory control section 24#1, extension MPU bus 36#1, INF section 32#1, other functioning section connection bus 124, INF section 32#0 and extension MPU bus 36#0. If the information represents that flashback has completed, then the emergency control operation program causes the MPU section 121#1 to start the service program to continue the service. If the information represents that flashback has not completed, then the emergency control operation program causes the MPU section 121#1 to perform IPL to interrupt the service and then resume the service. According to the third embodiment described above, similar effects to those of the first embodiment are achieved.

Fourth Embodiment

Figure 17:
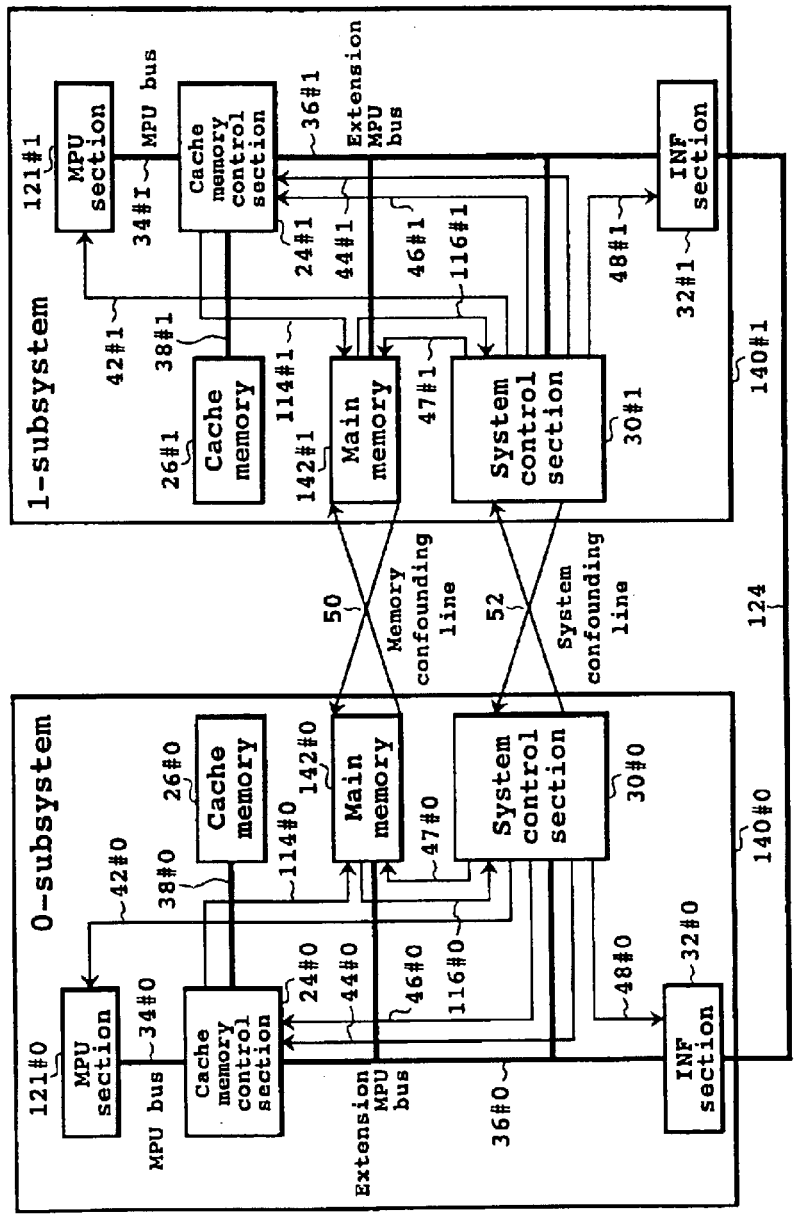
FIG. 17 is a block diagram of a dual system according to a fourth embodiment of the present invention.
Figure 18:
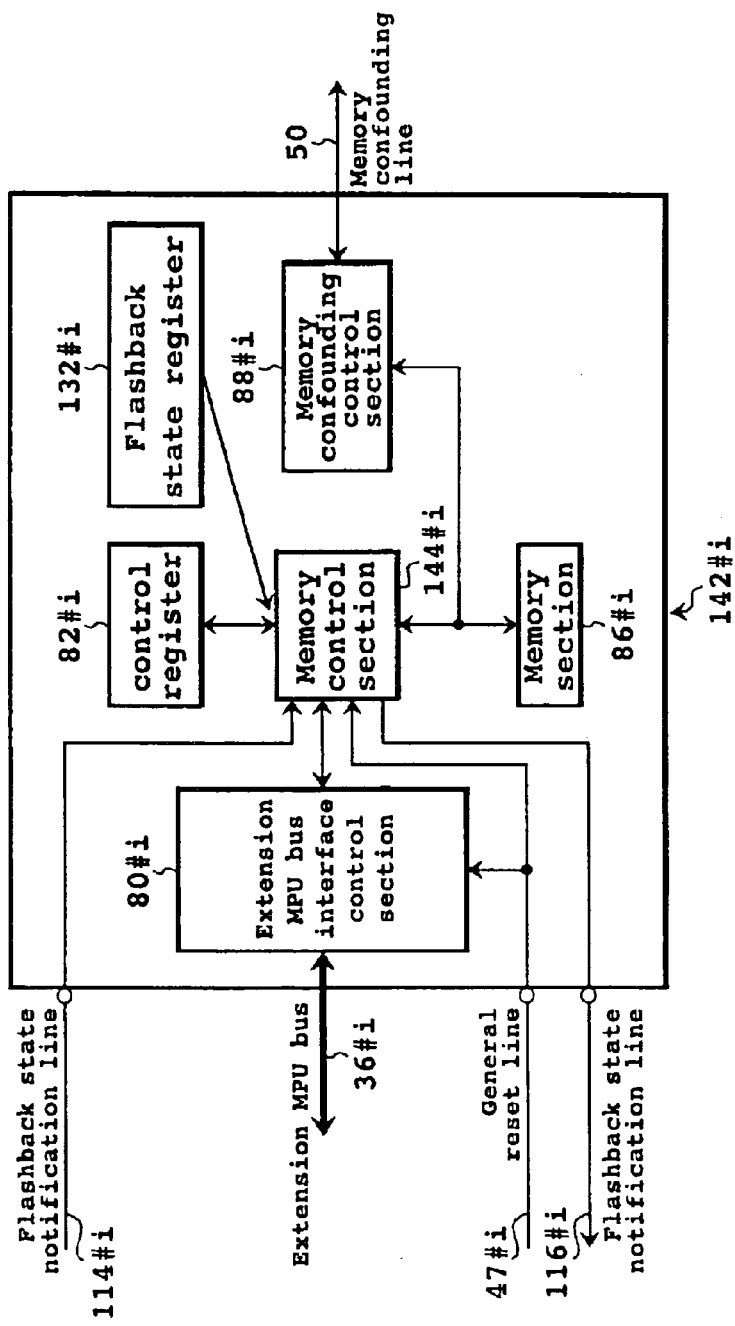
FIG. 18 is a block diagram of a main memory shown in FIG. 17.
Figure 19:
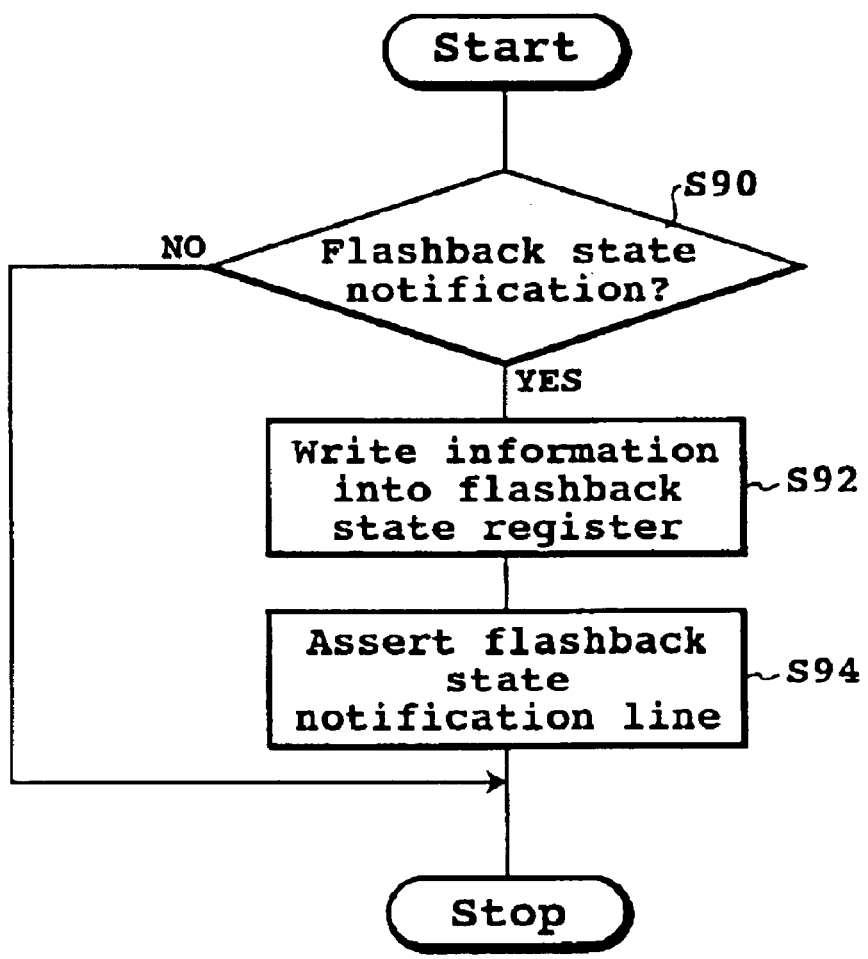
FIG. 19 is a flow chart illustrating operation of the main memory shown in FIG. 17.

FIG. 17 is a block diagram of a dual system according to a fourth embodiment of the present invention, and in FIG. 17, substantially like components to those in FIG. 11 or 14 are denoted by like reference characters. The dual system of FIG. 17 is a combination of the second embodiment shown in FIG. 11 and the third embodiment shown in FIG. 14. FIG. 18 is a block diagram of a main memory 142#*i* shown in FIG. 17, and in FIG. 18, substantially like components to those in FIG. 12 are denoted by like reference characters. A memory control section 144#*i* shown in FIG. 18 is different from the memory control section 120#*i* shown in FIG. 12 in that flashback completion information is written into the flashback state register 132#*i*. FIG. 19 is a flow chart illustrating operation of the main memory 142#*i* shown in FIG. 17. In the following, operation of the system of FIG. 17 is described with reference to FIG. 19. It is assumed that a 0-subsystem 140#0 serves as the ACT system and a 1-subsystem 140#1 serves as the SBY system, and the watch dog timer 94#0 overflows.

(B1) The system control section 30#0 operates similarly as in (B1) of the first embodiment if the watch dog timer 94#0 overflows.

(A2) If the interrupt notification line 42#0 is asserted, then interruption occurs with the MPU section 121#0, and the MPU section 121#0 operates in a similar manner as in (A2) of the first embodiment.

(C) The cache memory control section 24#0 operates similarly as in (C) of the first embodiment to perform flashback of the main memory 142#0. The cache memory control section 24#0 asserts the flashback state notification line 114#0 when the flashback is completed.

(D) Operation of the Main Memory 142#0.

In step S90 in FIG. 19, the memory control section 144#0 checks whether or not the flashback state notification line 114#0 is asserted. If the flashback state notification line 114#0 is asserted, then the processing advances to step S92. If the flashback state notification line 114#0 is not asserted, then the processing is ended. In step S92, the memory control section 144#0 writes information representative of completion of flashback into the flashback state register 132#0. In step S94, the memory control section 144#0 asserts the flashback state notification line 116#0.

(B2) The system control section 30#0 outputs an ACT/SBY system changeover signal to the system confounding line 52 in a similar manner as in (B2) of the first embodiment.

(B3) The system control section 30#1 of the SBY system operates in a similar manner as in (B3) of the first embodiment.

(A3) The MPU section 121#1 operates in a similar manner as in (A3) of the third embodiment. According to the fourth embodiment described above, similar effects to those of the first embodiment can be achieved.

Fifth Embodiment

Figure 20:
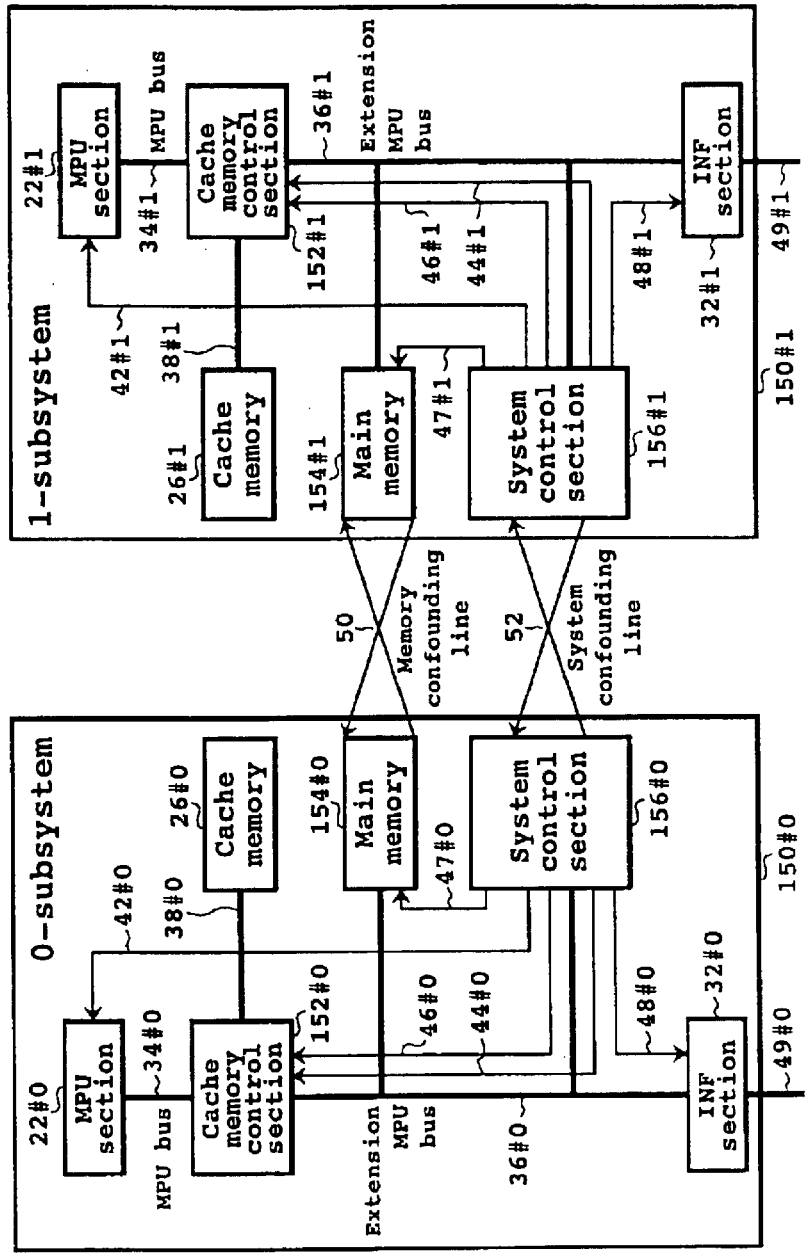
FIG. 20 is a block diagram of a dual system according to a fifth embodiment of the present invention.
Figure 21:
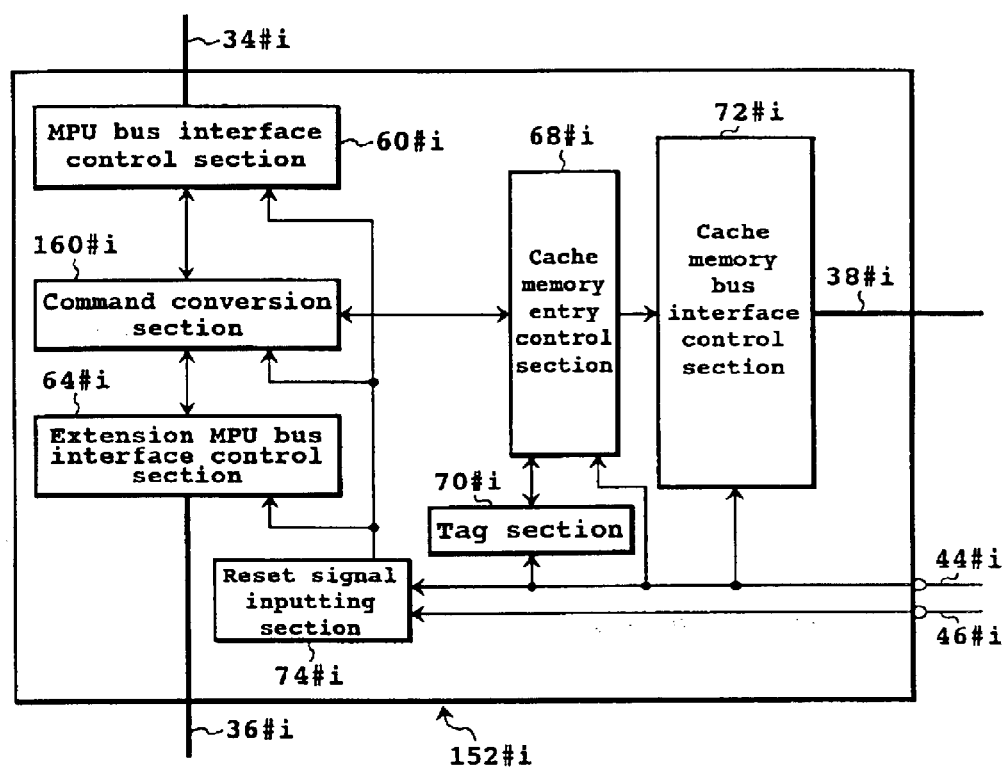
FIG. 21 is a block diagram of a cache memory control section shown in FIG. 20.
Figure 22:
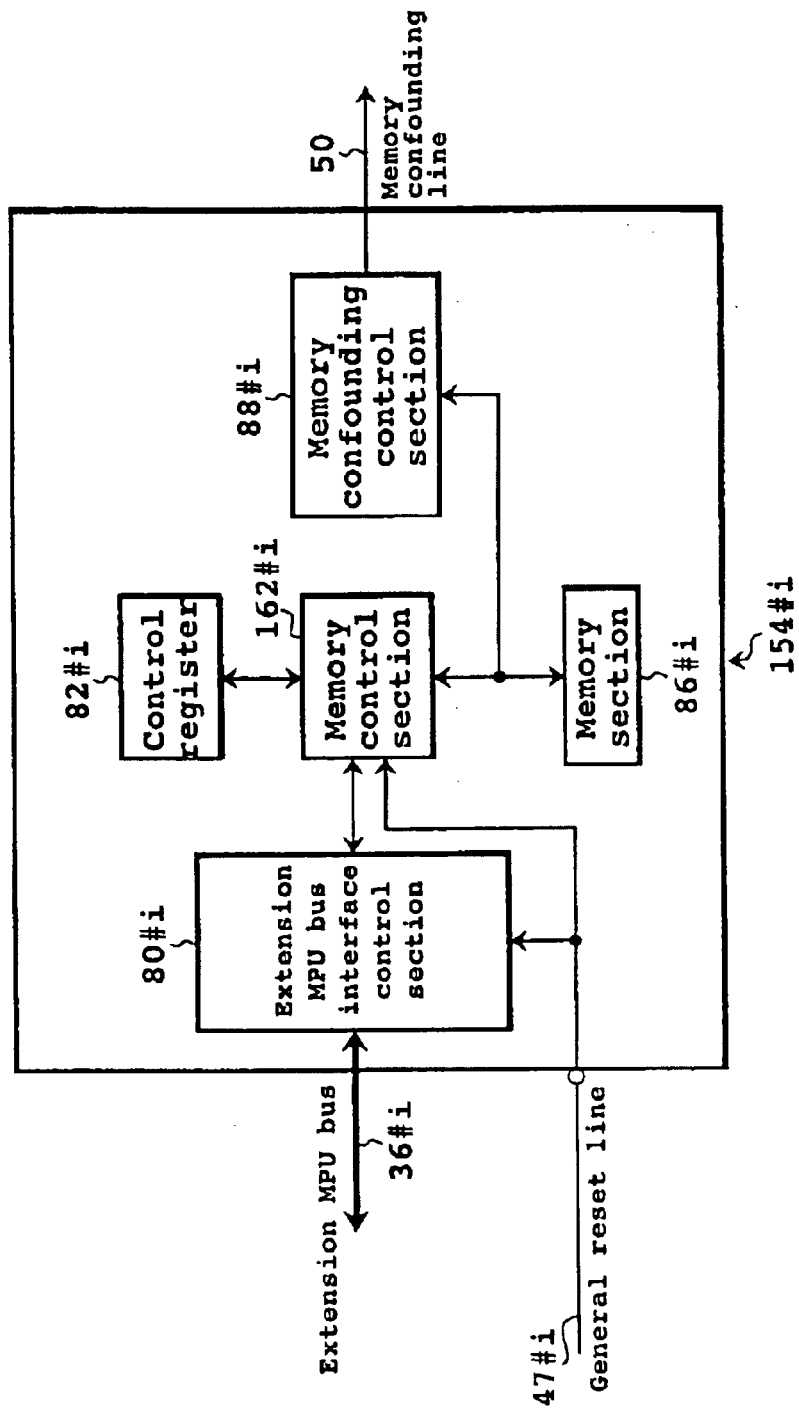
FIG. 22 is a block diagram of a main memory shown in FIG. 20.

FIG. 20 is a block diagram of a dual system according to a fifth embodiment of the present invention, and in FIG. 20, substantially like components to those in FIG. 2 are denoted by like reference characters. FIG. 21 is a block diagram of a cache memory control section 152#i shown in FIG. 20, and in FIG. 21, substantially like components to those in FIG. 3 are denoted by like reference characters. A command conversion section 160#i is different from the command conversion section 62#i shown in FIG. 3 in that it notifies a main memory 154#i and a system control section 156#i of completion of flashback not by asserting the flashback state notification line 40#0 but by outputting a flashback completion command to the extension MPU bus 36#i. FIG. 22 is a block diagram of the main memory 154#i shown in FIG. 20, and in FIG. 22, substantially like components to those in FIG. 4 are denoted by like reference characters. A memory control section 162#i is different from the memory control section 84#i shown in FIG. 4 in that, when it receives a flashback completion notification command, it writes information representative of completion of flashback into the particular address area of the memory section 96#i.

Figure 23:
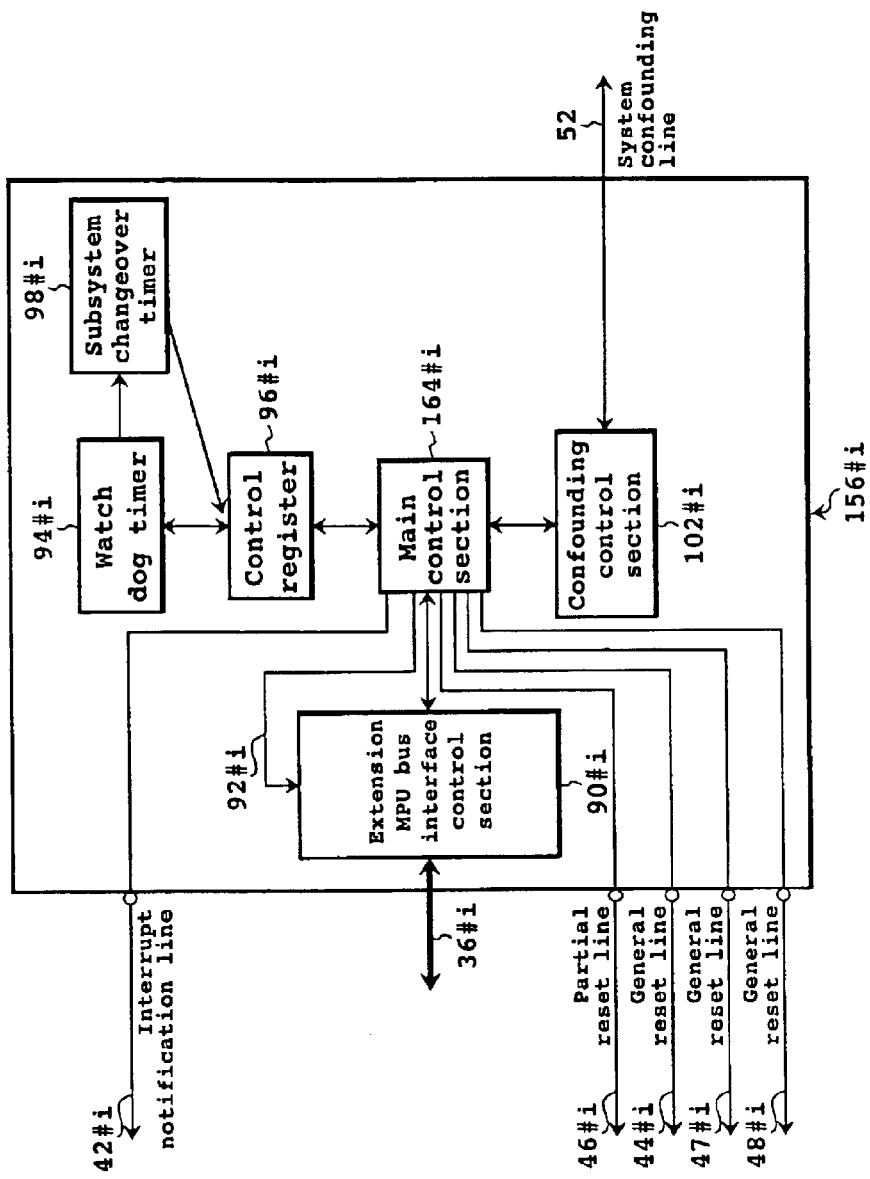
FIG. 23 is a block diagram of a system control section shown in FIG. 20.
Figure 24:
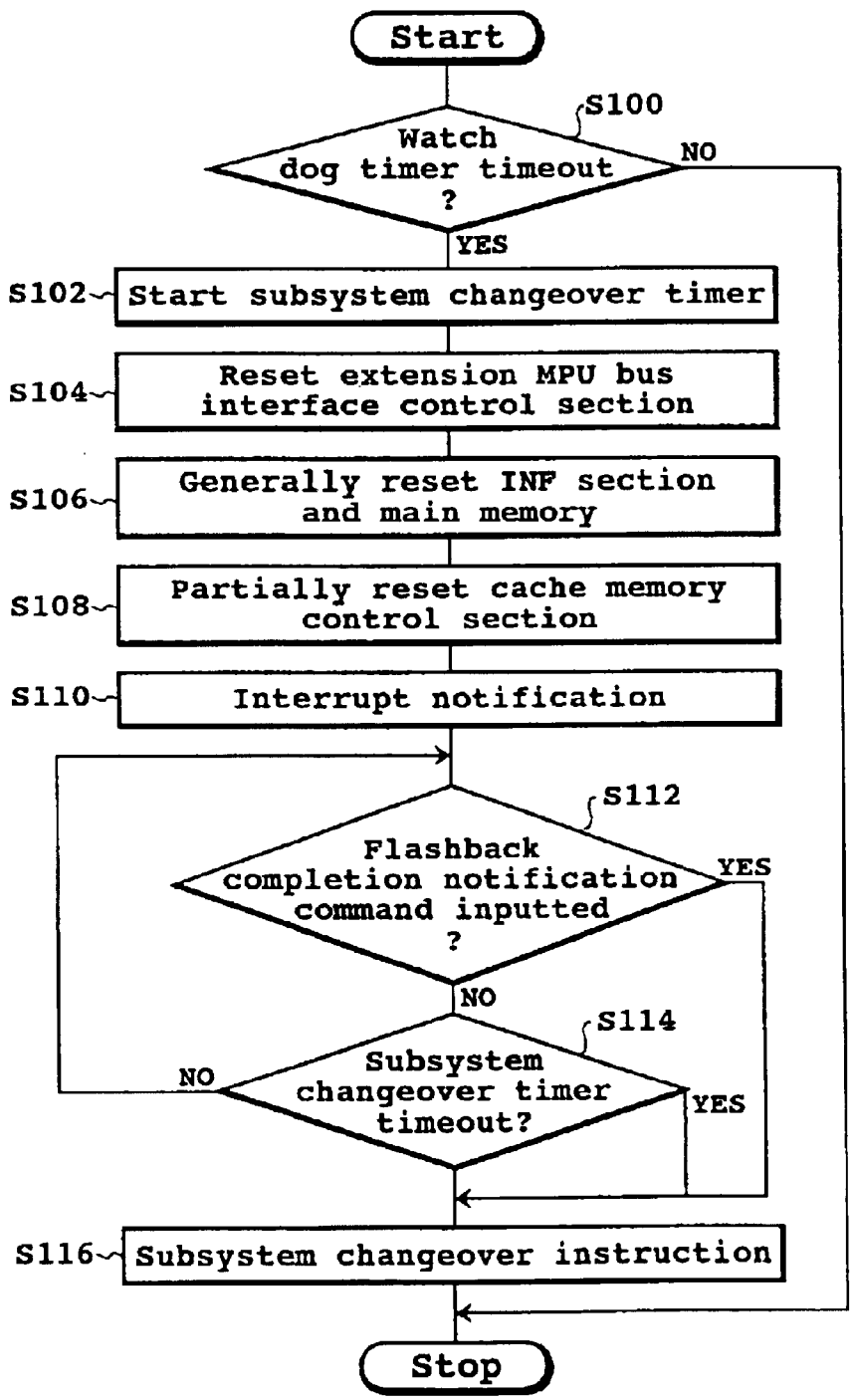
FIG. 24 is a flow chart illustrating operation of the system control section shown in FIG. 20.
Figure 25:
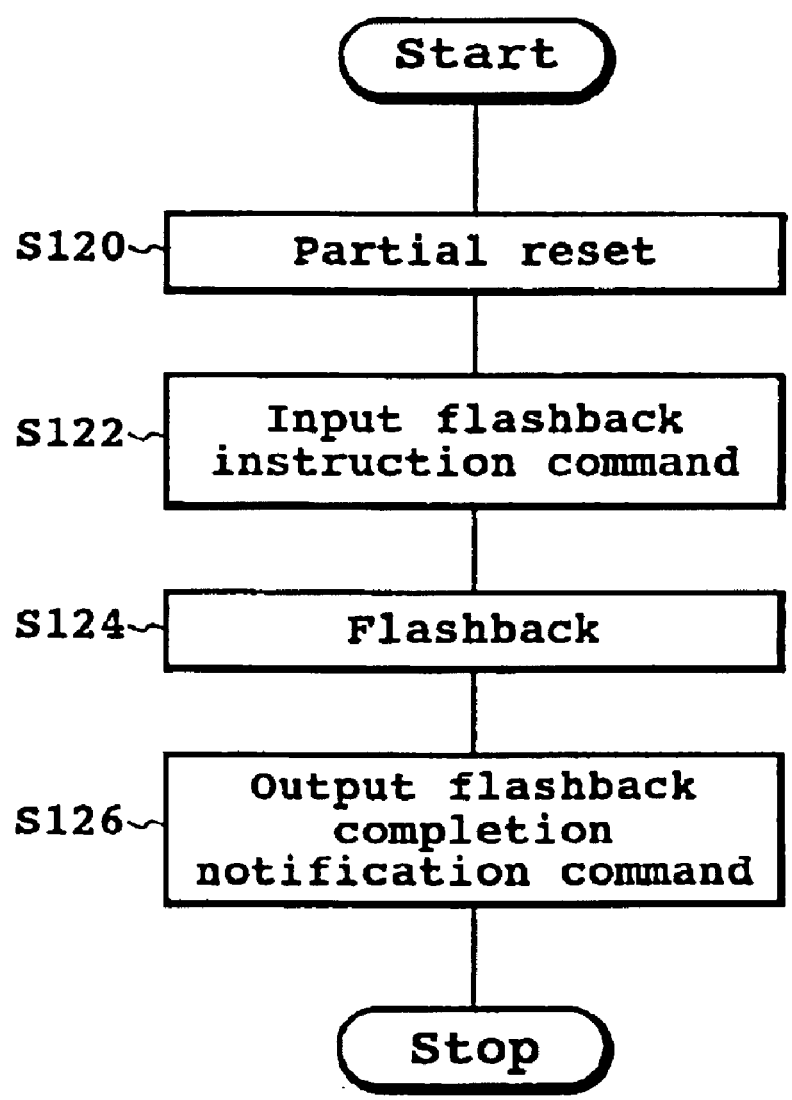
FIG. 25 is a flow chart illustrating operation of the cache memory control section shown in FIG. 20.
Figure 26:
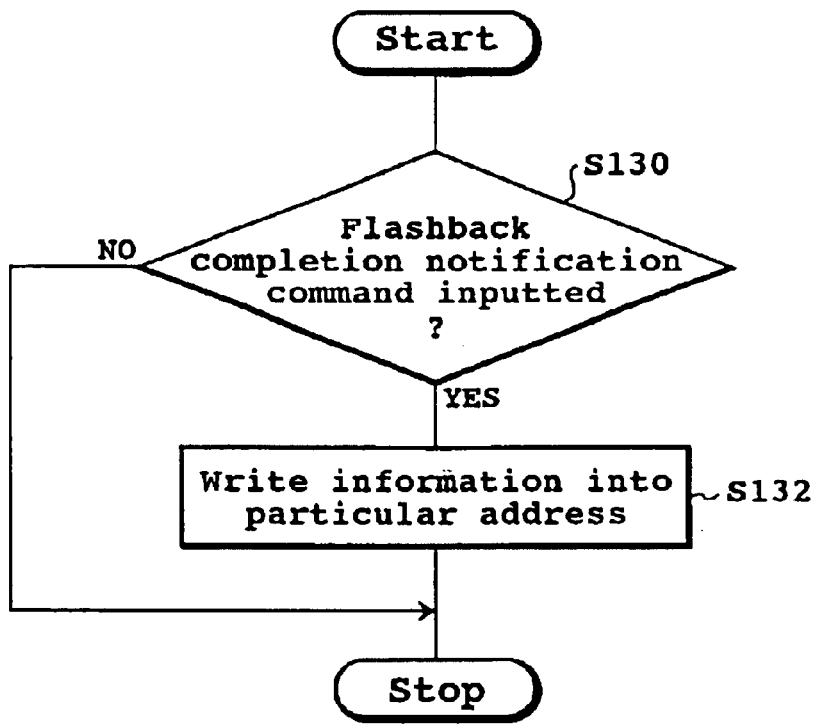
FIG. 26 is a flow chart illustrating operation of the main memory shown in FIG. 20.

FIG. 23 is a block diagram of the system control section 156#i shown in FIG. 20, and substantially like components to those in FIG. 5 are denoted by like reference characters. A main control section 164#i is different from the main control section 100#i shown in FIG. 5 in that, when it receives a flashback completion notification command, it instructs the confounding control section 102#i to perform ACT/SBY system changeover. FIG. 24 is a flow chart illustrating operation of the system control section 156#i shown in FIG. 20. FIG. 25 is a flow chart illustrating operation of the cache memory control section 152#i shown in FIG. 20. FIG. 26 is a flow chart illustrating operation of the main memory 154#i shown in FIG. 20. In the following, operation of the system of FIG. 20 is described with reference to the figures mentioned above. It is assumed that a 0-subsystem 150#0 serves as the ACT system and a 1-subsystem 150 11 serves as the SBY system, and the watch dog timer 94#0 overflows.

(B1) The system control section 156#0 performs processing in steps S100 to S110 illustrated in FIG. 24 in a similar manner as in (B i) of the first embodiment if the watch dog timer 94#0 overflows.

(A2) When the interrupt notification line 42#0 is asserted, then interruption occurs with the MPU section 22#0, and the MPU section 22#0 operates in a similar manner as in (A2) of the first embodiment.

(C) The cache memory control section 152#0 performs processing in steps S120 to S124 illustrated in FIG. 25 in a similar manner as in (C) of the first embodiment. In step S126, when the flashback is completed, the command conversion section 160#i outputs a flashback completion notification command to the extension MPU bus 36#i through the extension MPU bus interface control section 64#i. The flashback completion notification command is received by the main memory 154#i and the system control section 156#i and is, if it is recognizable, recognized based on, for example, a unique command code though not particularly limited to this. Further, the flashback completion notification command may otherwise be transmitted together with information representative of a destination of the reception side such that it may be transmitted first to the main memory 154#0 and then to the system control section 156#0. By this, ACT/SBY changeover can be performed with a higher degree of certainty after information representative of completion of flashback is written into a particular address of the main memory 154#0.

(D) In step S130 in FIG. 26, the memory control section 162#0 checks whether or not the flashback completion notification command has been inputted. If the flashback completion notification command has been inputted, then the processing advances to step S132. If the flashback completion notification command has not been inputted, then the processing is ended. In step S132, the memory control section 162#0 writes information representative of completion of flashback into the particular address area of the memory section 86#0.

(B2) The main control section 164#0 in the system control section 156#0 checks, in step S112 in FIG. 24, whether or not the flashback completion notification command has been inputted. If the flashback completion notification command has been inputted, then the processing advances to step S116. If the flashback completion notification command has not been inputted, then the processing advances to step S114. In steps S114 to S116, the main control section 164#0 outputs an ACT/SBY system changeover signal to the system confounding line 52 in a similar manner as in (B2) of the first embodiment.

(B3) The system control section 156#1 of the SBY system operates in a similar manner as in (B3) of the first embodiment.

(A3). The MPU section 22#1 operates in a similar in manner as in (A1) of the first embodiment. According to the fifth embodiment described above, similar effects to those of the first embodiment are achieved.

Sixth Embodiment

Figure 27:
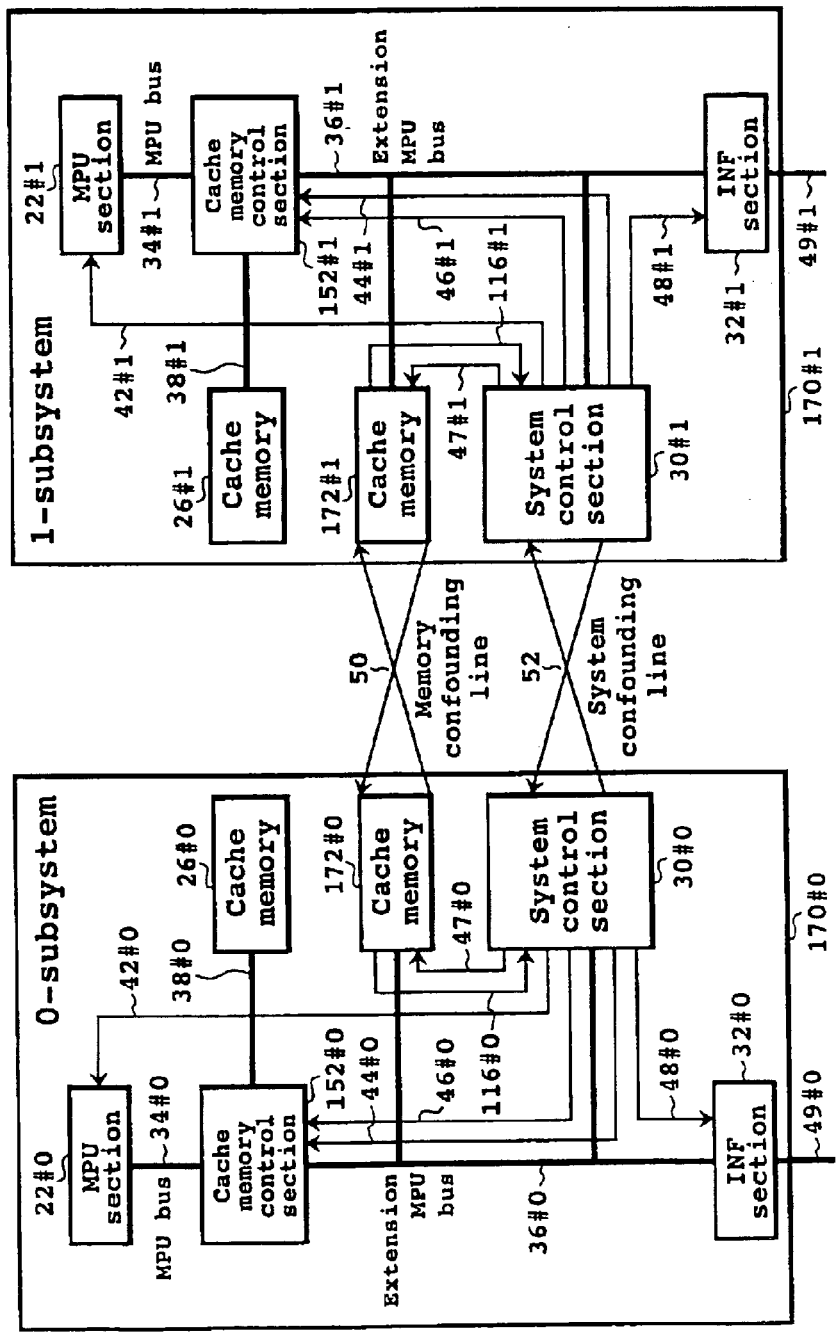
FIG. 27 is a block diagram of a dual system according to a sixth embodiment of the present invention.
Figure 28:
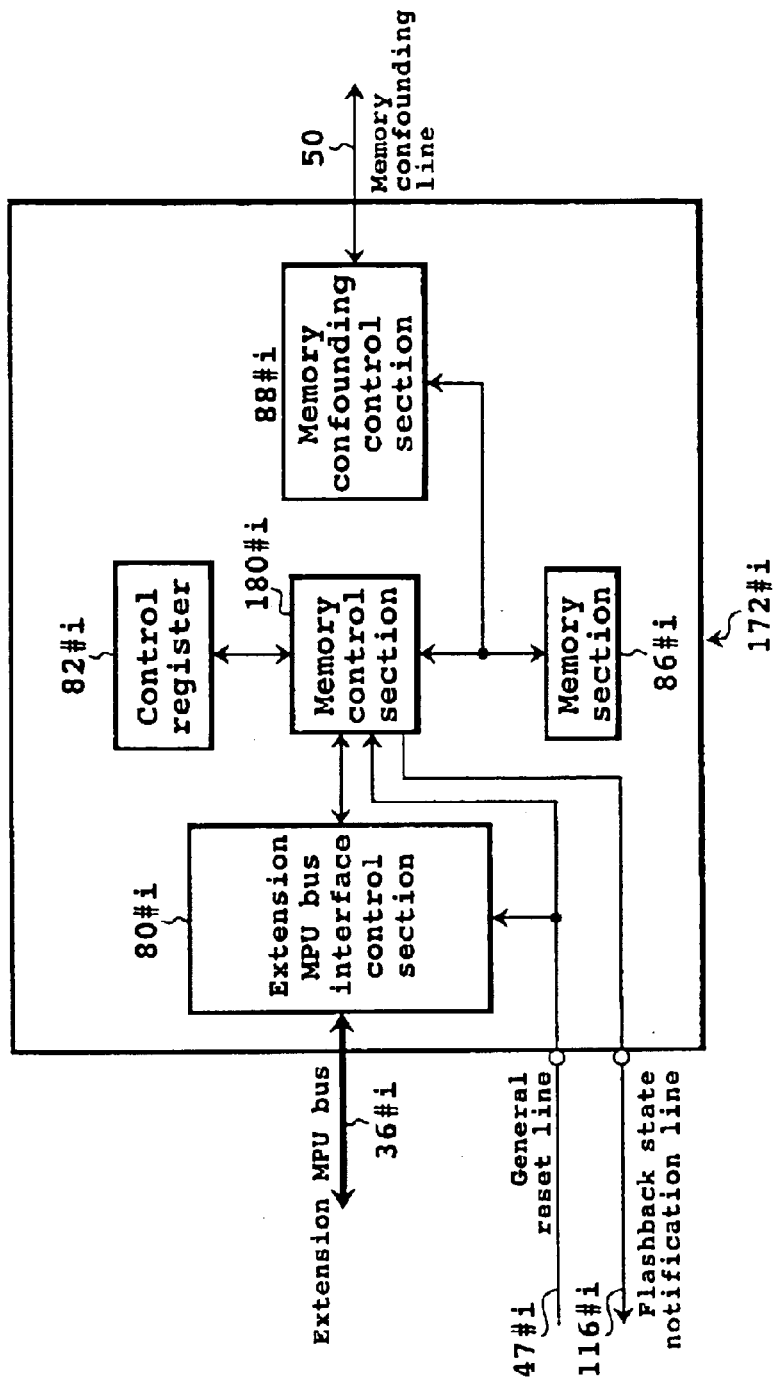
FIG. 28 is a block diagram of a main memory shown in FIG. 27.
Figure 29:
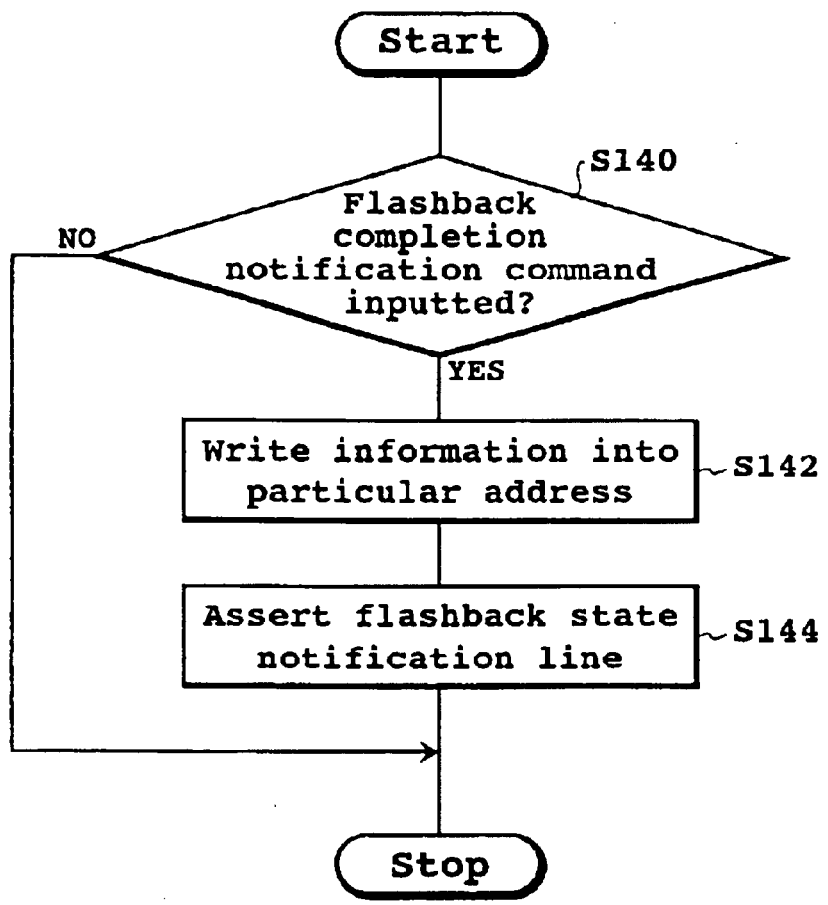
FIG. 29 is a flow chart illustrating operation of the main memory shown in FIG. 27.

FIG. 27 is a block diagram of a dual system according to a sixth embodiment of the present invention, and in FIG. 27, substantially like components to those in FIG. 11 or 20 are denoted by like reference characters. The present embodiment is a combination of the second embodiment of FIG. 11 and the fifth embodiment of FIG. 20. FIG. 28 is a block diagram of a main memory 172#i shown in FIG. 27, and in FIG. 27, substantially like components to those in FIG. 12 or 22 are denoted by like reference characters. A memory control section 180#i is different from the memory control section 120#i or 162#i shown in FIG. 12 or 22 in that, if a flashback completion notification command is inputted to the memory control section 180#i, then the memory control section 180#i writes information representative of completion of flashback into the particular address area of the memory section 86#i and asserts the flashback state notification line 116#i. FIG. 29 is a flow chart illustrating operation of the main memory 172#i shown in FIG. 27. In the following, operation of the system of FIG. 27 is described with reference to the figures mentioned above. It is assumed that a 0-subsystem 170#0 serves as the ACT system and a 1-subsystem 170#1 serves as the SBY system, and the watch dog timer 94#0 overflows.

(B1) The system control section 30#0 operates in a similar manner as in (B1) of the first embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 152#0 operates in a similar manner as in (C) of the fifth embodiment.

(D) In steps S140 and S142 in FIG. 29, the memory control section 180#0 performs processing similar to that in (D) of the fifth embodiment. In step S144, the memory control section 180#0 asserts the flashback state notification line 116#*i* in a similar manner as in (D) of the second embodiment.

(B2) The system control section 30#0 operates in a similar manner as in (B2) of the first embodiment.

(B3) The system control section 30#1 of the SBY system operates in a similar manner as in (B3) of the first embodiment.

(A3) The MPU section 22#1 operates in a similar manner as in (A3) of the first embodiment. According to the sixth embodiment described above, similar effects to those of the first embodiment are achieved.

Seventh Embodiment

Figure 30:
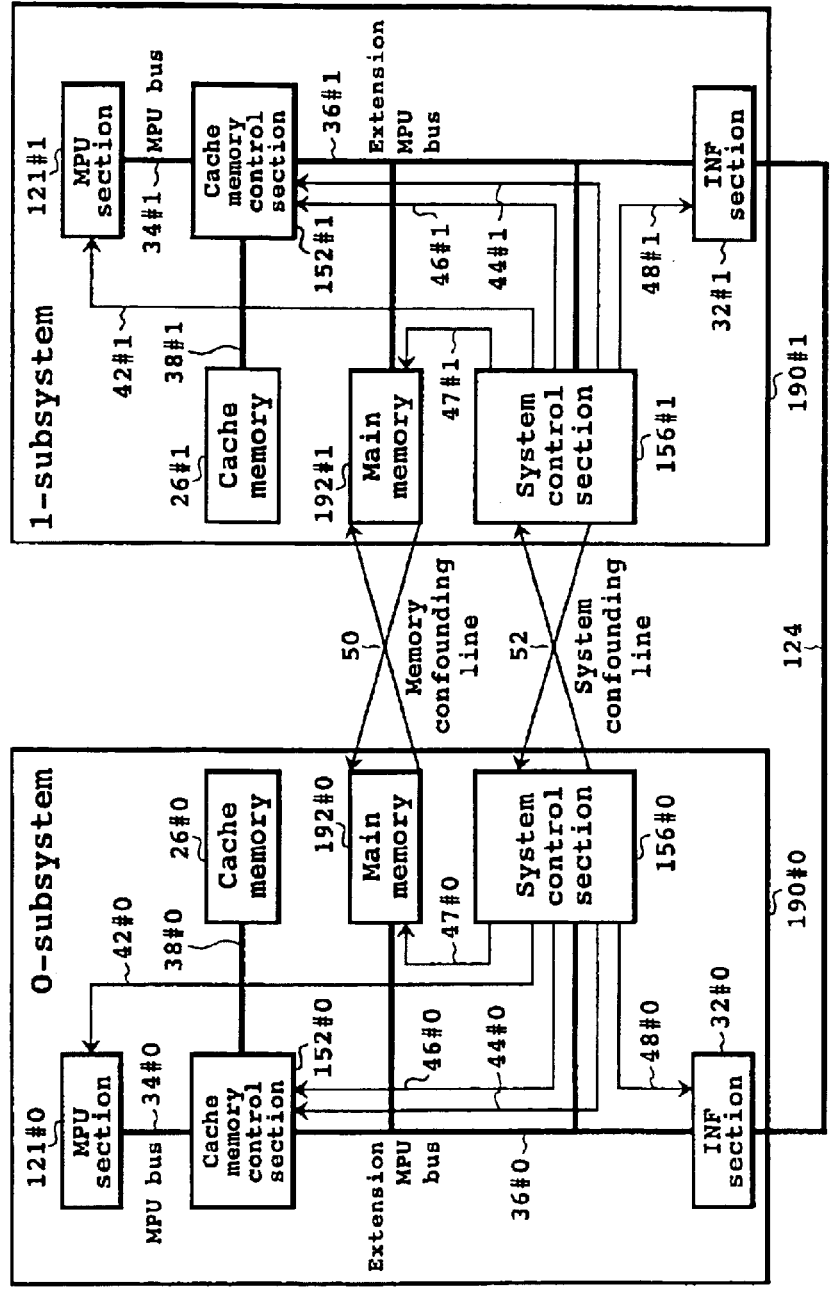
FIG. 30 is a block diagram of a dual system according to a seventh embodiment of the present invention.
Figure 31:
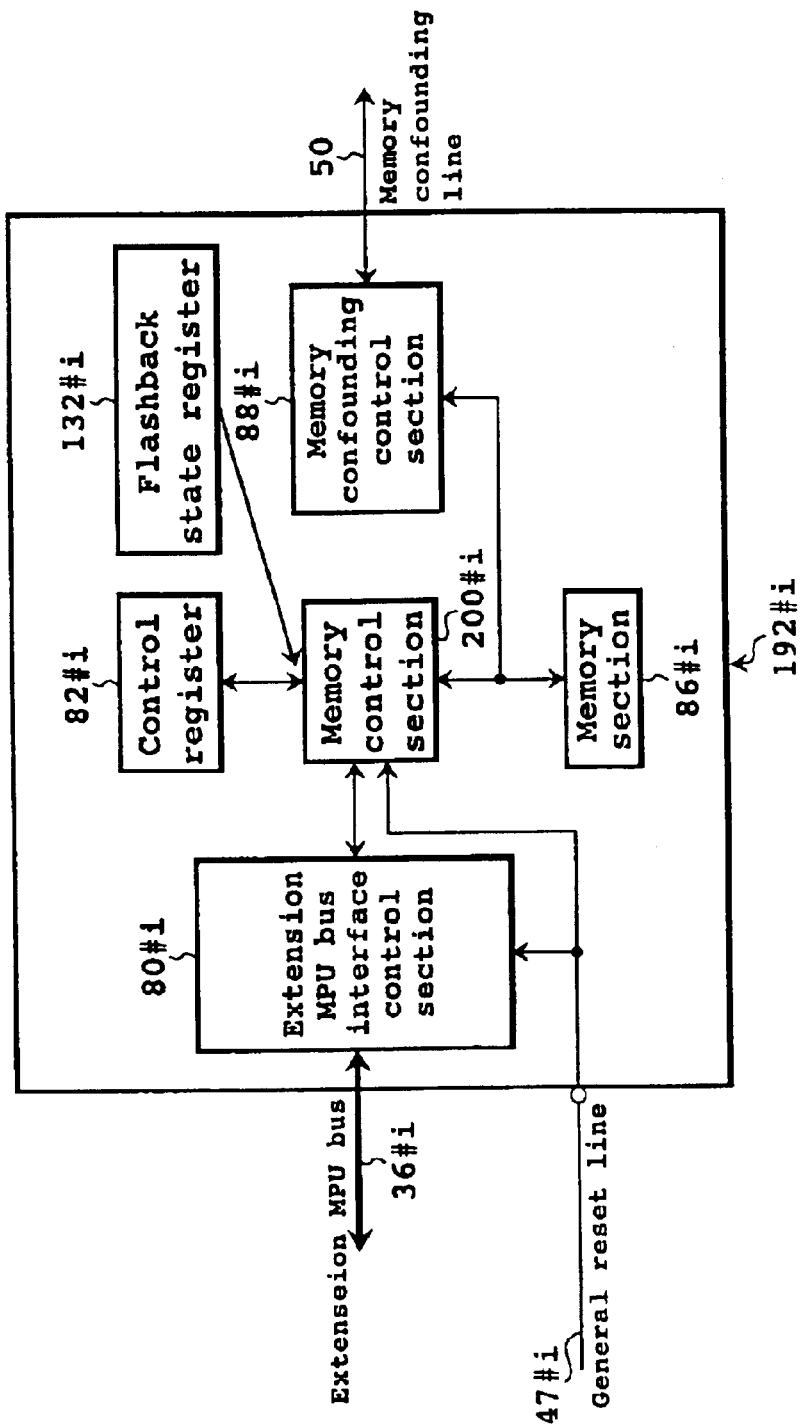
FIG. 31 is a block diagram of a main memory shown in FIG. 30.

FIG. 30 is a block diagram of a dual system according to a seventh embodiment of the present invention, and in FIG. 30, substantially like components to those in FIG. 14 or 20 are denoted by like reference characters. The present embodiment is a combination of the third embodiment of FIG. 14 and the fifth embodiment of FIG. 20. FIG. 31 is a block diagram of a main memory 192#*i* shown in FIG. 30, and in FIG. 31, substantially like components to those in FIG. 15 or 22 are denoted by like reference characters. A memory control section 200#*i* is different from the memory control section 130#*i* or 162#*i* shown in FIG. 15 or 22 in that, if a flashback completion notification command is inputted to the memory control section 200#*i*, then the memory control section 200#*i* writes information representative of completion of flashback into the flashback state register 132#*i*. In the following, operation of the system of FIG. 30 is described with reference to the drawings. It is assumed that a 0-subsystem 190#0 serves as the ACT system and a 1-subsystem 190#1 serves as the SBY system, and the watch dog timer 94#0 overflows.

(B1) The system control section 156#0 operates in a similar manner as in (B1) of the first embodiment.

(A2) When the interrupt notification line 42#0 is asserted, interruption occurs with the MPU section 121#0, and the MPU section 121#0 operates in a similar manner as in (A2) of the first-embodiment.

(C) The cache memory control section 152#0 operates in a similar manner as in (C) of the first embodiment.

(D) When the memory control section 200#0 shown in FIG. 31 receives a flashback completion notification command, then it writes information representative of completion of flashback into the flashback state register 132#*i*.

(B2) The system control section 156#0 operates in a similar manner as in (B2) of the fifth embodiment.

(B3) The system control section 156#1 of the SBY system operates in a similar manner as in (B3) of the first embodiment.

(A3) The MPU section 121#1 operates in a similar manner as in (A3) of the first embodiment. According to the seventh embodiment described above, similar effects to those of the first embodiment are achieved.

Eighth Embodiment

Figure 32:
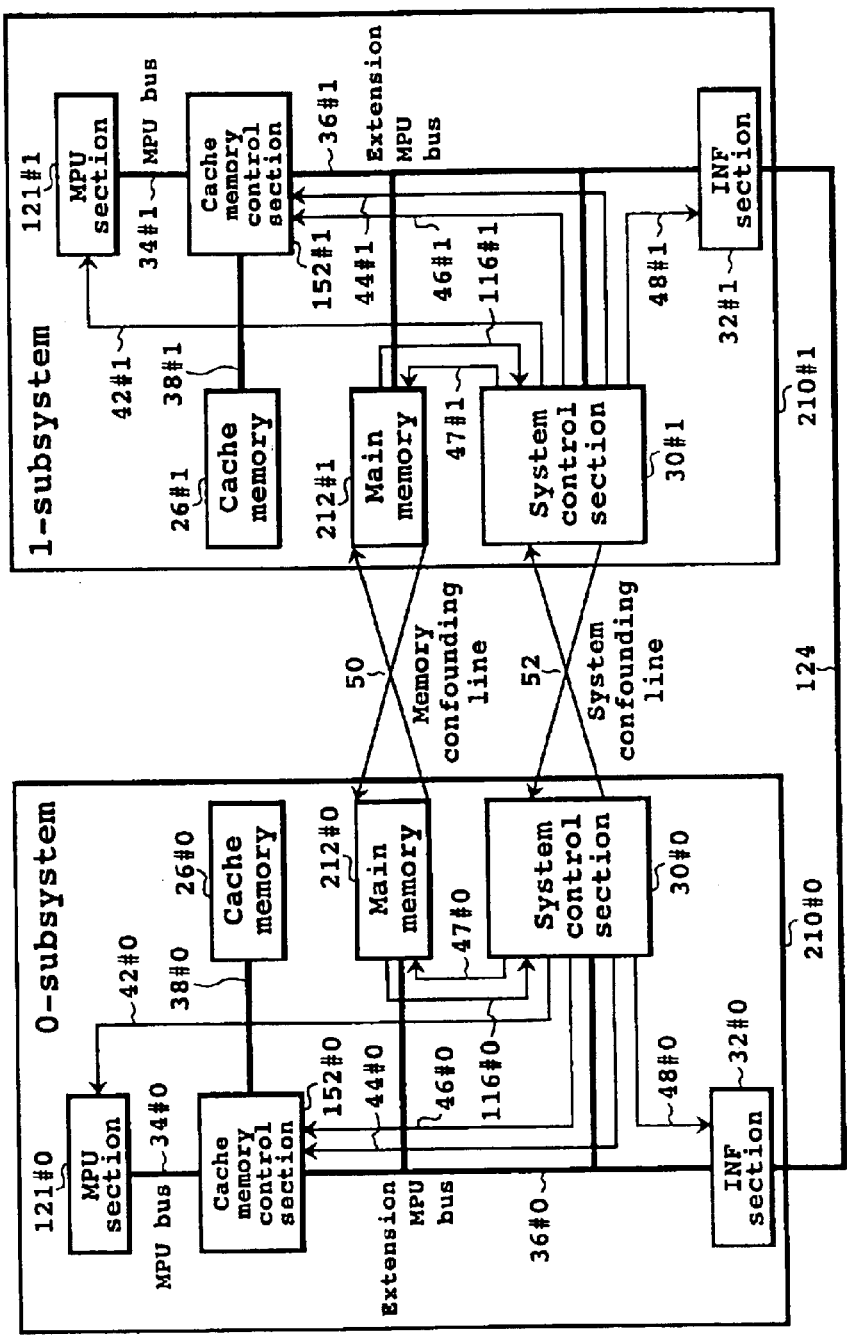
FIG. 32 is a block diagram of a dual system according to an eighth embodiment of the present invention.
Figure 33:
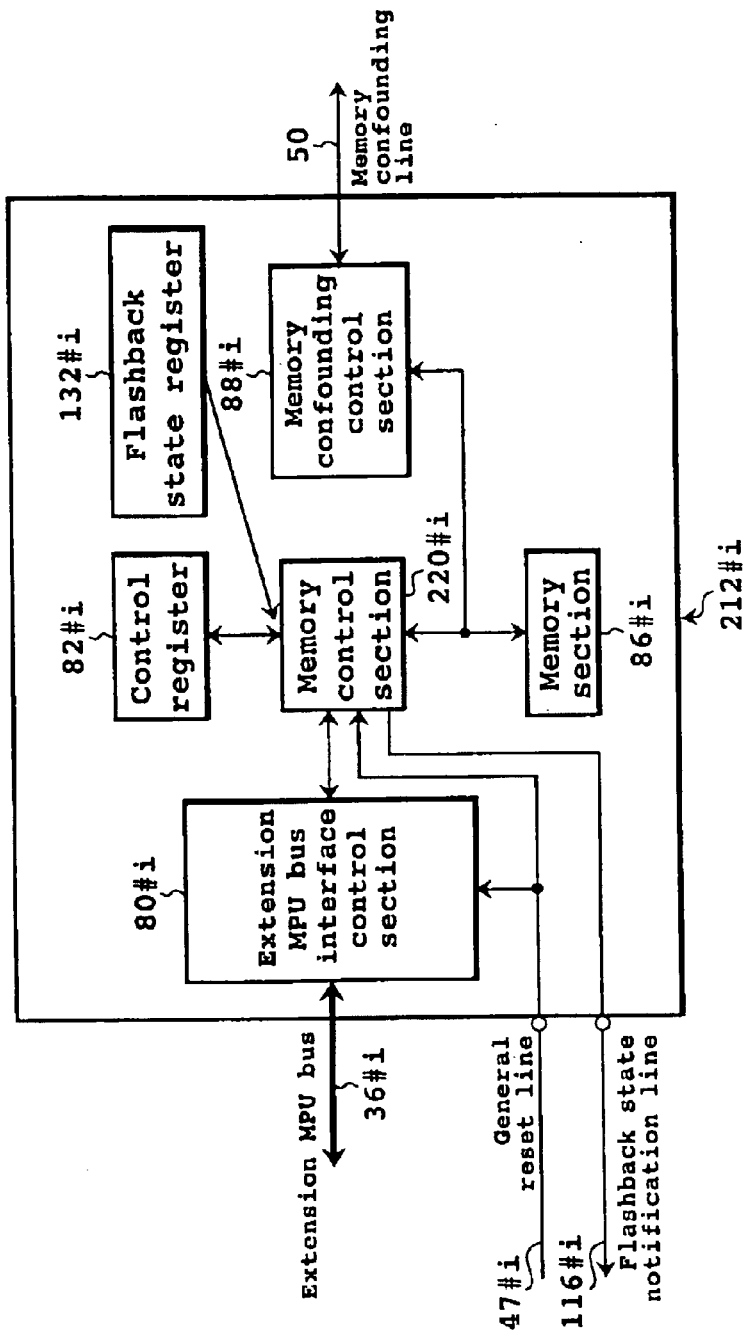
FIG. 33 is a block diagram of a main memory shown in FIG. 32.

FIG. 32 is a block diagram of a dual system according to an eighth embodiment of the present invention, and in FIG. 32, substantially like components to those in FIG. 14 or 27 are denoted by like reference characters. The present embodiment is a combination of the third embodiment of FIG. 14 and the sixth embodiment of FIG. 27. FIG. 33 is a block diagram of a main memory 212#*i* shown in FIG. 32, and in FIG. 33, substantially like components to those in FIG. 15 or 28 are denoted by like reference characters. A memory control section 220#*i* is different from the memory control section 130#*i* or 180#*i* shown in FIG. 15 or 28 in that, if a flashback completion notification command is inputted to the memory control section 220#*i*, then the memory control section 220#*i* writes information representative of completion of flashback into the flashback state register 132#*i* and asserts the flashback state notification line 116#*i*. In the following, operation of the system of FIG. 32 is described with reference to the drawings. It is assumed that a 0-subsystem 210#0 serves as the ACT system and a 1-subsystem 210#1 serves as the SBY system, and the watch dog timer 94#0 overflows.

(B1) The system control section 30#0 operates in a similar manner as in (B1) of the first embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 152#0 operates in a similar manner as in (C) of the fifth embodiment.

(D) When the memory control section 220#0 shown in FIG. 33 receives a flashback completion notification command, it writes information representative of completion of flashback into the flashback state register 132#*i* and asserts the flashback state notification line 116#0.

(B2) The system control section 30#0 operates in a similar manner as in (B2) of the fifth embodiment.

(B3) The system control section 30#1 of the SBY system operates in a similar manner as in (B3) of the first embodiment.

(A3) The MPU section 121#1 operates in a similar manner as in (A3) of the third embodiment. According to the eighth embodiment described above, similar effects to those of the first embodiment are achieved.

Ninth embodiment

Figure 34:
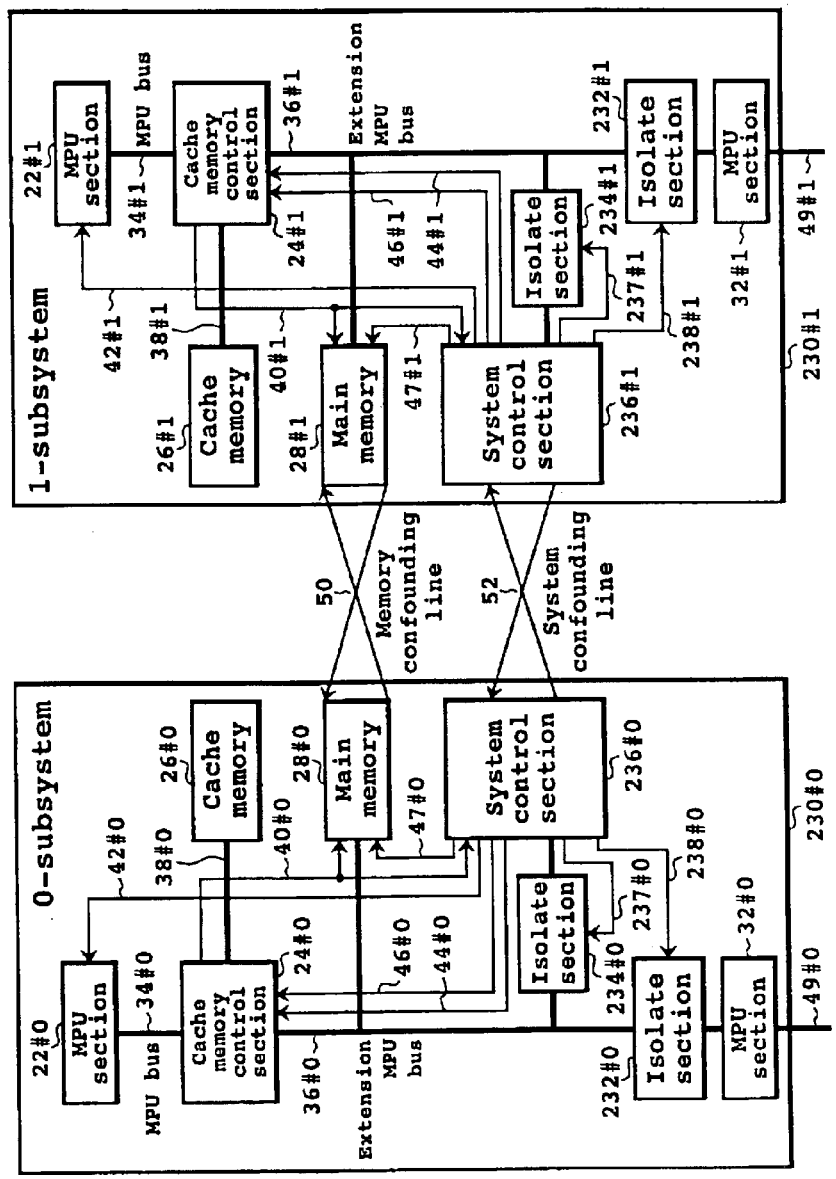
FIG. 34 is a block diagram of a dual system according to a ninth embodiment of the present invention.
Figure 35:
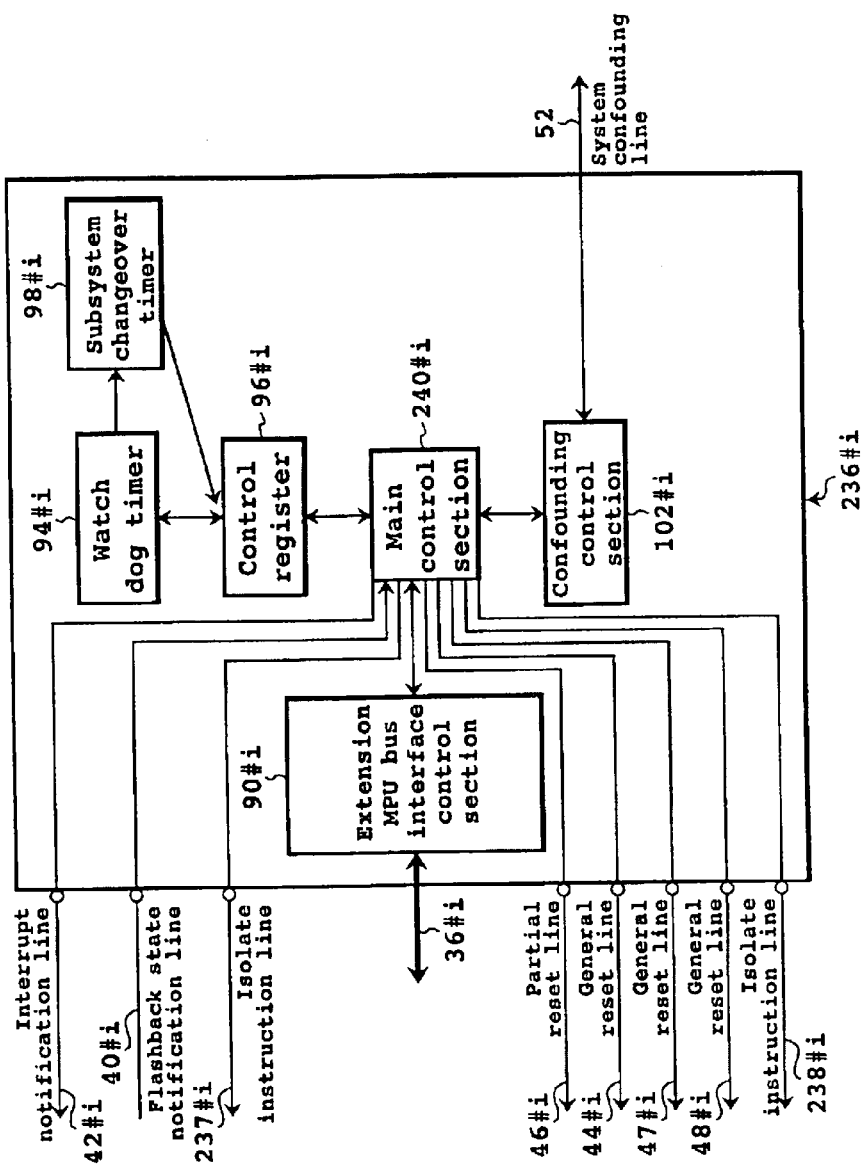
FIG. 35 is a block diagram of a system control section shown in FIG. 34.

FIG. 34 is a block diagram of a dual system according to a ninth embodiment of the present invention, and in FIG. 34, substantially like components to those in FIG. 2 are denoted by like reference characters. An i-subsystem 230#*i* of FIG. 34 is different from the i-subsystem 20#*i* shown in FIG. 2 in that a system control section 236#*i* and the INF section 32#*i* are not reset over a general reset line, but a pair of isolate sections 232#*i* and 234#*i* are provided to compulsorily cancel locking of the extension MPU bus 36#*i*. FIG. 35 is a block diagram of the system control section 236#*i*, and in FIG. 35, substantially like components to those in FIG. 5 are denoted by like reference characters. A main control section 240#*i* is different from the main control section 100#*i* shown in FIG. 5 in that it asserts a pair of isolate instruction lines 237#*i* and 238#*i* when the watch dog timer 94#*i* overflows.

Figure 36:
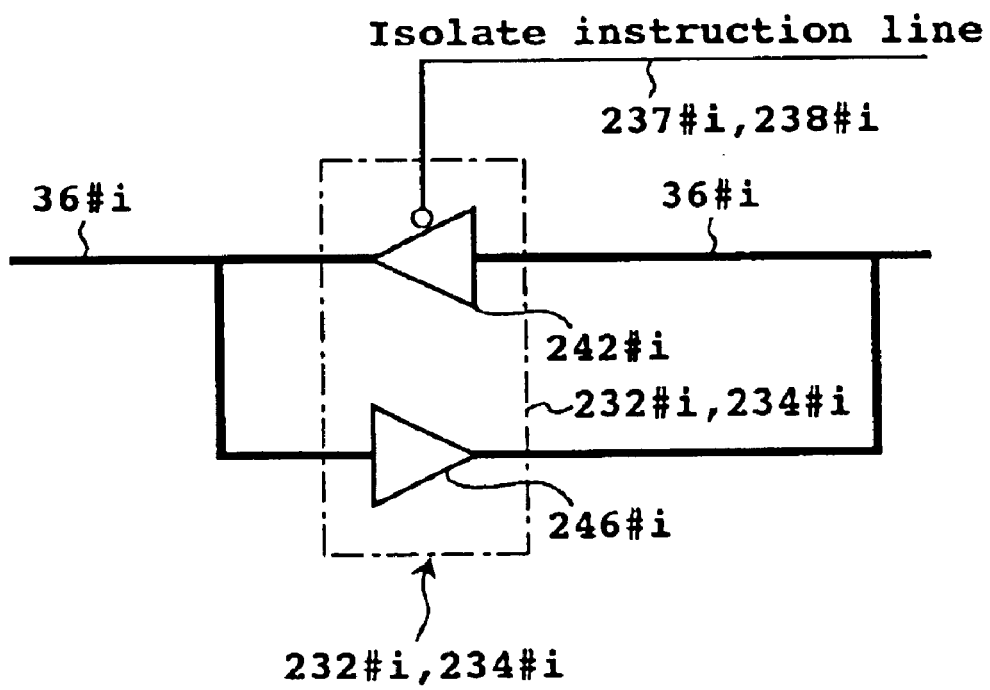
FIG. 36 is a block diagram of an isolate section shown in FIG. 34.

FIG. 36 is a block diagram of the isolate sections 232#*i* and 234#*i* shown in FIG. 34. As shown in FIG. 36, each of the isolate sections 232#*i* and 234#*i* includes a tri-state buffer 242#*i* and a reception buffer 246#*i*. The tri-state buffer 242#*i* is connected on the input side thereof to the extension MPU bus 36#*i* connected to the output side of the INF section 32#*i* or the system control section 236#*i* and on the output side thereof to the extension MPU bus 36#*i* connected to the cache memory control section 24#*i* and so forth such that, when the isolate instruction line 237#*i* or 238#*i* is asserted, the output thereof becomes a high impedance state. Consequently, even if the INF section 32#*i* or the system control section 236#*i* locks the extension MPU bus 36#*i*, since the output of the tri-state buffer 242#*i* becomes a high impedance state when the isolate instruction line 237#*i* or 238#*i* is asserted, the cache memory control section 24#*i* can acquire the right of use of the extension MPU bus 36#*i*, and consequently, the locking of the extension MPU bus 36#*i* is cancelled. The reception buffer 246#*i* is a buffer which receives a signal from the extension MPU bus 36#*i* connected to the cache memory control section 24#*i* and so forth. Consequently, even if the output of the tri-state buffer 242#*i* is in a high impedance state, the INF section 32#*i* and the system control section 236#*i* can receive over the extension MPU bus 36#*i*.

Figure 37:
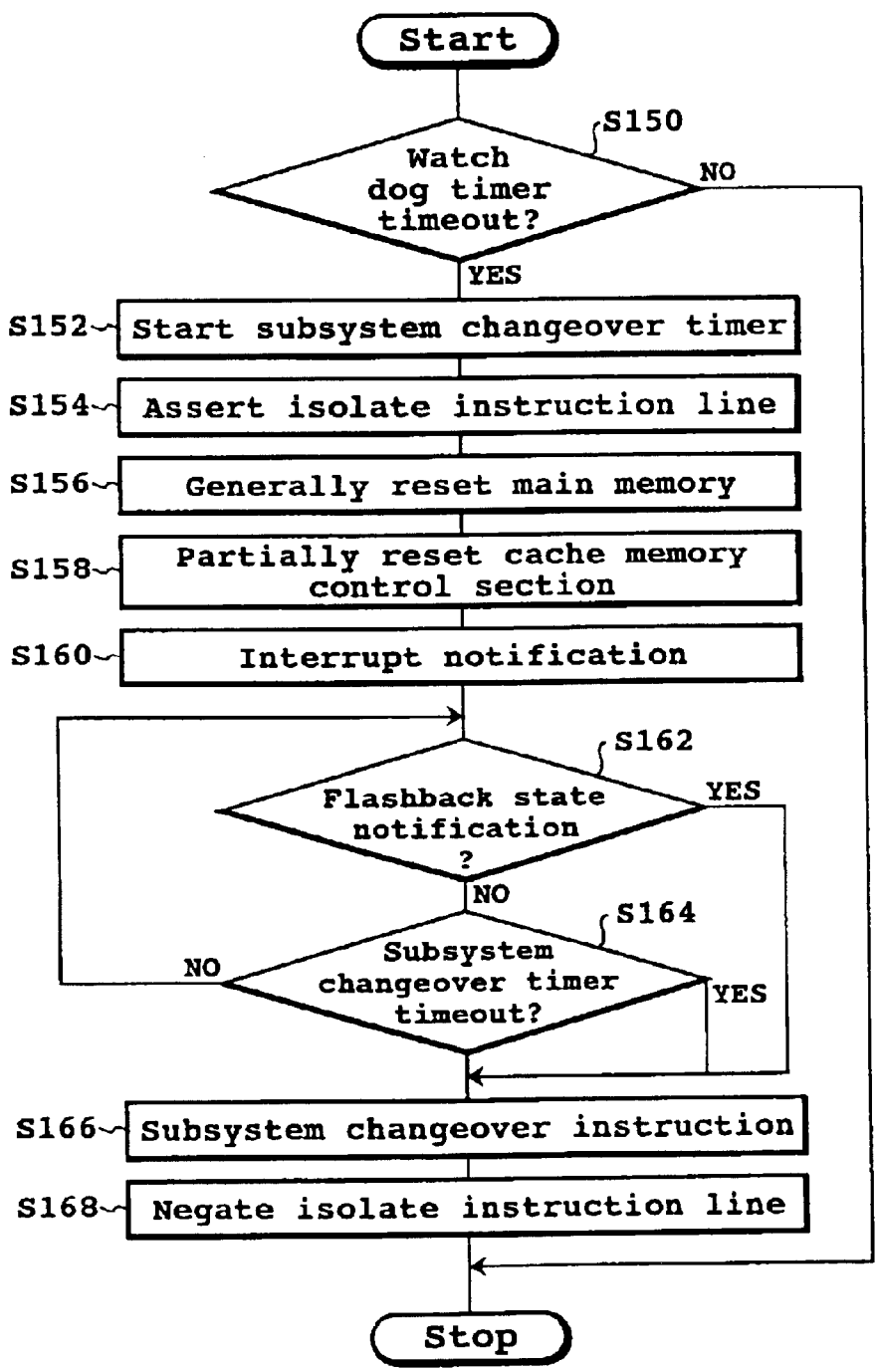
FIG. 37 is a flow chart illustrating operation of the system control section shown in FIG. 34.

FIG. 37 is a flow chart illustrating operation of the system control section 236#*i* shown in FIG. 34. In the following, operation of the system shown in FIG. 34 is described with reference to FIG. 37. It is assumed that a 0-subsystem 230#0 serves as the ACT system and a 1-subsystem 230#1 serves as the SBY system, and the watch dog timer 94#0 overflows.

(B1) In step S150 in FIG. 37, the main control section 240#*i* checks whether or the watch dog timer 94#*i* overflows. If the watch dog timer 94#*i* overflows, then the processing advances to step S152, but if the watch dog timer 94#*i* does not overflow, then the processing is ended. In step S152, the subsystem changeover timer 98#0 is started. In step S154, the main control section 240#0 asserts the isolate instruction lines 237#0 and 238#0. Consequently, the outputs of the isolate sections 232#0 and 234#0 change to a high impedance state so that the outputs of the INF section 32#0 and the system control section 236#0 are isolated from the extension MPU bus 36#0. However, the INF section 32#0 and the system control section 236#0 can receive over the extension MPU bus 36#0. In step S156, the main control section 240#0 asserts the general reset line 47#0. In step S158, the main control section 240#0 asserts the partial reset line 46#0. In step S160, the main control section 240#0 asserts the interrupt notification line 42#0.

(A2) When the interrupt notification line 42#0 is asserted, interruption occurs with the MPU section 22#0, and the MPU section 22#0 operates in a similar manner as in (A2) of the first embodiment.

(C) When a flashback instruction command is inputted from the MPU section 22#0 to the cache memory control section 24#0, the cache memory control section 24#0 compulsorily acquires the access right to the extension MPU bus 36#0. From the conditions that the cache memory control section 24#0 itself is partially reset, that the main memory 28#0 is generally reset and that the outputs of the INF section 32#0 and the system control section 236#0 are isolated from the extension MPU bus 36#0, the cache memory control section 24#0 can acquire the access right to the extension MPU bus 36#0. Consequently, even if the extension MPU bus 36#0 has been locked till then, flashback from the cache memory 26#0 to the main memory 28# is allowed.

(D) The main memory 28#0 operates in a similar manner as in (D) of the first embodiment.

(B2) The system control section 236#0 operates in a similar manner as in (B2) of the first embodiment in steps S162 to S166 illustrated in FIG. 37. In step S168, the main control section 240#0 negates the isolate instruction lines 237#0 and 238#0. This is because, after the flashback is completed, it is not necessary to isolate the INF section 32#0 and the system control section 236#0 from the extension MPU bus 36#0 and, in later processing, the INF section 32#0 and the system control section 236#0 may possibly access the extension MPU bus 36#0.

(B3) The system control section 30#1 of the SBY system operates in a similar manner as in (B3) of the first embodiment.

(A3) The MPU section 22#1 operates in a similar manner as in (A3) of the first embodiment. According to the ninth embodiment described above, similar effects to those of the first embodiment are achieved.

Tenth Embodiment

Figure 38:
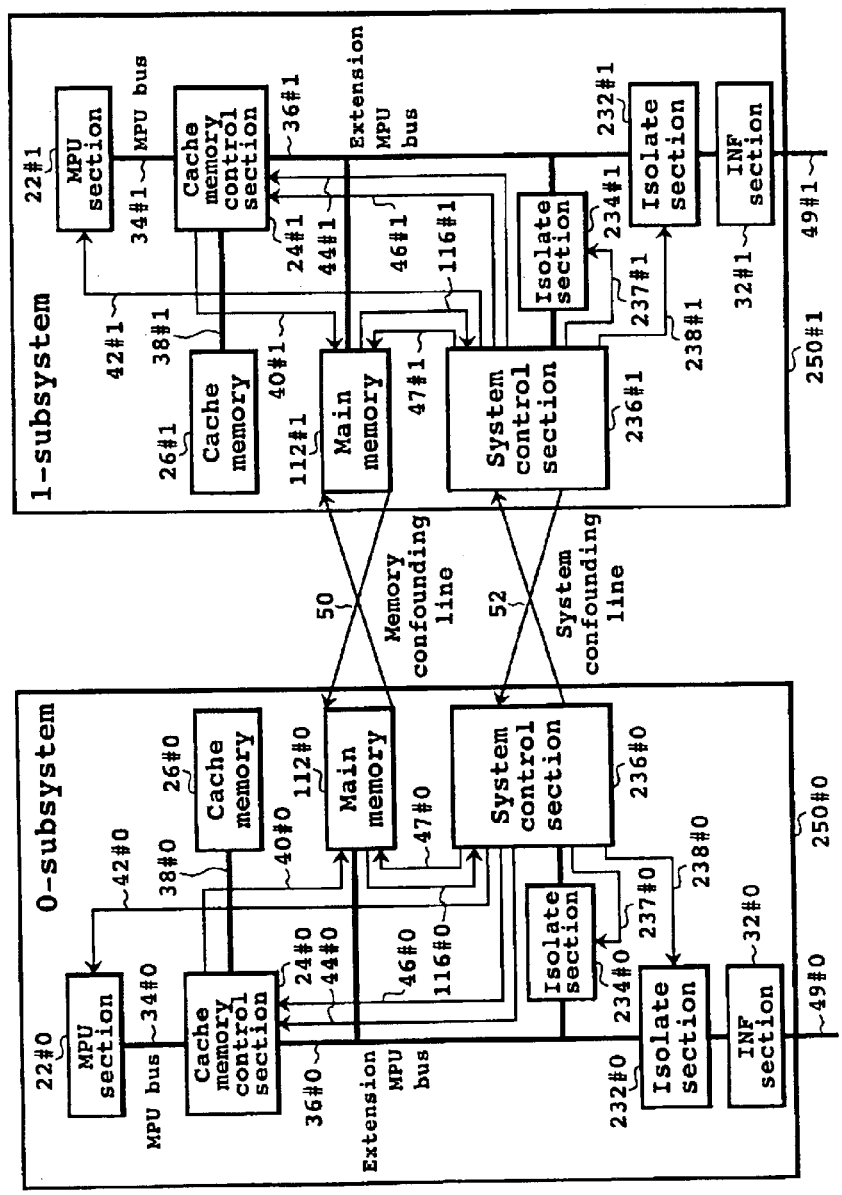
FIG. 38 is a block diagram of a dual system according to a tenth embodiment of the present invention.

FIG. 38 is a block diagram of a dual system according to a tenth embodiment of the present invention, and in FIG. 38, substantially like components to those in FIG. 11 or 34 are denoted by like reference characters. The present embodiment is a combination of the second embodiment of FIG. 11 and the ninth embodiment of FIG. 34. In the following, operation of the system of FIG. 38 is described. It is assumed that a 0-subsystem 250#0 serves as the ACT system and a 1-subsystem 250#1 serves as the SBY system, and the watch dog timer 94#0 overflows.

(B1) The system control section 236#0 operates in a similar manner as in (B1) of the ninth embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 24#0 operates in a similar manner as in (C) of the first embodiment.

(D) The main memory 112#0 operates in a similar manner as in (D) of the second embodiment.

(B2) The system control section 236#0 operates in a similar manner as in (B2) of the ninth embodiment.

(B3) The system control section 236#1 of the SBY system operates in a similar manner as in (B3) of the first embodiment.

(A3) The MPU section 22#1 operates in a similar manner as in (A3) of the first embodiment. According to the tenth embodiment described above, similar effects to those of the first embodiment are achieved.

Eleventh Embodiment

Figure 39:
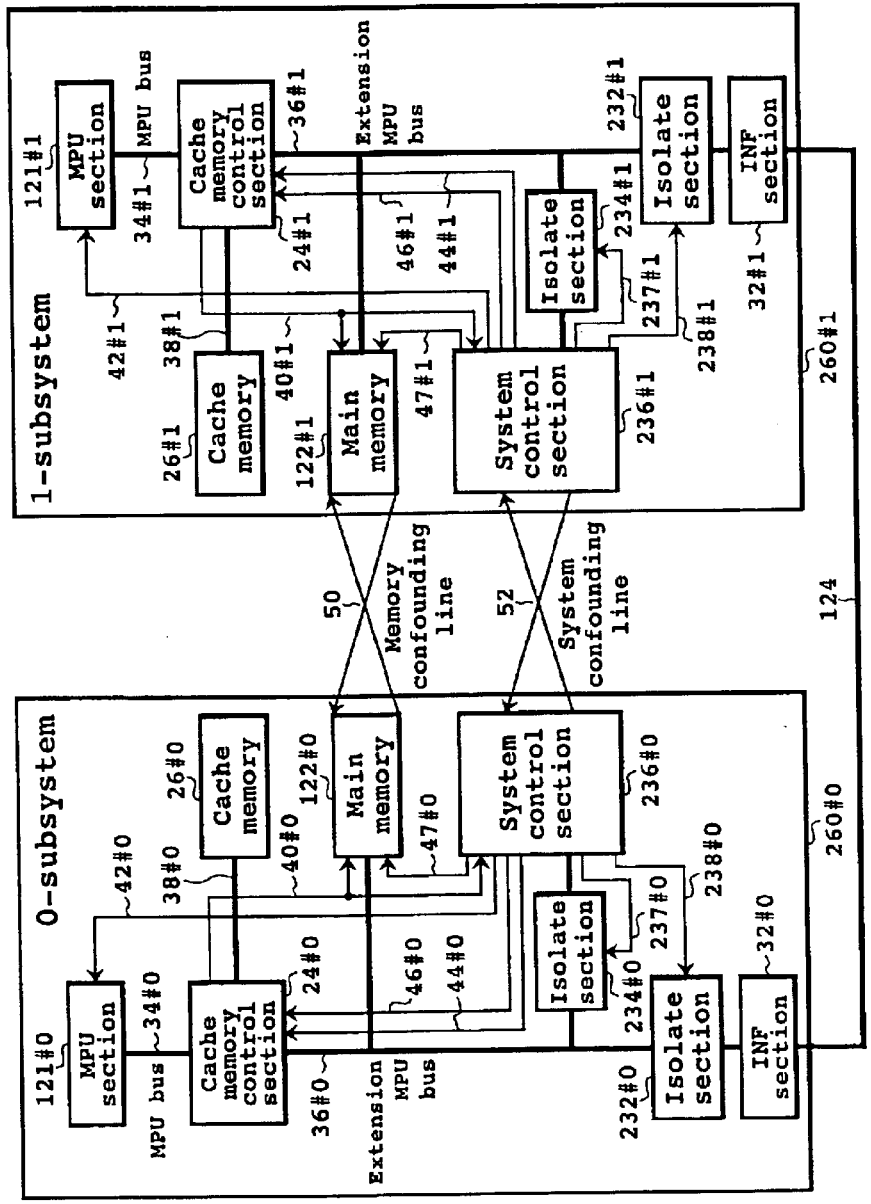
FIG. 39 is a block diagram of a dual system according to an eleventh embodiment of the present invention.

FIG. 39 is a block diagram of a dual system according to an eleventh embodiment of the present invention, and in FIG. 39, substantially like components to those in FIG. 14 or 34 are denoted by like reference characters. The present embodiment is a combination of the third embodiment of FIG. 14 and the ninth embodiment of FIG. 34. In the following, operation of the system of FIG. 39 is described. It is assumed that a 0-subsystem 260#0 serves as the ACT system and a 1-subsystem 260#1 serves as the SBY system, and the watch dog timer 94#0 overflows.

(B1) The system control section 236#0 operates in a similar manner as in (B1) of the ninth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 24#0 operates in a similar manner as in (C) of the first embodiment.

(D) The main memory 112#0 operates in a similar manner as in (D) of the third embodiment.

(B2) The system control section 236#0 operates in a similar manner as in (B2) of the ninth embodiment.

(B3) The system control section 236#1 of the SBY system operates in a similar manner as in (B3) of the first embodiment.

(A3) The MPU section 121#1 operates in a similar manner as in (A3) of the third embodiment. According to the eleventh embodiment described above, similar effects to those of the first embodiment are achieved.

Twelfth Embodiment

Figure 40:
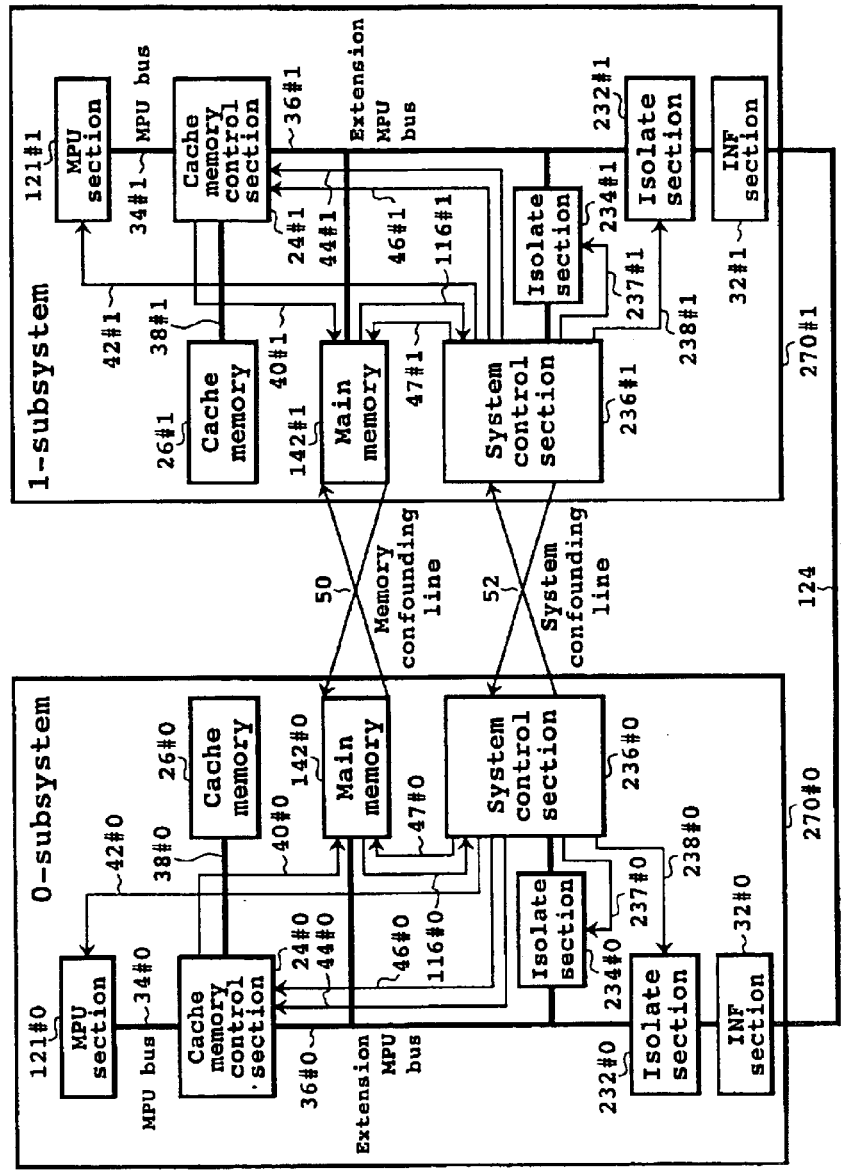
FIG. 40 is a block diagram of a dual system according to a twelfth embodiment of the present invention.

FIG. 40 is a block diagram of a dual system according to a twelfth embodiment of the present invention, and in FIG. 40, substantially like components to those in FIG. 17 or 34 are denoted by like reference characters. The present embodiment is a combination of the fourth embodiment of FIG. 17 and the ninth embodiment of FIG. 34. In the following, operation of the system of FIG. 40 is described. It is assumed that a 0-subsystem 270#0 serves as the ACT system and a 1-subsystem 270#1 serves as the SBY system, and the watch dog timer 94#0 overflows.

(B1) The system control section 236#0 operates in a similar manner as in (B1) of the ninth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 24#0 operates in a similar manner as in (C) of the first embodiment.

(D) The main memory 142#0 operates in a similar manner as in (D) of the fourth embodiment.

(B2) The system control section 236#0 operates in a similar manner as in (B2) of the ninth embodiment.

(B3) The system control section 236#1 of the SBY system operates in a similar manner as in (B3) of the first embodiment.

(A3) The MPU section 121#1 operates in a similar manner as in (A3) of the third embodiment. According to the twelfth embodiment described above, similar effects to those of the first embodiment are achieved.

Thirteenth Embodiment

Figure 41:
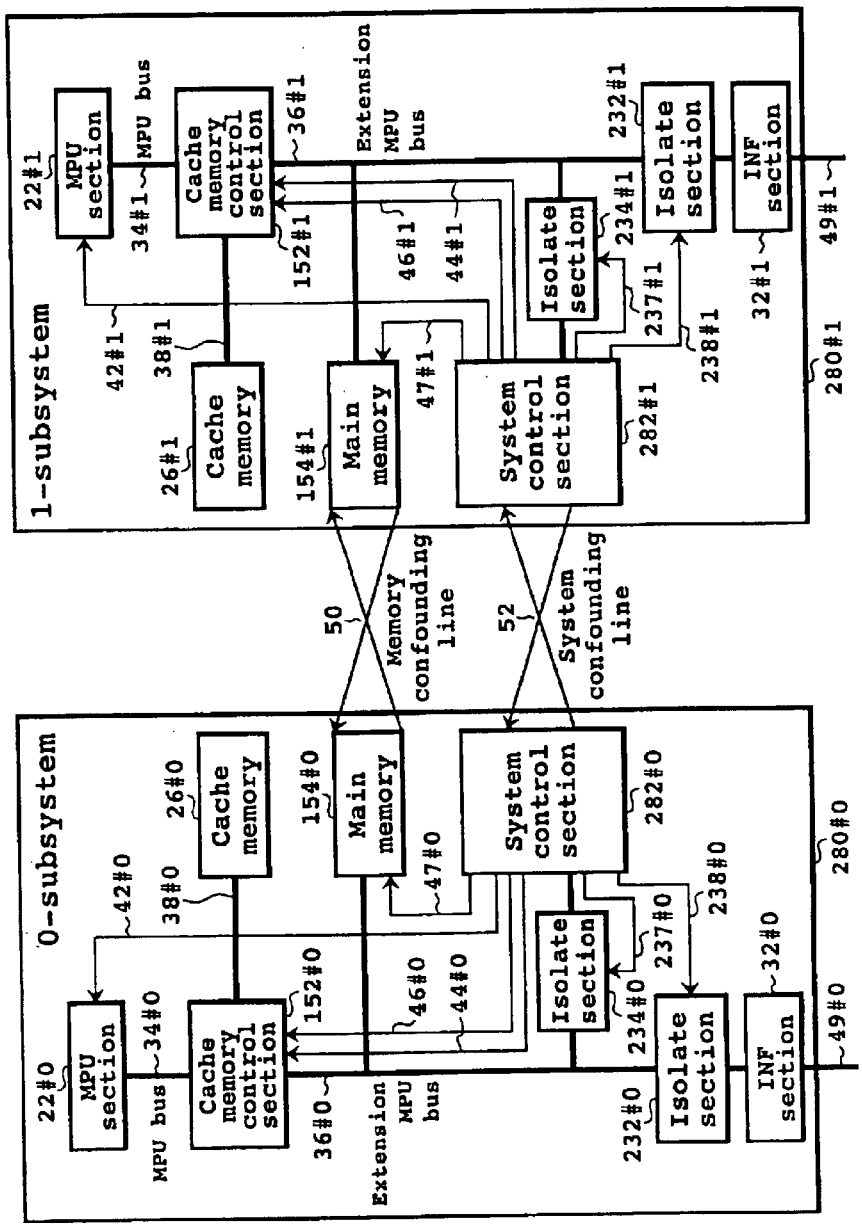
FIG. 41 is a block diagram of a dual system according to a thirteenth embodiment of the present invention.

FIG. 41 is a block diagram of a dual system according to a thirteenth embodiment of the present invention, and in FIG. 41, substantially like components to those in FIG. 20 or 34 are denoted by like reference characters. The present embodiment is a combination of the fifth embodiment of FIG. 20 and the ninth embodiment of FIG. 34. In the following, operation of the system of FIG. 41 is described. It is assumed that a 0-subsystem 280#0 serves as the ACT system and a 1-subsystem 280#1 serves as the SBY system, and the watch dog timer 94#0 overflows.

(B1) A system control section 282#0 operates in a similar manner as in (B1) of the ninth embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 152#0 operates in a similar manner as in (c) of the fifth embodiment.

(D) The main memory 154#0 operates in a similar manner as in (D) of the fifth embodiment.

(B2) The system control section 282#0 operates in a similar manner as in (B2) of the fifth embodiment and outputs, when it receives a flashback completion notification command, an ACT/SBY system changeover signal to the system confounding line 52. Then, the system control section 282#0 negates the isolate instruction lines 237#0 and 238#0 in a similar manner as in (B2) of the ninth embodiment.

(B3) The system control section 282#1 of the SBY system operates in a similar manner as in (B3) of the first embodiment.

(A3) The MPU section 22#1 operates in a similar manner as in (A3) of the first embodiment. According to the thirteenth embodiment described above, similar effects to those of the first embodiment are achieved.

Fourteenth Embodiment

Figure 42:
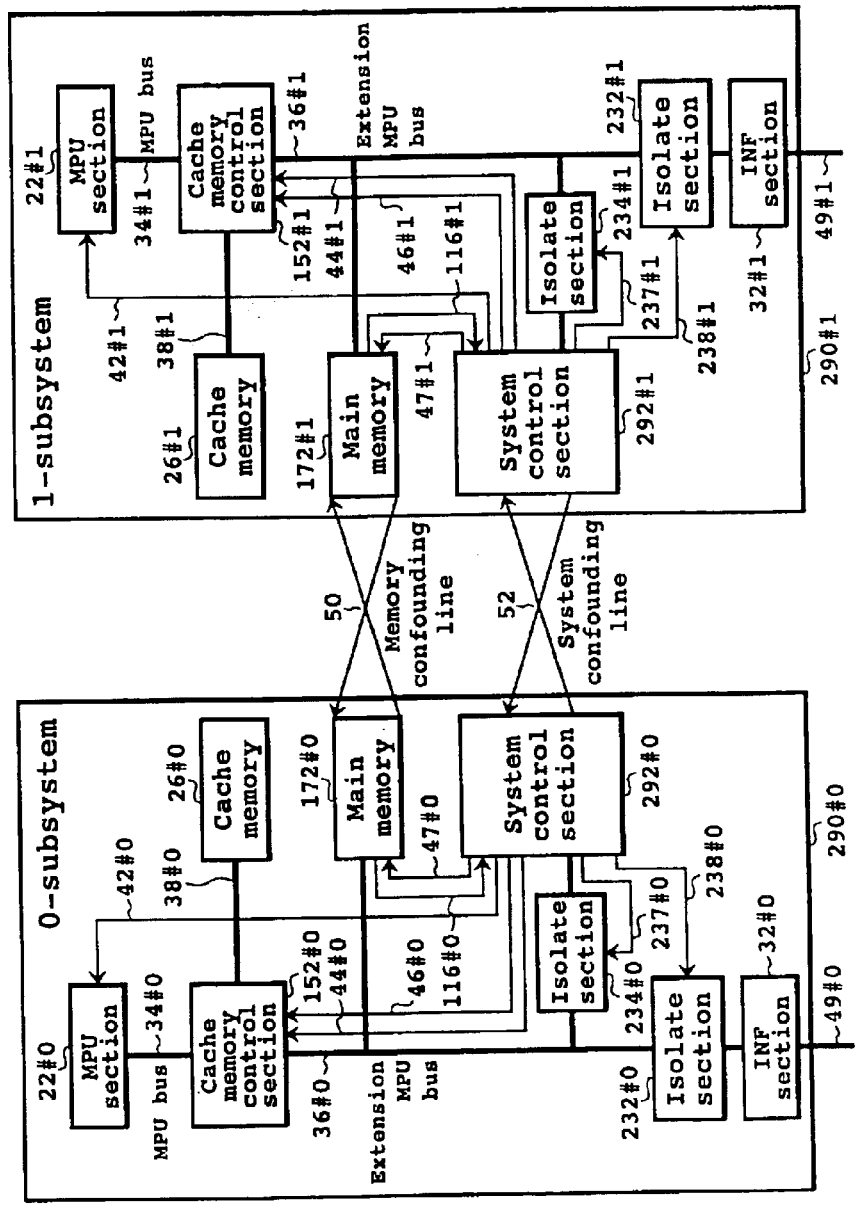
FIG. 42 is a block diagram of a dual system according to a fourteenth embodiment of the present invention.

FIG. 42 is a block diagram of a dual system according to a fourteenth embodiment of the present invention, and in FIG. 42, substantially like components to those in FIG. 27 or 34 are denoted by like reference characters. The present embodiment is a combination of the sixth embodiment of FIG. 27 and the ninth embodiment of FIG. 34. In the following, operation of the system of FIG. 42 is described. It is assumed that a 0-subsystem 290#0 serves as the ACT system and a 1-subsystem 290#1 serves as the SBY system, and the watch dog timer 94#0 overflows.

(B1) A system control section 292#0 operates in a similar manner as in (B1) of the ninth embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 152#0 operates in a similar manner as in (C) of the fifth embodiment.

(D) The main memory 172#0 operates in a similar manner as in (D) of the sixth embodiment.

(B2) The system control section 292#0 operates in a similar manner as in (B2) of the sixth embodiment and outputs, when the flashback state notification line 116#0 is asserted, an ACT/SBY system changeover signal to the system confounding line 52. Then, the system control section 292#0 negates the isolate instruction lines 237#0 and 238#0 in a similar manner as in (B2) of the ninth embodiment.

(B3) The system control section 292#1 of the SBY system operates in a similar manner as in (B3) of the first embodiment.

(A3) The MPU section 22#1 operates in a similar manner as in (A3) of the first embodiment. According to the fourteenth embodiment described above, similar effects to those of the first embodiment are achieved.

Fifteenth Embodiment

Figure 43:
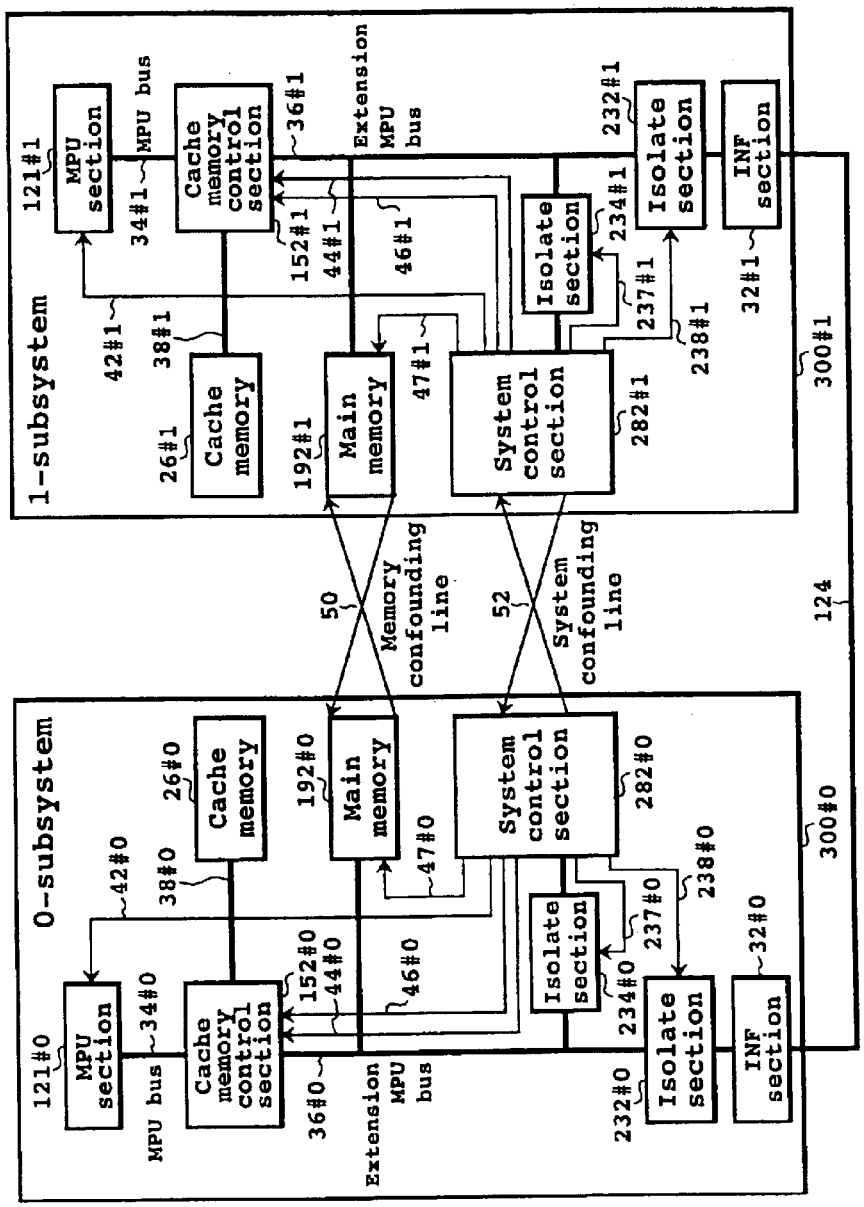
FIG. 43 is a block diagram of a dual system according to a fifteenth embodiment of the present invention.

FIG. 43 is a block diagram of a dual system according to a fifteenth embodiment of the present invention, and in FIG. 43, substantially like components to those in FIG. 30 or 41 are denoted by like reference characters. The present embodiment is a combination of the seventh embodiment of FIG. 30 and the thirteenth embodiment of FIG. 41.

In the following, operation of the system of FIG. 43 is described. It is assumed that a 0-subsystem 300#0 serves as the ACT system and a 1-subsystem 300#1 serves as the SBY system, and the watch dog timer 94#0 overflows.

(B1) The system control section 282#0 operates in a similar manner as in (B1) of the ninth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 152#0 operates in a similar manner as in (C) of the fifth embodiment.

(D) The main memory 192#0 operates in a similar manner as in (D) of the seventh embodiment.

(B2) The system control section 282#0 operates in a similar manner as in (B2) of the thirteenth embodiment.

(B3) The system control section 282#1 of the SBY system operates in a similar manner as in (B3) of the first embodiment.

(A3) The MPU section 121#1 operates in a similar manner as in (A3) of the third embodiment. According to the fifteenth embodiment described above, similar effects to those of the first embodiment are achieved.

Sixteenth Embodiment

Figure 44:
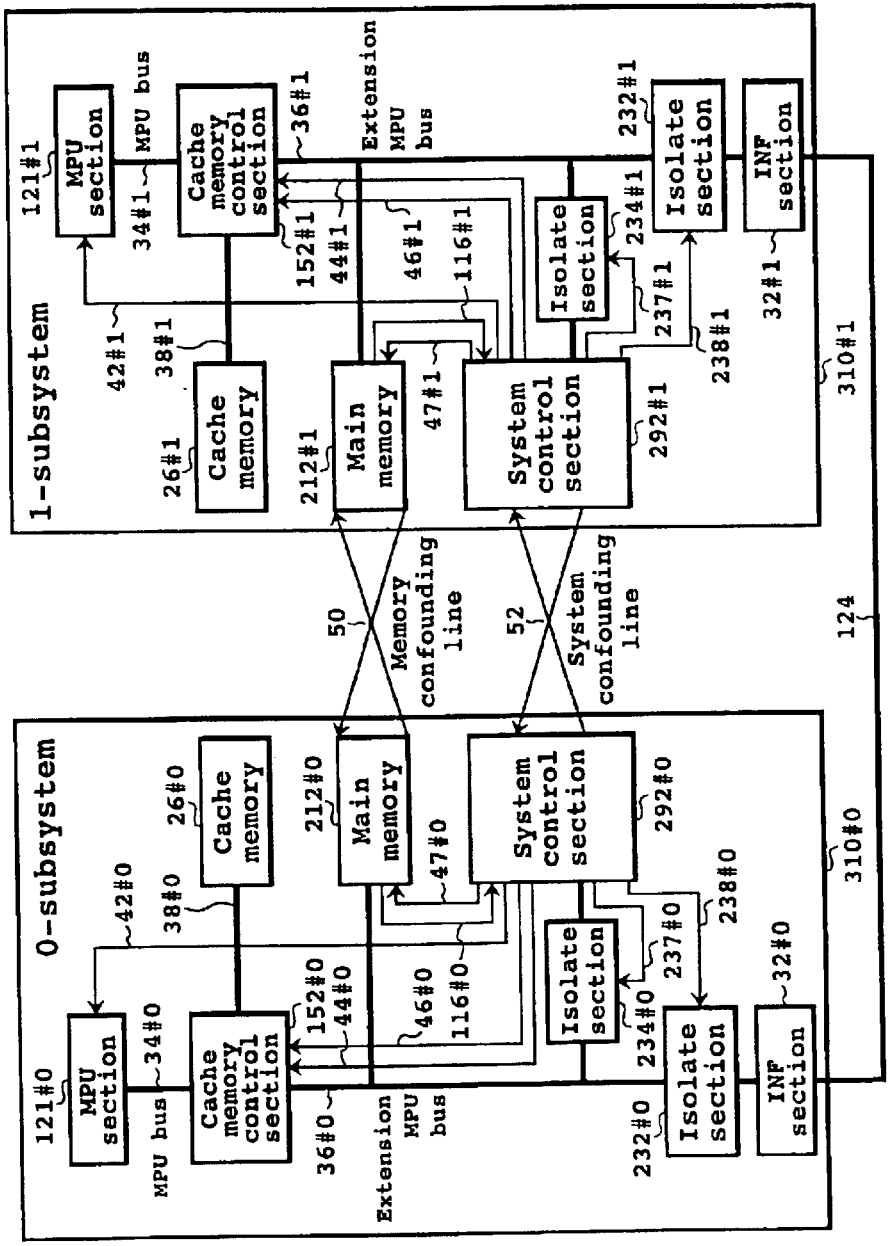
FIG. 44 is a block diagram of a dual system according to a sixteenth embodiment of the present invention.

FIG. 44 is a block diagram of a dual system according to a sixteenth embodiment of the present invention, and in FIG. 44, substantially like components to those in FIG. 32 or 42 are denoted by like reference characters. The present embodiment is a combination of the eighth embodiment of FIG. 32 and the fourteenth embodiment of FIG. 42. In the following, operation of the system of FIG. 44 is described. It is assumed that a 0-subsystem 310#0 serves as the ACT system and a 1-subsystem 310#1 serves as the SBY system, and the watch dog timer 94#0 overflows.

(B1) The system control section 292#0 operates in a similar manner as in (B1) of the ninth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 152#0 operates in a similar manner as in (C) of the fifth embodiment.

(D) The main memory 212#0 operates in a similar manner as in (D) of the eighth embodiment.

(B2) The system control section 292#0 operates in a similar manner as in (B2) of the fourteenth embodiment.

(B3) The system control section 292#1 of the SBY system operates in a similar manner as in (B3) of the first embodiment.

(A3) The MPU section 121#1 operates in a similar manner as in (A3) of the third embodiment. According to the sixteenth embodiment described above, similar effects to those of the first embodiment are achieved.

Seventeenth Embodiment

Figure 46:
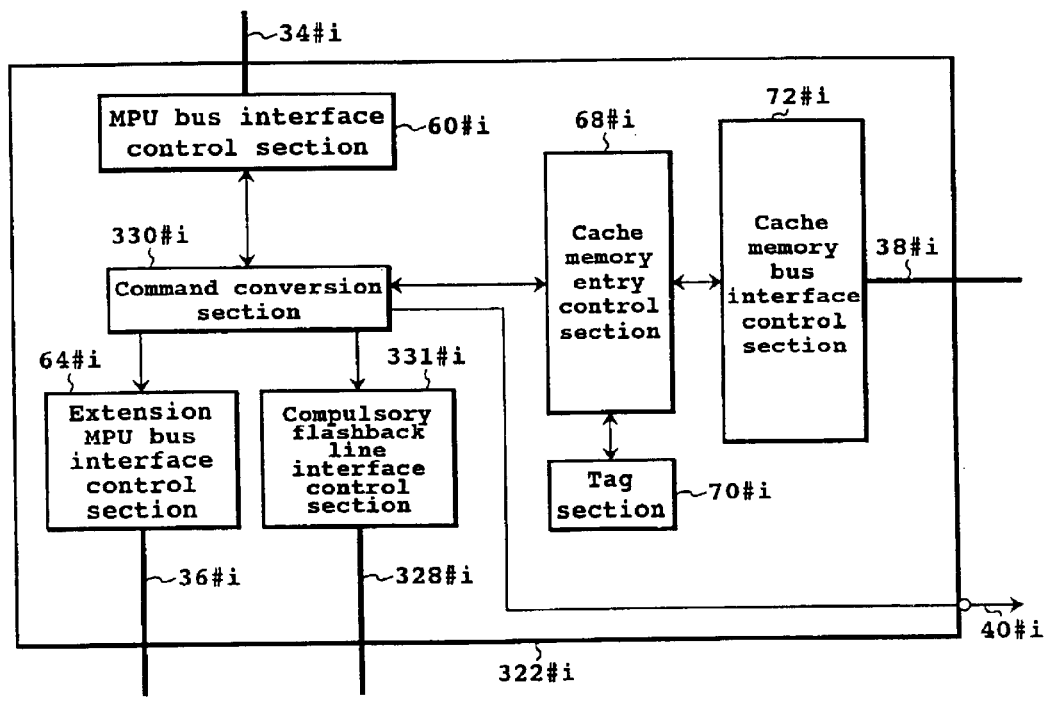
FIG. 46 is a block diagram of a cache memory control section shown in FIG. 45.

FIG. 45 is a block diagram of a dual system according to a seventeenth embodiment of the present invention, and in FIG. 45, substantially like components to those in FIG. 2 are denoted by like reference characters. A cache memory control section 322#i shown in 18. FIG. 45 is different from the cache memory control section 24#i shown in FIG. 2 in that it uses not the extension MPU bus 36#i but a compulsory flashback line 328#i to perform flashback. The compulsory flashback line 328#i has no particular restriction only if it can transmit data and an address of the data to a main memory 324#i, and may be either one of a serial interface and a parallel interface. FIG. 46 is a block diagram of the cache memory control section 322#i shown in FIG. 45, and in FIG. 45, substantially like components to those in FIG. 3 are denoted by like reference characters. A command conversion section 330#i is different from the command conversion section 62#i shown in FIG. 3 in that, when a flashback instruction command is inputted from an MPU bus interface control section 60#i, the command conversion section 330#i outputs a write command including data read from the cache memory 26#i and an address of the data to a compulsory flashback line interface control section 331#i.

Figure 47:
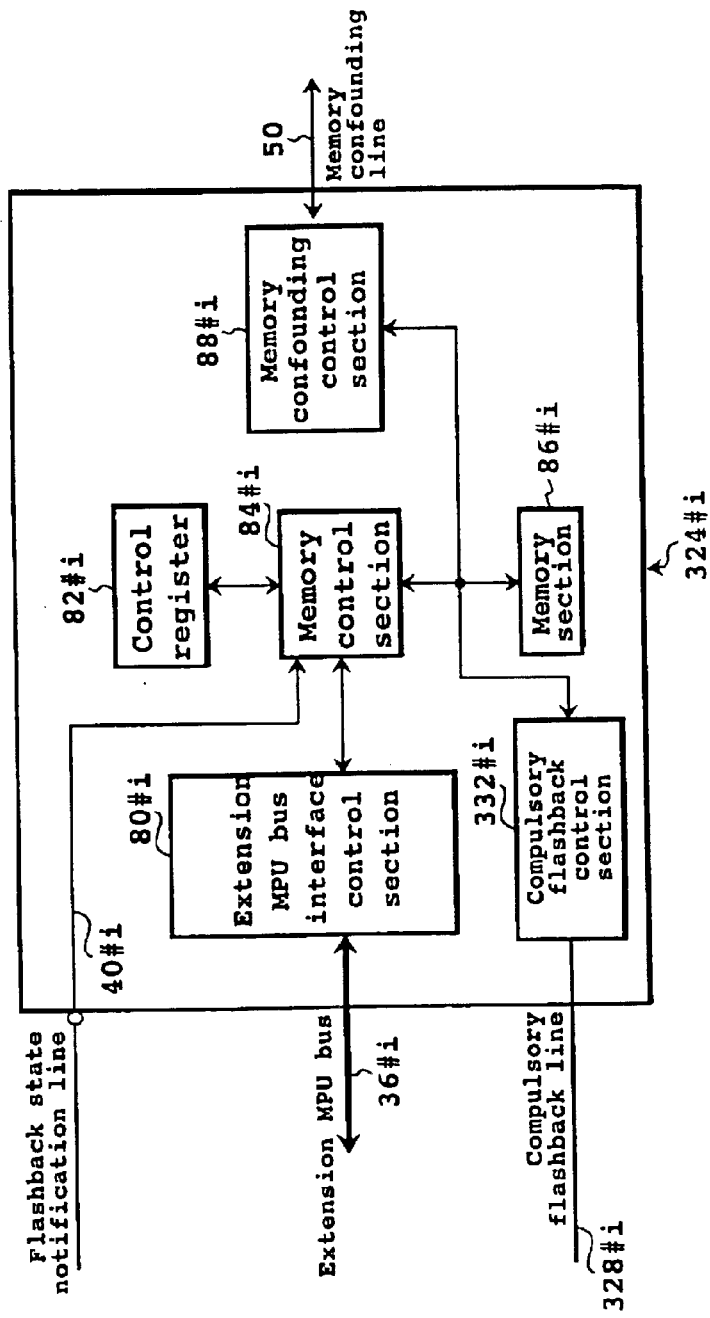
FIG. 47 is a block diagram of a main memory shown in FIG. 45.

The compulsory flashback line interface control section 331#i outputs a write command outputted from the command conversion section 330#i in accordance with an interface of the compulsory flashback line 328#i. FIG. 47 is a block diagram of the main memory 324#i shown in FIG. 45, and in FIG. 45, substantially like components to those in FIG. 4 are denoted by like reference characters. When data and an address of the data are received from the compulsory flashback line 328#i, a compulsory flashback control section 332#i writes them into the memory section 86#i. In the following, operation of the system of FIG. 45 is described. It is assumed that a 0-subsystem 320#0 serves as the ACT system and a 1-subsystem 320#1 serves as the SBY system, and the watch dog timer 94#0 overflows.

(B1) A system control section 326#0 starts the subsystem changeover timer 98#0 and asserts the interrupt notification line 42#0 when the watch dog timer 94#i overflows.

(A2) When the interrupt notification line 42#0 is asserted, interruption occurs with the MPU section 22#0, and the MPU section 22#0 operates in a similar manner as in (A2) of the first embodiment.

(C) The command conversion section 330#0 shown in FIG. 46 operates in a similar manner as in (C) of the first embodiment such that it outputs, when data read from the cache memory 26#0 and an address read from the tag section 70#0 are inputted from the cache memory entry control section 68#0, a write command including the data and the address to the compulsory flashback line interface control section 331#0. The compulsory flashback line interface control section 331#0 outputs the write command including the data and the address in accordance with an interface of the compulsory flashback line 328#0. The command conversion section 330#0 and the cache memory entry control section 68#0 perform the processing described for all data to be flashed back. The command conversion section 330#0 asserts the flashback state notification line 40#0 when the flashback is completed.

(D) The compulsory flashback control section 332#0 shown in FIG. 47 writes, when it receives the data and the address from the compulsory flashback line 328#0, the address data into the memory section 86#0. On the other hand, when the flashback state notification line 40#0 is asserted, the memory control section 84#0 writes information representative of completion of flashback into the particular address area of the memory section 86#0.

(B2) The system control section 326#0 operates in a similar manner as in (B2) of the first embodiment.

(B3) The system control section 326#1 of the SBY system operates in a similar manner as in (B3) of the first embodiment.

(A3) The MPU section 22#1 operates in a similar manner as in (A3) of the first embodiment. According to the seventeenth embodiment described above, similar effects to those of the first embodiment are achieved.

Eighteenth Embodiment

Figure 48:
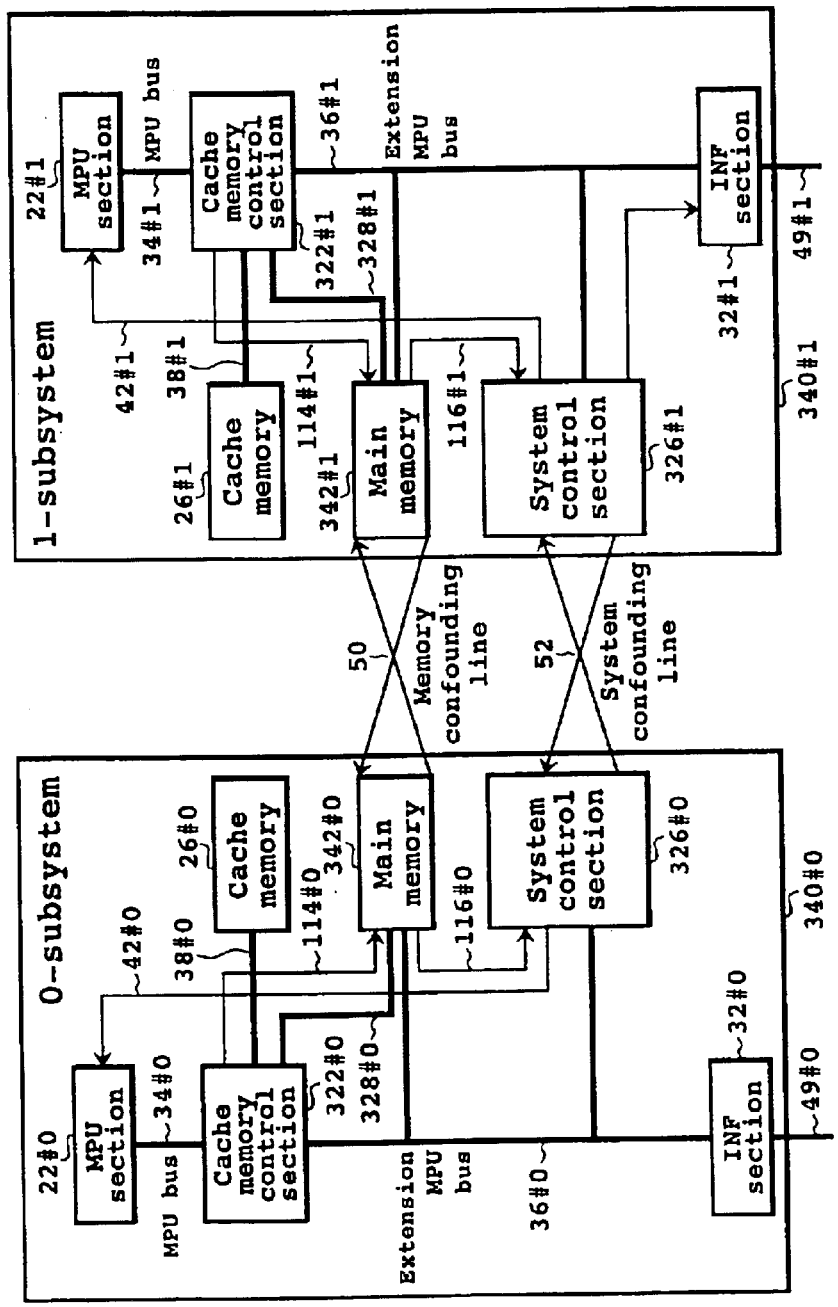
FIG. 48 is a block diagram of a dual system according to an eighteenth embodiment of the present invention.
Figure 49:
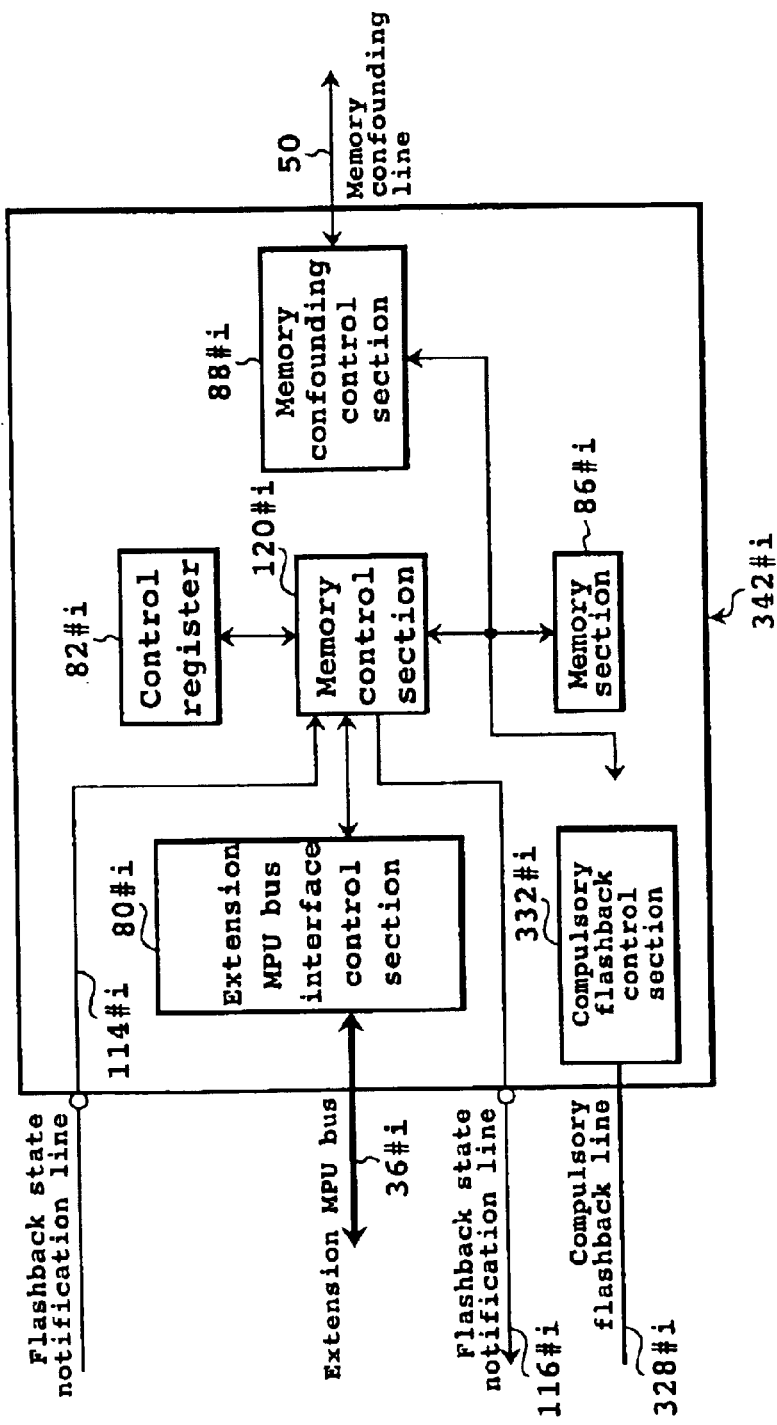
FIG. 49 is a block diagram of a main memory shown in FIG. 48.

FIG. 48 is a block diagram of a dual system according to an eighteenth embodiment of the present invention, and in FIG. 48, substantially like components to those in FIG. 11 or 45 are denoted by like reference characters. The present embodiment is a combination of the second embodiment of FIG. 11 and the seventeenth embodiment of FIG. 45. FIG. 49 is a block diagram of a main memory 342#i shown in FIG. 49, and in FIG. 49, substantially like components to those in FIG. 12 or 47 are denoted by like reference characters. The main memory 342#i is a combination of the main memory 112#i of FIG. 12 and the main memory 324#i of FIG. 47. In the following, operation of the system of FIG. 48 is described. It is assumed that a 0-subsystem 340#0 serves as the ACT system and a 1-subsystem 340#1 serves as the SBY system, and the watch dog timer 94#0 overflows.

(B1) The system control section 326#0 operates in a similar manner as in (B1) of the seventeenth embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 322#0 operates in a similar manner as in (C) of the seventeenth embodiment.

(D) The compulsory flashback control section 332#0 shown in FIG. 49 operates in a similar manner as in (D) of the seventeenth embodiment to write flashback data into the memory section 86#0. When the flashback state notification line 114#0 is asserted, the memory control section 120#0 writes information representative of completion of flashback into the particular address area of the memory section 86#0 and asserts the flashback state notification line 116#0 in a similar manner as in (D) of the second embodiment.

(B2) The system control section 326#0 operates in a similar manner as in (B2) of the first embodiment.

(B3) The system control section 326#1 of the SBY system operates in a similar manner as in (B3) of the first embodiment.

(A3) The MPU section 22#1 operates in a similar manner as in (A3) of the first embodiment. According to the eighteenth embodiment described above, similar effects to those of the first embodiment are achieved.

Nineteenth Embodiment

Figure 50:
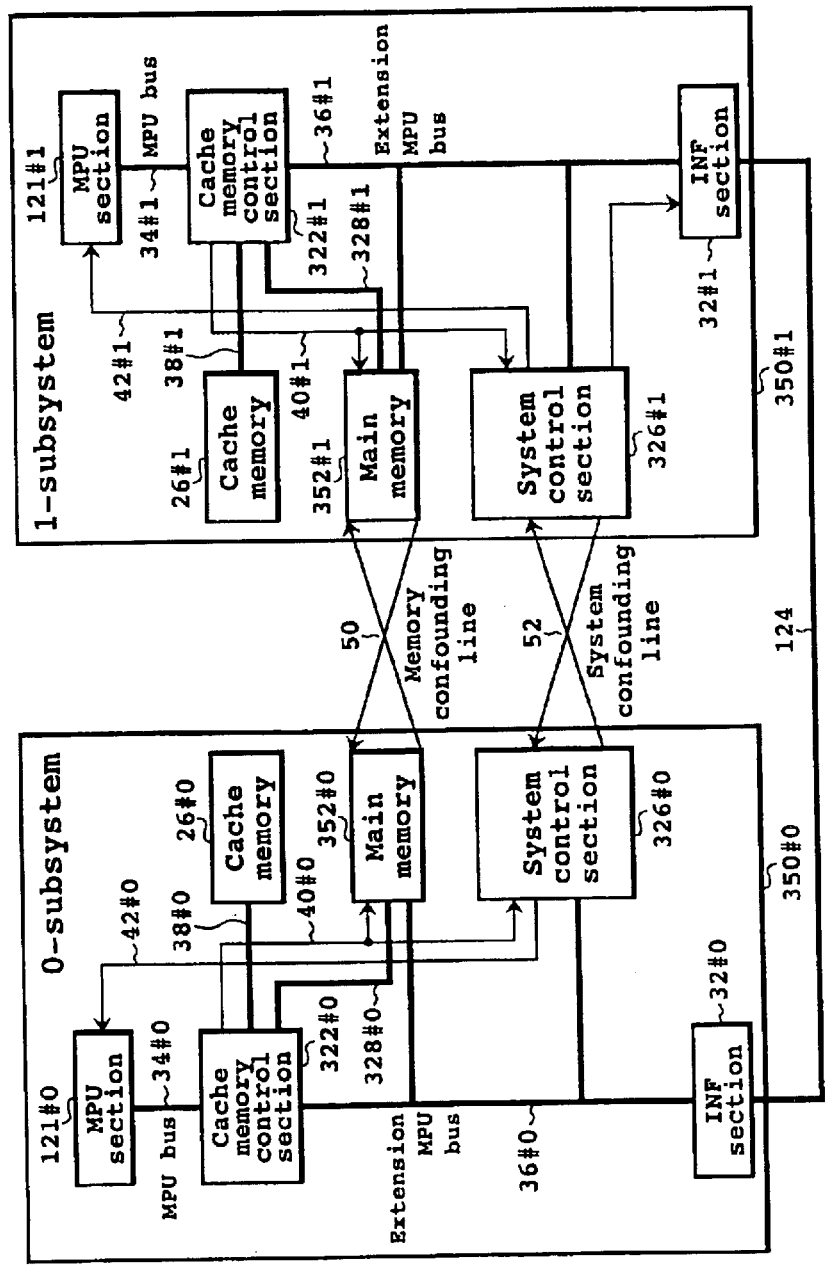
FIG. 50 is a block diagram of a dual system according to a nineteenth embodiment of the present invention.
Figure 51:
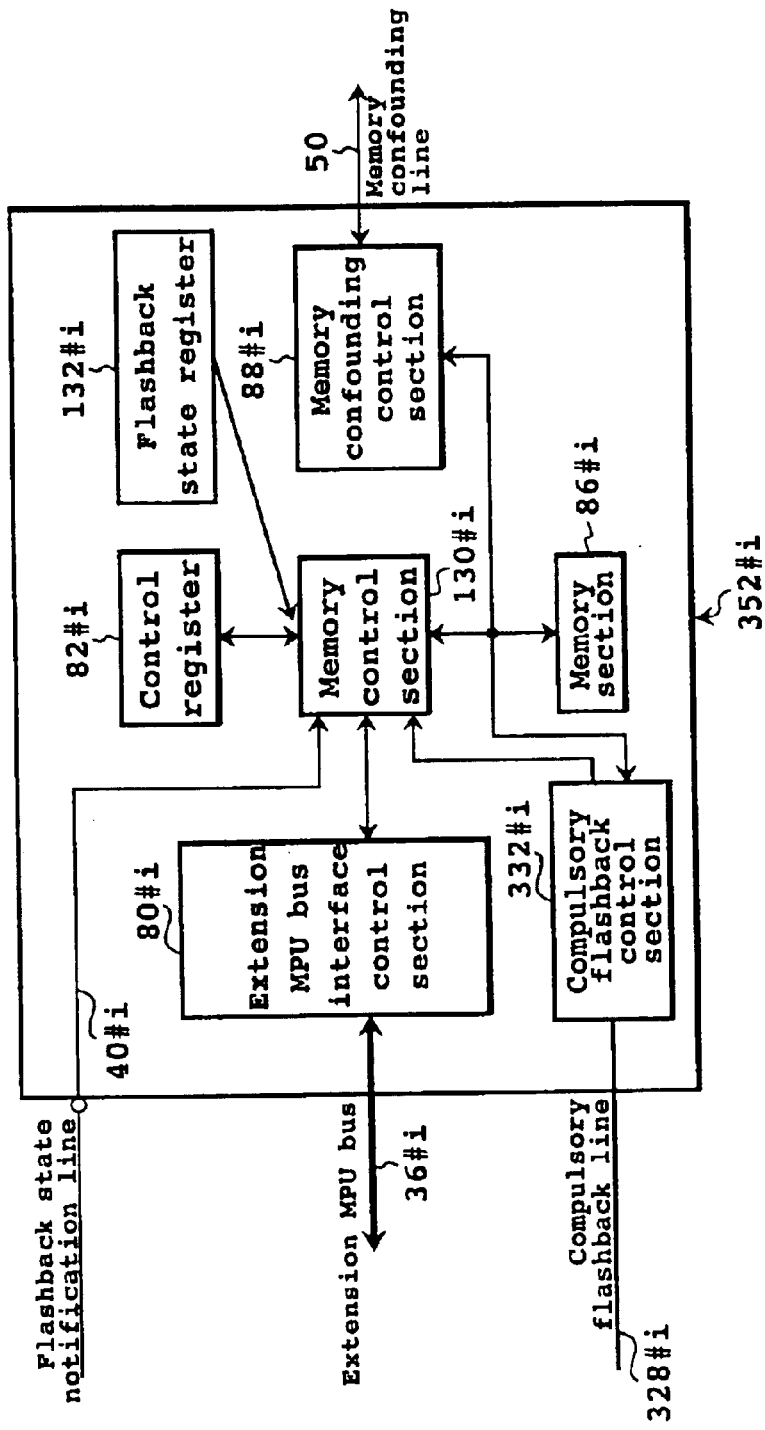
FIG. 51 is a block diagram of a main memory shown in FIG. 50.

FIG. 50 is a block diagram of a dual system according to a nineteenth embodiment of the present invention, and in FIG. 50, substantially like components to those in FIG. 14 or 45 are denoted by like reference characters. The present embodiment is a combination of the third embodiment of FIG. 14 and the seventeenth embodiment of FIG. 45. FIG. 51 is a block diagram of a main memory 352#i shown in FIG. 50, and in FIG. 51, substantially like components to those in FIG. 15 or 47 are denoted by like reference characters. The main memory 352#i of FIG. 51 is a combination of the main memory 122#i of FIG. 15 and the main memory 324#i of FIG. 47. In the following, operation of the system of FIG. 50 is described. It is assumed that a 0-subsystem 350 10 serves as the ACT system and a 1-subsystem 350#1 serves as the SBY system, and the watch dog timer 94#0 overflows.

(B1) The system control section 326#0 operates in a similar manner as in (B1) of the seventeenth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 322#0 operates in a similar manner as in (C) of the seventeenth embodiment.

(D) The compulsory flashback control section 332#i shown in FIG. 51 operates in a similar manner as in (D) of the seventeenth embodiment to write flashback data into the memory section 86#0. When the flashback state notification line 40#i is asserted, the memory control section 130#0 writes information representative of completion of flashback into the flashback state register 132#0.

(B2) The system control section 326#0 operates in a similar manner as in (B2) of the seventeenth embodiment.

(B3) The system control section 326#1 of the SBY system operates in a similar manner as in (B3) of the first embodiment.

(A3) The MPU section 121#1 operates in a similar manner as in (A3) of the third embodiment. According to the nineteenth embodiment described above, similar effects to those of the first embodiment are achieved.

Twentieth Embodiment

Figure 53:
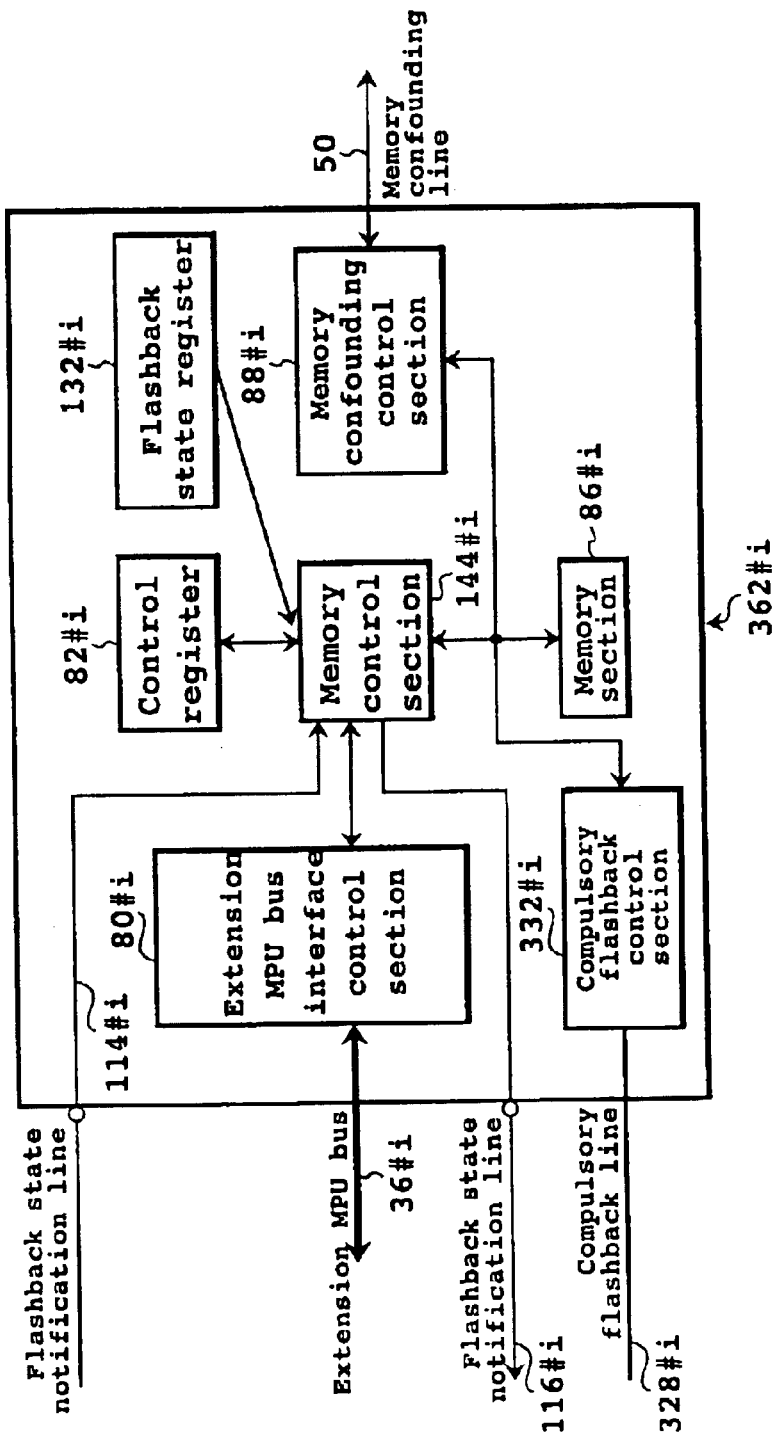
FIG. 53 is a block diagram of a main memory shown in FIG. 52.

FIG. 52 is a block diagram of a dual system according to a twentieth embodiment of the present invention, and in FIG. 52, substantially like components to those in FIG. 17 or 45 are denoted by like reference characters. The present embodiment is a combination of the fourth embodiment of FIG. 17 and the seventeenth embodiment of FIG. 45. FIG. 53 is a block diagram of a main memory 362#i shown in FIG. 52, and in FIG. 53, substantially like components to those in FIG. 18 or 47 are denoted by like reference characters. The main memory 362#i in FIG. 53 is a combination of the main memory 142#i of FIG. 18 and the main memory 324#i of FIG. 47. In the following, operation of the system of FIG. 52 is described. It is assumed that a 0-subsystem 360#0 serves as the ACT system and a 1-subsystem 360#1 serves as the SBY system, and the watch dog timer 94#0 overflows.

(B1) The system control section 326#0 operates in a similar manner as in (B1) of the seventeenth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 322#0 operates in a similar manner as in (C) of the seventeenth embodiment.

(D) The compulsory flashback control section 332#i shown in FIG. 53 operates in a similar manner as in (D) of the seventeenth embodiment to write flashback data into the memory section 86#0. The memory control section 144#0 operates in a similar manner as in (D) of the fourth embodiment such that, when the flashback state notification line 114#i is asserted, it writes information representative of completion of flashback into the flashback state register 132#0 and asserts the flashback state notification line 116#0.

(B2) The system control section 326#0 operates in a similar manner as in (B2) of the seventeenth embodiment.

(B3) The system control section 326#1 of the SBY system operates in a similar manner as in (B3) of the first embodiment.

(A3) The MPU section 121#1 operates in a similar manner as in (A3) of the third embodiment. According to the twentieth embodiment described above, similar effects to those of the first embodiment are achieved.

Twenty-First Embodiment

Figure 54:
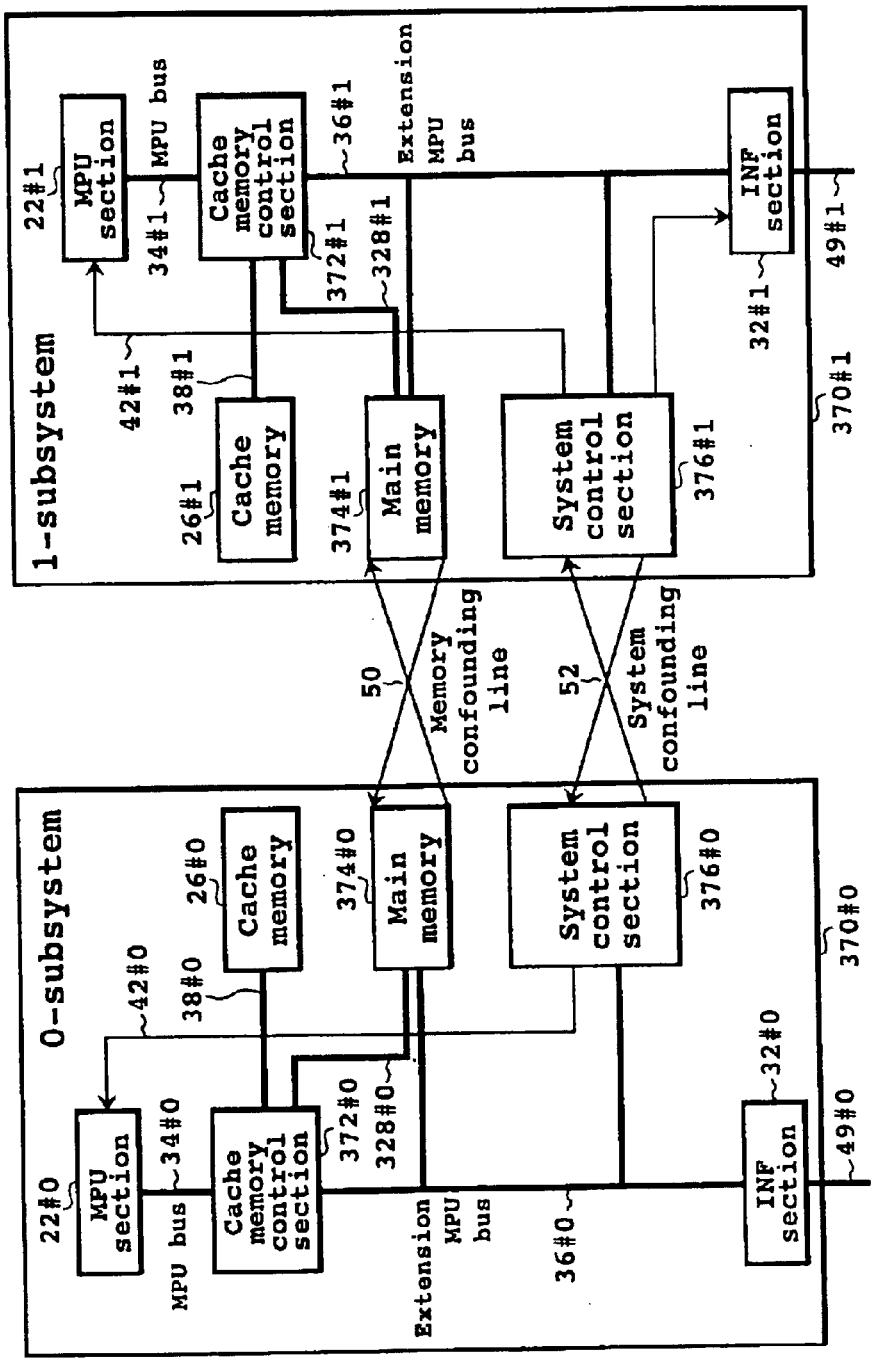
FIG. 54 is a block diagram of a dual system according to a twenty-first embodiment of the present invention.
Figure 55:
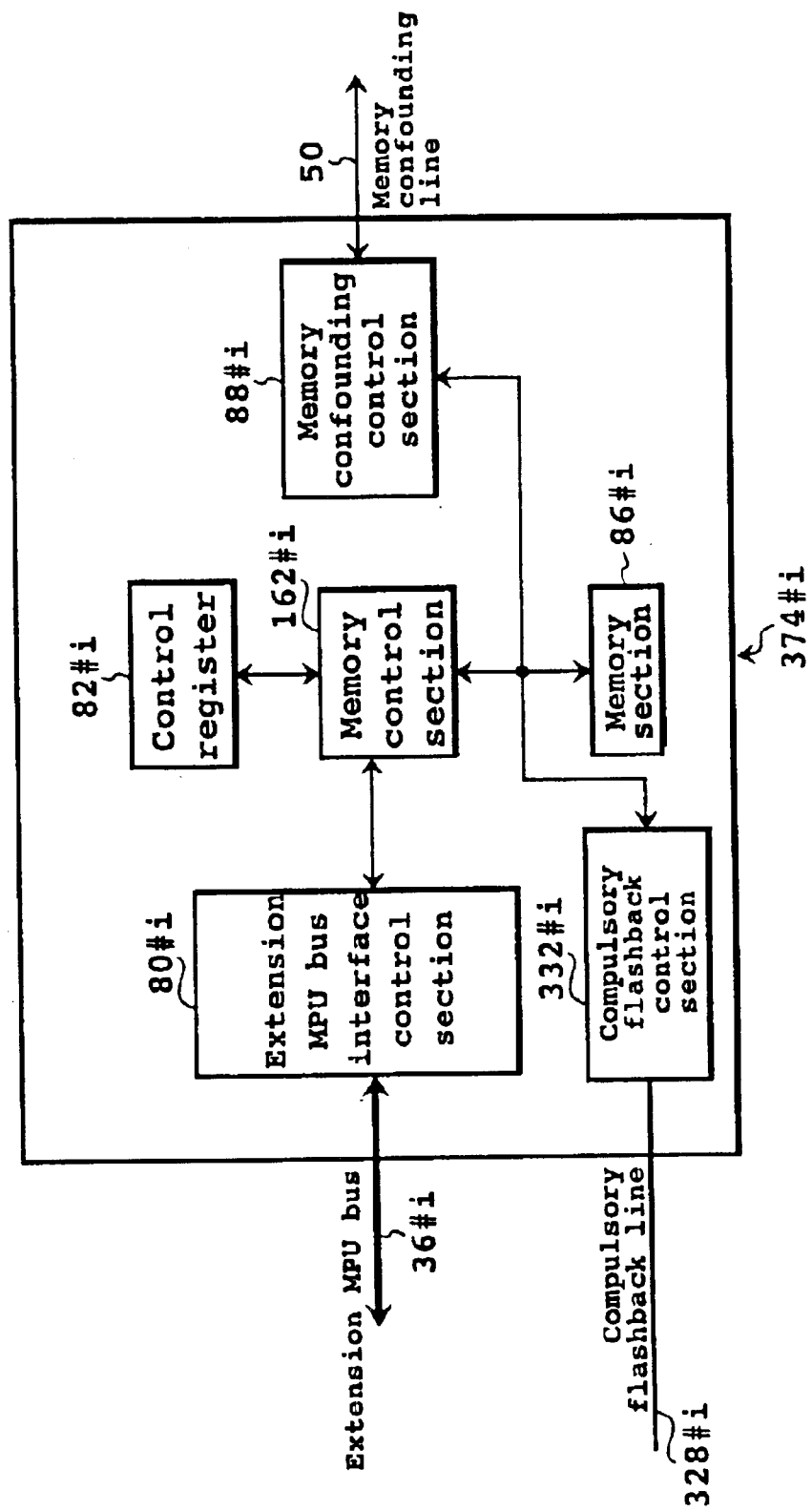
FIG. 55 is a block diagram of a main memory shown in FIG. 54.

FIG. 54 is a block diagram of a dual system according to a twenty-first embodiment of the present invention, and in FIG. 54, substantially like components to those in FIG. 20 or 45 are denoted by like reference characters. The present embodiment is a combination of the fifth embodiment of FIG. 20 and the seventeenth embodiment of FIG. 45. FIG. 55 is a block diagram of a main memory 374#i shown in FIG. 54, and in FIG. 55, substantially like components to those in FIG. 22 or 47 are denoted by like reference characters. The main memory 374#i of FIG. 55 is a combination of the main memory 154#i of FIG. 22 and the main memory 324#i of FIG. 47. In the following, operation of the system of FIG. 54 is described. It is assumed that a 0-subsystem 370#0 serves as the ACT system and a 1-subsystem 370#1 serves as the SBY system, and the watch dog timer 94#0 overflows.

(B1) A system control section 376#0 operates in a similar manner as in (B1) of the seventeenth embodiment.

(A2) When the interrupt notification line 42#0 is asserted, interruption occurs with the MPU section 22#0, and the MPU section 22#0 operates in a similar manner as in (A2) of the first embodiment.

(C) A cache memory control section 372#0 operates in a similar manner as in (C) of the seventeenth embodiment to perform flashback. After the flashback is completed, the cache memory control section 372#0 operates in a similar manner as in (C) of the fifth embodiment such that it outputs a flashback completion notification command to the extension MPU bus 36#0.

(D) The compulsory flashback control section 332#0 shown in FIG. 55 operates in a similar manner as in (D) of the seventeenth embodiment to write flashback data into the memory section 86#0. When the memory control section 162#0 receives the flashback completion notification command, it writes information representative of completion of flashback into the particular address area of the memory section 86#0 in a similar manner as in (D) of the fifth embodiment.

(B2) The system control section 376#0 operates in a similar manner as in (B2) of the fifth embodiment.

(B3) The system control section 376#1 of the SBY system operates in a similar manner as in (B3) of the first embodiment.

(A3) The MPU section 22#1 operates in a similar manner as in (A3) of the third embodiment. According to the twenty-first embodiment described above, similar effects to those of the first embodiment are achieved.

Twenty-Second Embodiment

Figure 56:
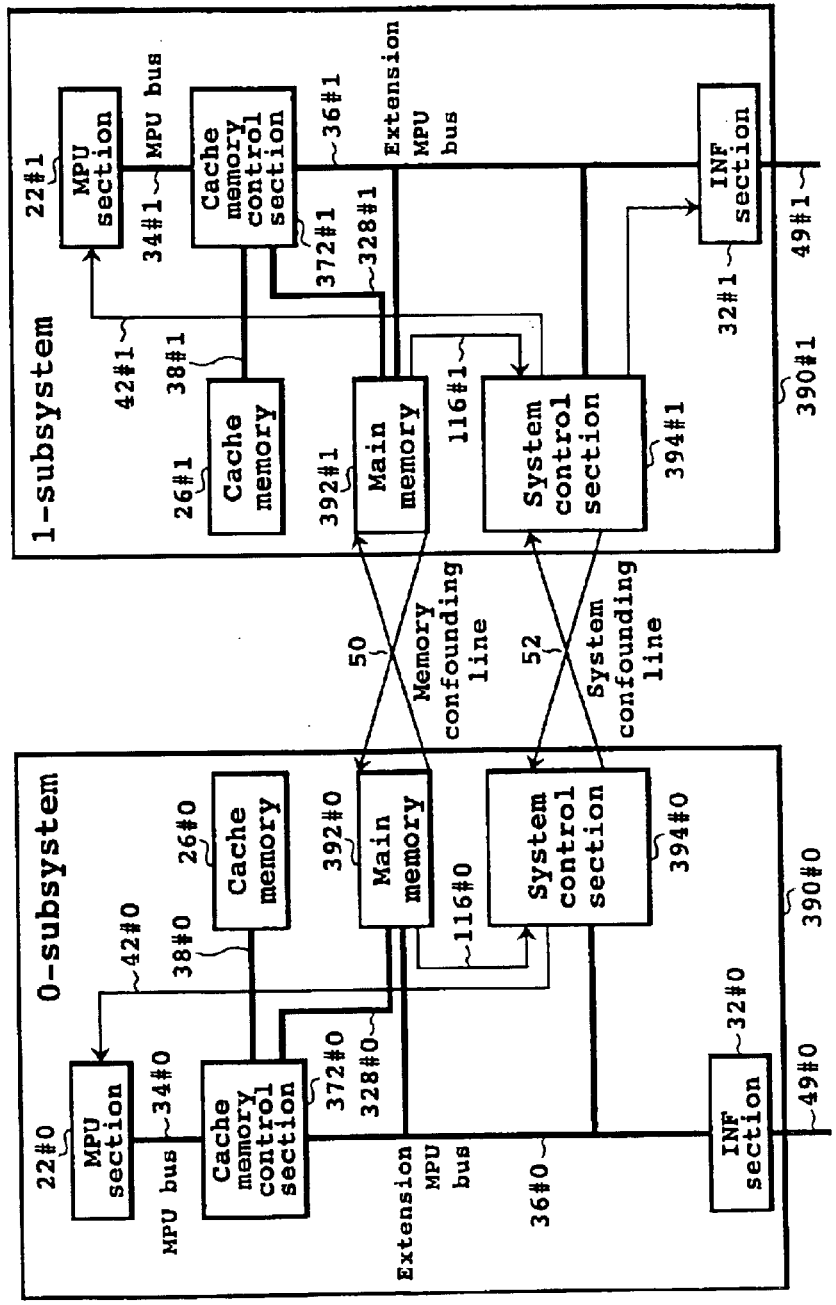
FIG. 56 is a block diagram of a dual system according to a twenty-second embodiment of the present invention.
Figure 57:
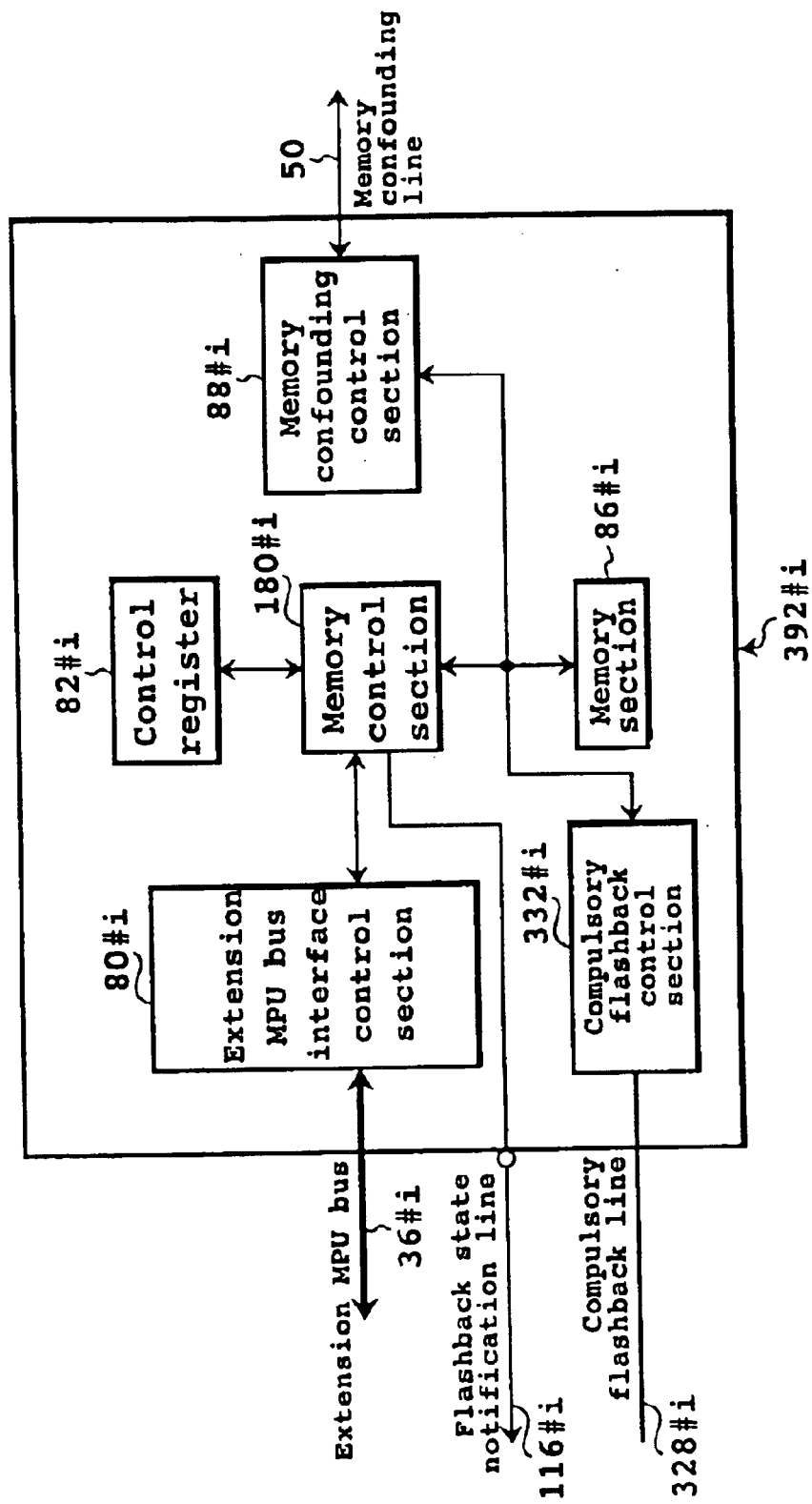
FIG. 57 is a block diagram of a main memory shown in FIG. 56.

FIG. 56 is a block diagram of a dual system according to a twenty-second embodiment of the present invention, and in FIG. 56, substantially like components to those in FIG. 27 or 45 are denoted by like reference characters. The present embodiment is a combination of the sixth embodiment of FIG. 27 and the seventeenth embodiment of FIG. 45. FIG. 57 is a block diagram of a main memory 392#i shown in FIG. 56, and in FIG. 57, substantially like components to those in FIG. 28 or 47 are denoted by like reference characters. The main memory 392#i of FIG. 57 is a combination of the main memory 172#i of FIG. 28 and the main memory 324#i of FIG. 47. In the following, operation of the system of FIG. 56 is described. It is assumed that a 0-subsystem 390#0 serves as the ACT system and a 1-subsystem 390#1 serves as the SBY system, the watch dog timer 94#0 overflows.

(B1) A system control section 394#0 operates in a similar manner as in (B1) of the seventeenth embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 372#0 operates in a similar manner as in (C) of the twenty-first embodiment.

(D) The compulsory flashback control section 332#0 shown in FIG. 57 operates in a similar manner as in (D) of the seventeenth embodiment to write flashback data into the memory section 86#0. When the memory control section 180#i receives a flashback completion notification command, it writes information representative of completion of flashback into the particular address area of the memory section 86#0 and asserts the flashback state notification line 116#0 in a similar manner as in (D) of the sixth embodiment.

(B2) The system control section 394#0 operates in a similar manner as in (B2) of the seventeenth embodiment.

(B3) The system control section 394#1 of the SBY system operates in a similar manner as in (B3) of the first embodiment.

(A3) The MPU section 22#1 operates in a similar manner as in (A3) of the first embodiment. According to the twenty-second embodiment described above, similar effects to those of the first embodiment are achieved.

Twenty-Third Embodiment

Figure 58:
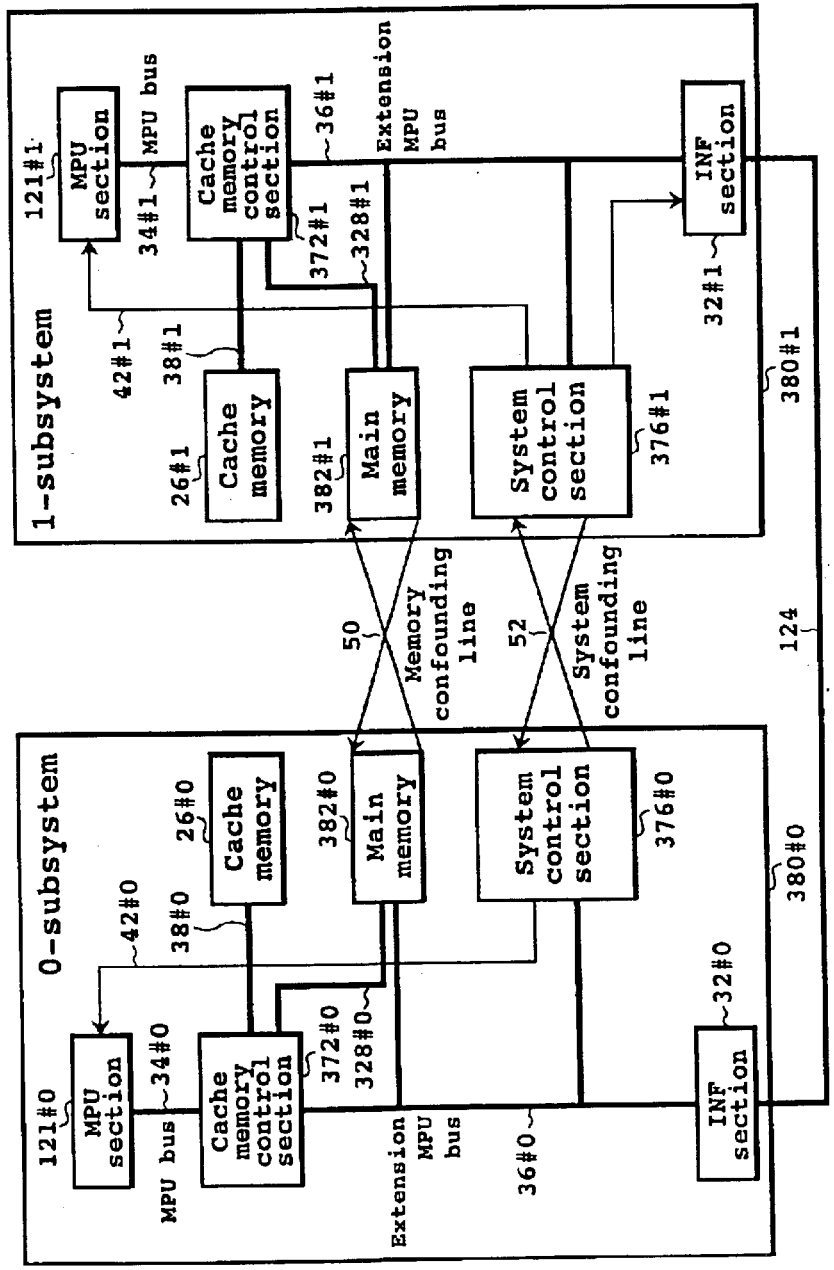
FIG. 58 is a block diagram of a dual system according to a twenty-third embodiment of the present invention.

FIG. 58 is a block diagram of a dual system according to a twenty-third embodiment of the present invention, and in FIG. 58, substantially like components to those in FIG. 30 or 45 are denoted by like reference characters. The present embodiment is a combination of the seventh embodiment of FIG. 30 and the seventeenth embodiment of FIG. 45. In the following, operation of the system of FIG. 58 is described. It is assumed that a 0-subsystem 380#0 serves as the ACT system and a 1-subsystem 380#1 serves as the SBY system, and the watch dog timer 94#0 overflows.

(B1) The system control section 376#0 operates in a similar manner as in (B1) of the seventeenth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 372#0 operates in a similar manner as in (C) of the twenty-first embodiment.

(D) A main memory 382#0 operates in a similar manner as in (D) of the seventeenth embodiment such that it writes flashback data into the memory section 86#0. When the main memory 382#0 receives a flashback completion notification command, it writes information representative of completion of flashback into the flashback state register 132#0 in a similar manner as in (D) of the seventh embodiment.

(B2) The system control section 376#0 operates in a similar manner as in (B2) of the fifth embodiment.

(B3) The system control section 376#1 of the SBY system operates in a similar manner as in (B3) of the first embodiment.

(A3) The MPU section 121#1 operates in a similar manner as in (A3) of the third embodiment. According to the twenty-third embodiment described above, similar effects to those of the first embodiment are achieved.

Twenty-Fourth Embodiment

Figure 59:
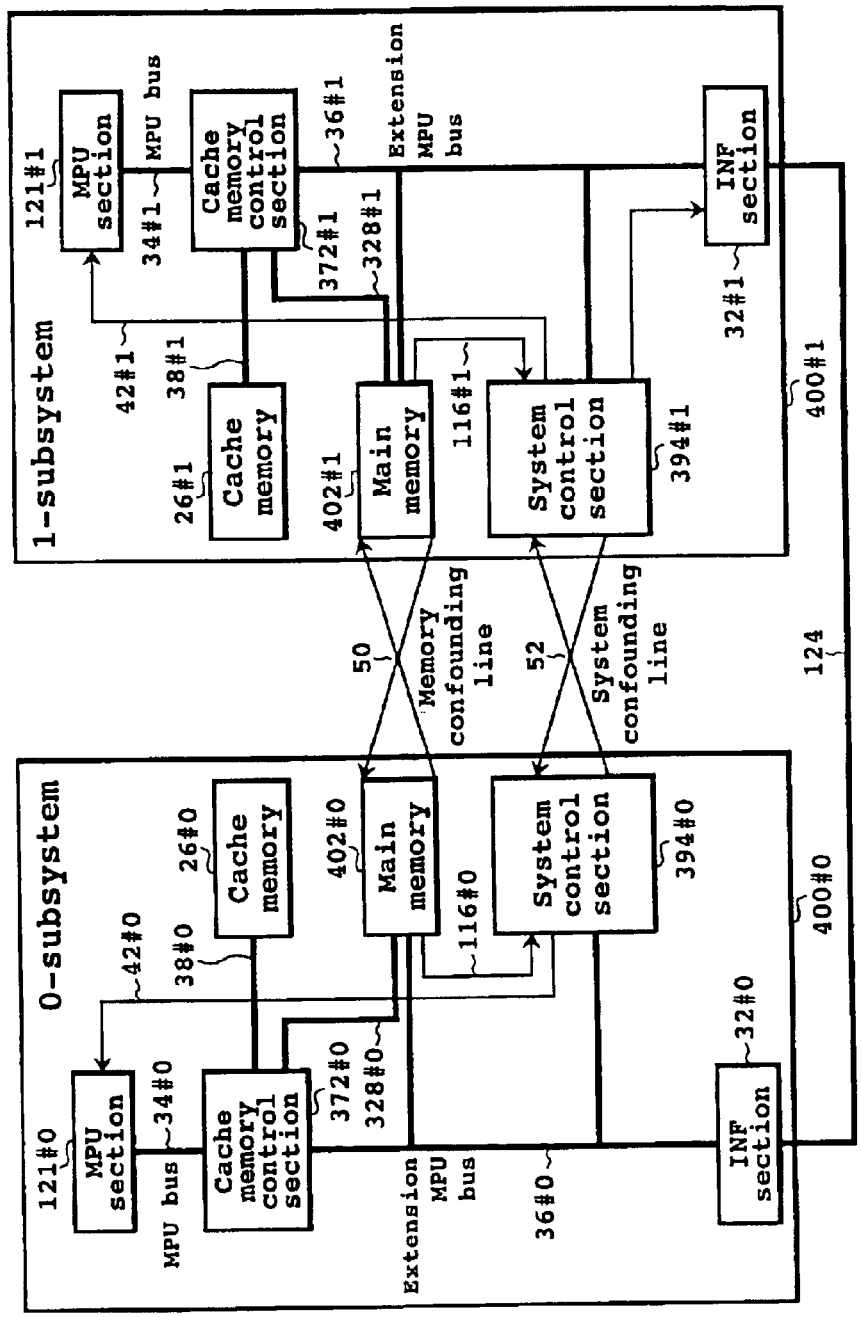
FIG. 59 is a block diagram of a dual system according to a twenty-fourth embodiment of the present invention.

FIG. 59 is a block diagram of a dual system according to a twenty-fourth embodiment of the present invention, and in FIG. 59, substantially like components to those in FIG. 32 or 45 are denoted by like reference characters. The present embodiment is a combination of the eighth embodiment of FIG. 32 and the seventeenth embodiment of FIG. 45. In the following, operation of the system of FIG. 59 is described. It is assumed that a 0-subsystem 400#0 serves as the ACT system and a 1-subsystem 400#1 serves as the SBY system, and the watch dog timer 94#0 overflows.

(B1) The system control section 394#0 operates in a similar manner as in (B1) of the seventeenth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 372#0 operates in a similar manner as in (C) of the twenty-first embodiment.

(D) A main memory 402#0 operates in a similar manner as in (D) of the seventeenth embodiment to write flashback data into the memory section 86#0. When the main memory 402#0 receives a flashback completion notification command, it writes information representative of completion of flashback into the flashback state register 132#0 and asserts the flashback state notification line 116#0 in a similar manner as in (D) of the eighth embodiment.

(B2) The system control section 394#0 operates in a similar manner as in (B2) of the seventeenth embodiment.

(B3) The system control section 394#1 of the SBY system operates in a similar manner as in (B3) of the first embodiment.

(A3) The MPU section 121#1 operates in a similar manner as in (A3) of the first embodiment. According to the twenty-fourth embodiment described above, similar effects to those of the first embodiment are achieved.

Twenty-Fifth Embodiment

Figure 60:
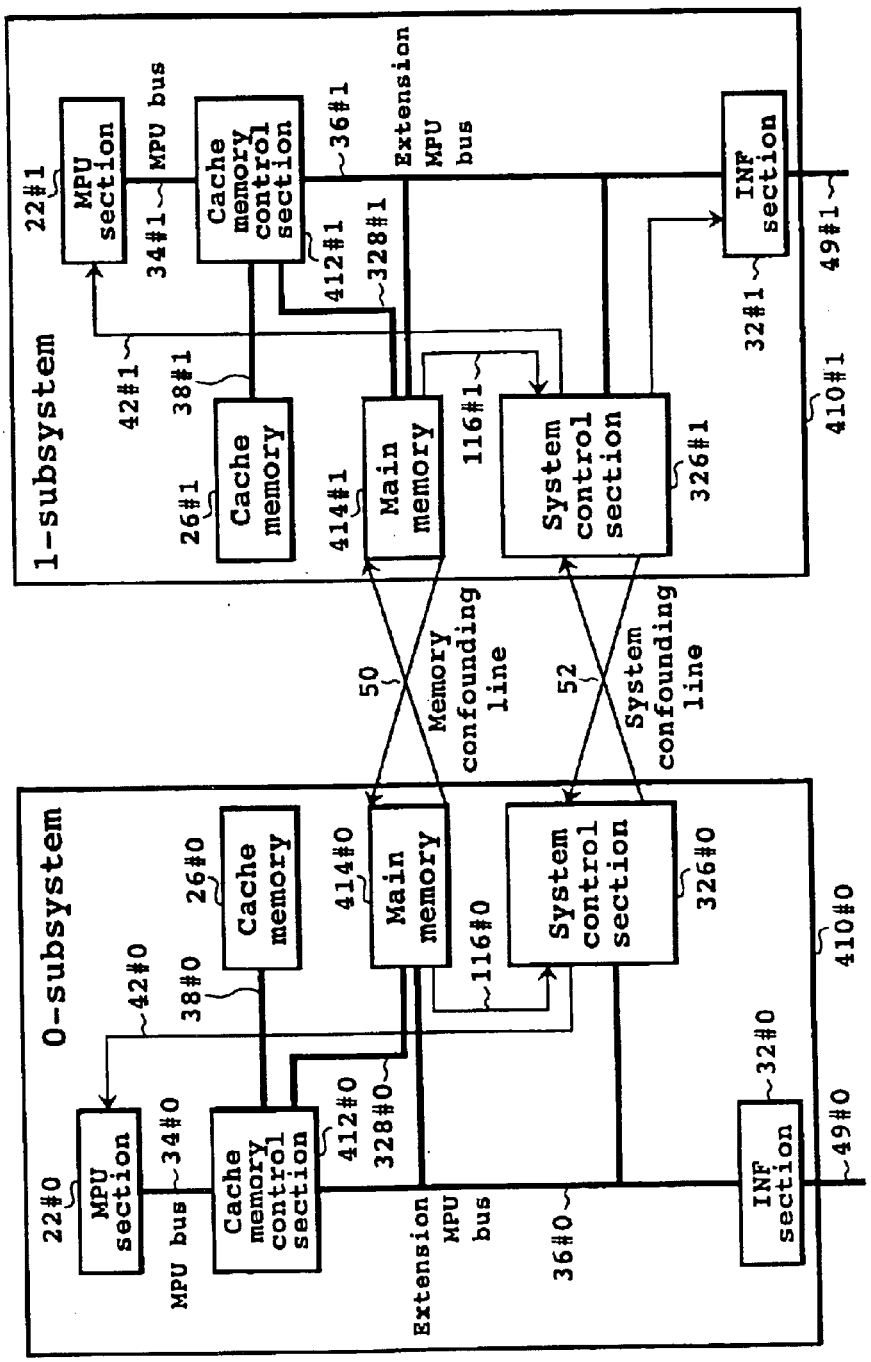
FIG. 60 is a block diagram of a dual system according to a twenty-fifth embodiment of the present invention.
Figure 61:
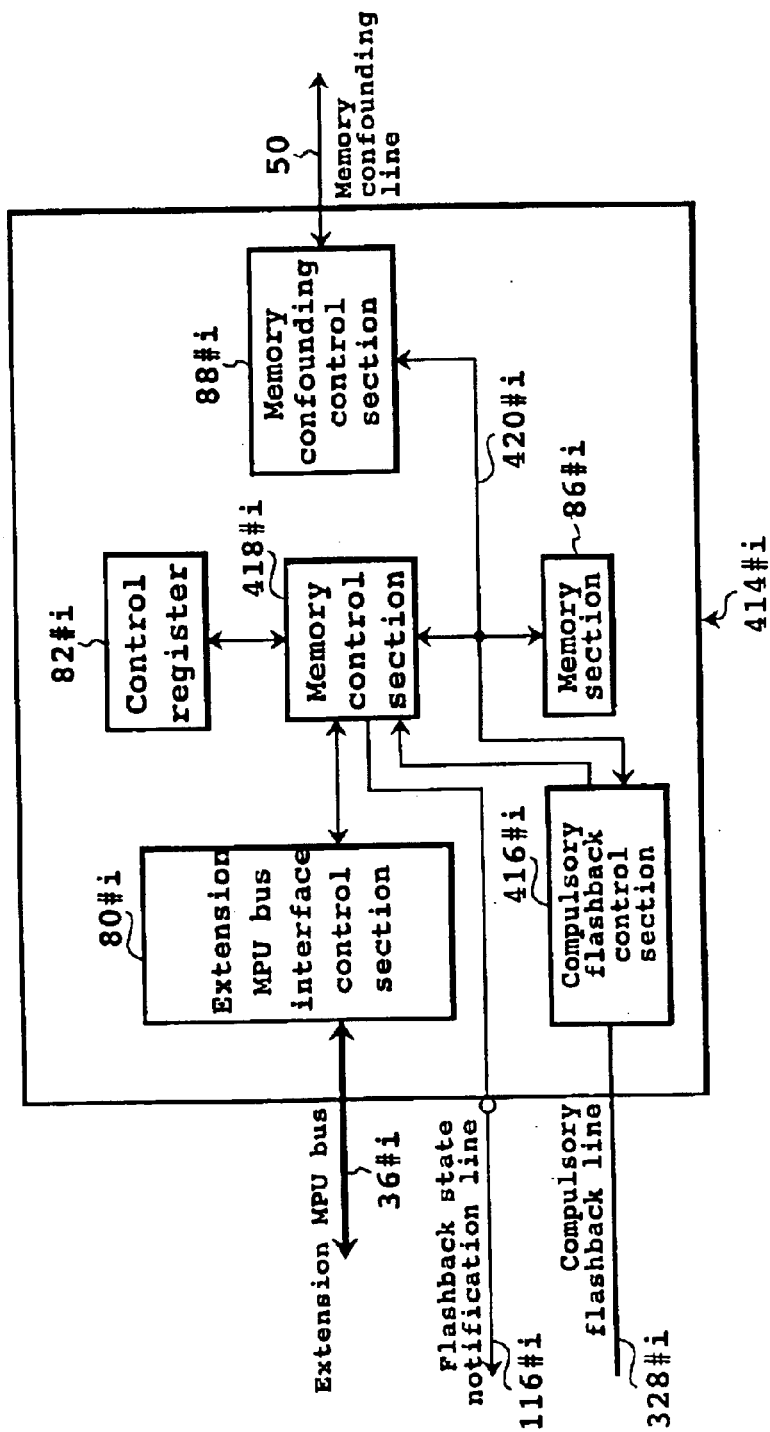
FIG. 61 is a block diagram of a main memory shown in FIG. 60.

FIG. 60 is a block diagram of a dual system according to a twenty-fifth embodiment of the present invention, and in FIG. 60, substantially like components to those in FIG. 32 or 45 are denoted by like reference characters. The present embodiment is a combination of the eighth embodiment of FIG. 32 and the seventeenth embodiment of FIG. 45. A cache memory control section 412#i is different from the cache memory control section 322#i shown in FIG. 46 in that, when flashback is completed, the cache memory control section 412#i outputs a flashback completion notification command to the compulsory flashback line 328#i. FIG. 61 is a block diagram of a main memory 414#i shown in FIG. 60, and in FIG. 61, substantially like components to those in FIG. 47 are denoted by like reference characters. A compulsory flashback control section 416#i is different from the compulsory flashback control section 332#i shown in FIG. 47 in that it notifies a memory control section 418#i of completion of flashback when it receives a flashback completion notification command from the compulsory flashback line 328#i.

The memory control section 418# is different from the memory control section 84#i shown in FIG. 47 in that, when it receives a flashback completion notification from the compulsory flashback control section 416#i, it writes information representative of completion of flashback into the particular address area of the memory section 86#i and asserts the flashback state notification line 116#i. In the following, operation of the system of FIG. 60 is described. It is assumed that a 0-subsystem 410#0 serves as the ACT system and a 1-subsystem 410#1 serves as the SBY system, and the watch dog timer 94#0 overflows.

(B1) The system control section 326#0 operates in a similar manner as in (B1) of the seventeenth embodiment.

(A2) When the interrupt notification line 42#0 is asserted, interruption occurs with the MPU section 22#0, and the MPU section 22#0 operates in a similar manner as in (A2) of the first embodiment.

(C) The cache memory control section 412#0 operates in a similar manner as in (C) of the seventeenth embodiment to perform flashback. After the flashback is completed, the cache memory control section 412#0 outputs a flashback completion notification command to the compulsory flashback line 328#0.

(D) The compulsory flashback control section 416#0 in the main memory 414#0 operates in a similar manner as in (D) of the seventeenth embodiment to write flashback data into the memory section 86#0. When the compulsory if flashback control section 416#i receives the flashback completion notification command from the compulsory flashback line 328#i, it notifies the memory control section 418#i of completion of flashback. The memory control section 418#0 writes information representative of completion of flashback into the particular address area of the memory section 86#0 and asserts the flashback state notification line 116#i when it receives the flashback completion notification from the compulsory flashback control section 416#i.

(B2) The system control section 326#0 operates in a similar manner as in (B2) of the seventeenth embodiment.

(B3) The system control section 326#1 of the SBY system operates in a similar manner as in (B3) of the first embodiment.

(A3) The MPU section 22#1 operates in a similar manner as in (A3) of the first embodiment. According to the twenty-fifth embodiment described above, similar effects to those of the first embodiment are achieved.

Twenty-Sixth Embodiment

Figure 62:
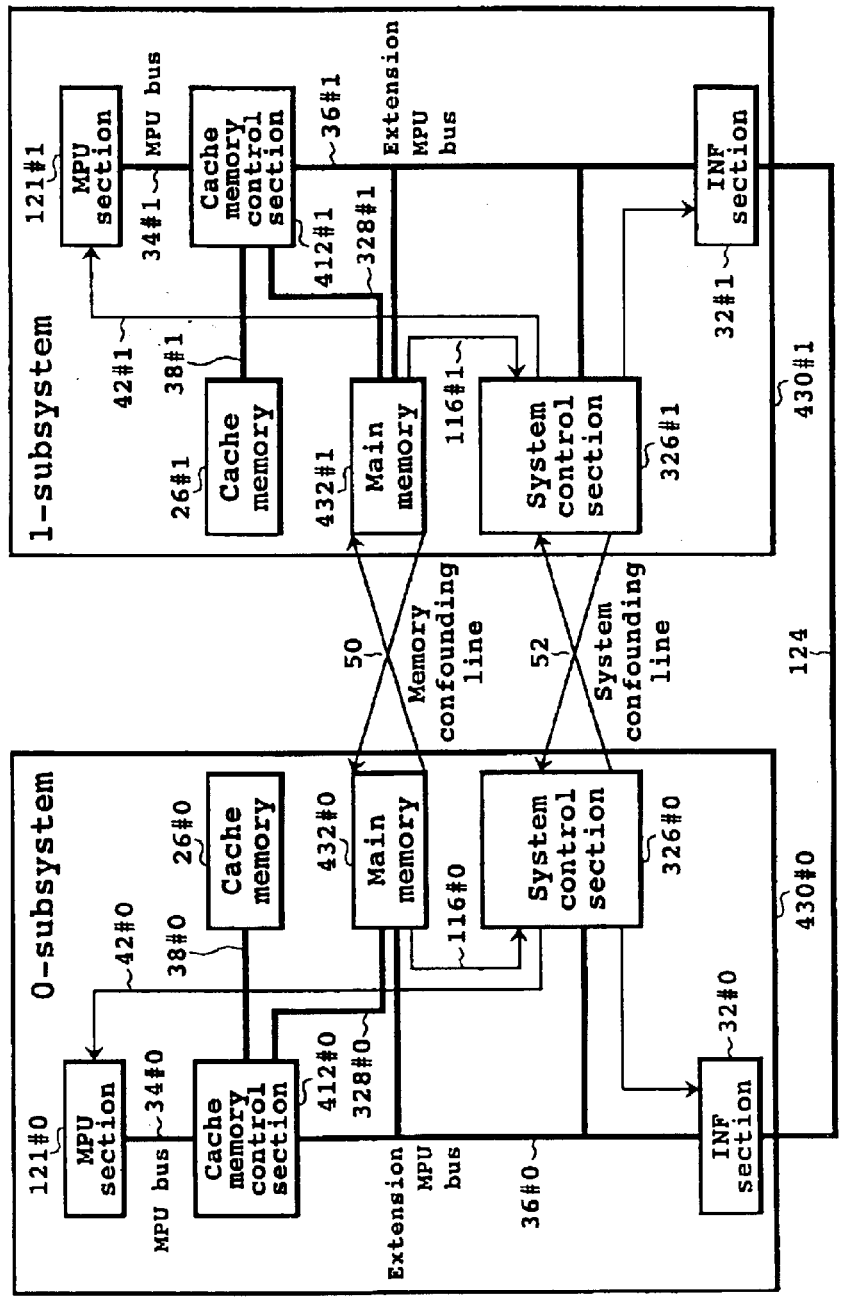
FIG. 62 is a block diagram of a dual system according to a twenty-sixth embodiment of the present invention.

FIG. 62 is a block diagram of a dual system according to a twenty-sixth embodiment of the present invention, and in FIG. 62, substantially like components to those in FIG. 60 are denoted by like reference characters. The present embodiment is a combination of the fourth embodiment of FIG. 17 and the twenty-fifth embodiment of FIG. 60. FIG. 63 is a block diagram of a main memory 432#i shown in FIG. 62, and in FIG. 63, substantially like components to those in FIG. 18 or 61 are denoted by like reference characters. The main memory 432#i is a combination of the main memory 142#i of FIG. 18 and the main memory 414#i of FIG. 61. In the following, operation of the system of FIG. 62 is described. It is assumed that a 0-subsystem 430#0 serves as the ACT system and a 1-subsystem 430#1 serves as the SBY system, and the watch dog timer 94#0.

(B1) The system control section 326#0 operates in a similar manner as in (B1) of the seventeenth embodiment.

(A2) When the interrupt notification line 42#0 is asserted, interruption occurs with the MPU section 121#0, and the MPU section 121#0 operates in a similar manner as in (A2) of the first embodiment.

(C) The cache memory control section 412#0 operates in a similar manner as in (C) of the twenty-fifth embodiment.

(D) The compulsory flashback control section 416#0 operates in a similar manner as in (D) of the twenty-fifth embodiment. When a memory control section 434#0 receives a flashback completion notification from the compulsory flashback control section 416#0 it writes information representative of completion of flashback into the flashback state register 132#0 and asserts the flashback state notification line 116#0.

(B2) The system control section 326#0 operates in a similar manner as in (B2) of the seventeenth embodiment.

(B3) The system control section 326#1 of the SBY system operates in a similar manner as in (B3) of the first embodiment.

(A3) The MPU section 121#1 operates in a similar manner as in (A3) of the third embodiment. According to the twenty-sixth embodiment described above, similar effects to those of the first embodiment are achieved. As described above, according to the present invention, since writing back into a main memory from a cache memory is preformed with a higher degree of certainty and taking over of complete information can be performed and services are continued after changeover between systems, augmentation in service can be anticipated.

The present invention is not limited to the details of the above described preferred embodiments. The scope of the invention is defined by the appended claims and all changes and modifications as fall within the equivalence of the scope of claims are therefore to be embraced by the invention.

What is claimed is:

1. A catch system, comprising:

a first bus;

a second bus;

a main memory having a memory section for storing data, said memory being operable to write data inputted from said first bus into said memory section and output data read from said memory section to said first bus;

a cache memory;

instruction means for outputting to said second bus a command for instruction to write back data of said cache memory into said memory; and a cache memory control section including a directory section for storing information regarding an address of said main memory of data stored in said cache memory and a reset terminal to which a first reset signal is inputted such that, when the first reset signal is asserted, at least an element of said cache memory control section which part in control of said first bus except said directory section is reset, said cache memory control section performing reading and writing of data between said main memory and said cache memory over said first bus, said cache memory control section performing write back processing of the data of said cache memory into said main memory in accordance with the command inputted over said second bus.

2. A cache system, comprising:

a first bus;

a second bus;

a third bus;

a main memory having a memory section for storing data, said main memory being operable to write data inputted from said first bus into said memory section and output data read from said memory section to said first bus;

a cache memory;

instruction on means for outputting to said second bus a command for instruction to write back data of said cache memory into said main memory;

a cache memory control section for performing reading and writing of data between said main memory and said cache memory over said first bus and performing write back processing of the data of said cache memory into said main memory in accordance with the command inputted over said second bus;

an interface section for interfacing between said first bus and said third bus; and an isolate section interposed between an output side of said interface section and said first bus for isolating said output side of said interface section and said first bus from each other when a control signal inputted to a control terminal becomes valid.

3. A cache system, comprising:

a first bus for outputting data and addresses;

a second bus;

a signal line different from said first bus for outputting data and address;

a main memory having a memory section for storing data connected with said first bus and directly connected with said signal line, said main memory being operable to write data inputted from said first bus into said memory section, output data read from said memory section to said first bus, and receive data and an address from said signal line and write the data and the address into said memory section;

a cache memory;

instruction means for outputting to said second bus a command for instruction to write back data of said cache memory into said main memory; and a cache memory control section connected with said first bus and directly connected with said signal line for performing reading and writing of data between said main memory and said cache memory over said first bus and outputting data and an address of said cache memory directly to said signal line in accordance with the command inputted over said second bus thereby to perform write back processing into said main memory.

4. A dual sys tem which comprises a first a system and a second system one of which is operated in an act state while the other is operated in a standby state, and a memory confounding line and a system confounding line for interconnecting said first system and said second system, each of said first system and said second system including:

a first bus;

a second bus;

a memory having a memory section for storing data, said main memory being operable to write data inputted from said first bus into said memory section, output data read from said memory section to said first bus, and receive data of the other system which is in the act state over said memory confounding line and write the data into said memory section;

a cache memory;

instruction means for outputting to said second bus a first command for instruction to write back data of said cache memory into main memory; and a cache memory control section including a directory section first storing information regarding an address of said main memory of data stored in said cache memory and a first reset terminal to which a first reset signal is inputted such that, when the first reset signal is asserted, at least an element of said cache memory control section which takes part in control of said first bus except said directory section is reset, said cache memory control section performing reading and writing of data between said main memory and said cache memory over said first bus, said cache memory control section performing write back processing of the data of said cache memory into said main memory in accordance with the first command inputted over said second bus.

5. A dual system according to claim 4, wherein each of said first system and said second system further includes a system control section for controlling state changeover between the act state and the standby state over said system confounding line, and said system control section controls so that the first command is outputted after the first reset signal is asserted upon state changeover from the act state to the standby state.

6. A dual system according to claim 5, wherein an element of said cache memory control section which takes part in control of said second bus is reset in response to the first reset signal.

7. A dual system according to claim 5, wherein said main memory includes a second reset terminal to which a second reset signal is inputted such that, when the second reset signal is asserted, at least an element of said main memory which takes part in control of said first bus is reset, and said cache memory control section controls such that the first command is outputted after the second reset signal is asserted upon state changeover from the act state to the standby state.

8. A dual system which comprises a first system and a second system one of which is operated in an act state while the other is operated in a standby state, and a memory confounding line and a system confounding line for interconnecting said first system and said second system, each of said first system and said second including:

a first bus;
a second bus;
a third bus;
a main memory having a memory section for storing data, said main memory being operable to write data inputted from said first bus into said memory section, output data read from said memory section to said first bus, and receive data of the other system which is in the act state over said memory confounding line and write the data into said memory section;
a cache memory,
instruction means for outputting to said second bus a first command for instruction to write back data of said cache memory into said main memory,
a cache memory control section for performing reading and writing of data between said main memory and said cache memory over said first bus and performing write back processing of the data of said cache memory into said main memory in accordance with the first command inputted over said second bus;
an interface section for interfacing between said first base and said third bus; and
a first isolate section interposed between an output side of said interface section and said first bus for isolating said output side of said interface section and said first bus from each other when a first control signal inputted to a first control terminal becomes valid.

9. A dual system according to claim 8, wherein each of said first system and said second system further includes a system control section for controlling state changeover between the act state and the standby state over said system confounding line, and said system control section controls so that the first command is outputted after the first control signal becomes valid upon state changeover from the act state to the standby state.

10. A dual system according to claim 9, wherein each of said first system and said second system further includes a second isolate section interposed between an output side of said system control section and said first bus for isolating said output side of said system control section and said first bus when a second control signal inputted to a second control terminal becomes valid, and said system control controls so that the first command is outputted after the first and second control signals become valid upon state changeover from the act state to the standby state.

11. A dual system which comprises a first system and a second system one of which is operated in an act state while the other is operated in a standby state, and a memory confounding line and a system confounding line for interconnecting said first system and said second system, each of said first system and said second system including:

a first bus;
a second bus;
a first signal line;
a main memory having a memory section for storing data said main memory being operable to write data inputted from said first bus in to said memory section, output data read from said memory section to said first bus, receive data and an address from said first signal line and write the data and the address into said memory section, and receive data of the other system which is in the act state from said memory confounding line and write the data into said memory section;
a cache memory;
instruction means for outputting to said second bus a first command for instruction to write back data of said cache memory into said main memory and a cache memory control section for performing reading and writing of data between said main memory and said cache memory over said first bus and outputting data and an address of said cache memory to said first signal line in accordance with the first command inputted over said second bus thereby to perform write back processing into said main memory.

12. A dual system according to claim 11, wherein each of said first system and said second system further includes a system control section for controlling state changeover between the act state and the standby state over said system confounding line, and said system control section controls so that the first command is outputted upon sate changeover from the act state to the standby state.

13. A dual system according to claim 12, wherein each of said first system and said second system further includes a second signal line for interconnecting said main memory and said system control section, said cache memory control section notifying completion of the write back processing using said first signal line when the write back processing is completed, said memory asserting said second signal line when the notification is received over said first signal line, said system control section which is in the system in the act state instructing the other system to change over the state from the standby state to the act state over said system confounding line when said second signal line is asserted.

14. A dual system according to claim 13, wherein, when the notification is received over said first signal line, said main memory writes information representative of completion of the write back processing into a particular address area of said memory section.

15. A dual system according to claim 13, wherein said main memory includes a register and writes, when the notification is received over said first signal line, information representative of completion of the write back processing into said register.

16. A dual system according to claim 5, wherein each of said first system and said second system further includes a first signal line for interconnecting said cache memory control section and said system control section, said cache memory control section which is in the system in the act state asserting said first signal line when the write back processing is completed, said system control section which is in the system in the act state instructing the other system to change over the state from the standby state to the act state over said system confounding line when said first signal line is asserted.

17. A dual system according to claim 16, wherein, when said first signal line is asserted, a main memory writes information representative of completion of the write back processing into a particular address area of said memory section.

18. A dual system according to claim 16, wherein said main memory includes a register and writes, when said first signal line is asserted, information representative of completion of the write back processing into said register.

19. A dual system according to claim 9, wherein said system control section includes a first timer for being periodically reset by said on means and outputting a first timeout signal when said first timer measures a first predetermined time and a second timer for measuring a second predetermined time which is not shorter than a time required until said cache memory control section ends the write back processing after the first timeout signal is outputted, and said system control section performs the interrupt notification based on the first timeout signal and instructs, when said first signal line is not asserted, the other system to change over the state from the standby state to the act state over said system confounding line based on the second timeout signal.

20. A dual system according to claim 14, wherein one of said first and second systems whose state has been changed over from the standby state to the act state reads the information from the particular address area and executes, when the information indicates completion of the write back processing, based on the data stored in said main memory, but loads when the information does not indicate completion of the write back processing, a program into said memory and then executes the program.

21. A dual system according to claim 15, wherein one of said first and second systems whose state has been changed over from the standby state to the act state reads the information from said register of the other system and executes, when the information indicates completion of the write back processing, based on the data stored in said main memory, but loads, when the information does not indicate completion of the write back processing a program into said memory and then executes the program.

22. A dual system according to claim 9, wherein each of said first system and said second system further includes a first signal line for interconnecting said cache memory control section and said main memory and a second signal line for interconnecting said main memory and said system control section, said cache memory control section which is in the system in the act state a asserting said first signal line when the write back processing is completed, said main memory which is in the system in the active state asserting said second signal line when said first signal line is asserted said system control section which is in the system in the act state instructing the other system to change over the state from the standby state to the act state over said system confounding line when said second signal line is asserted.

23. A dual system according to claim 12, wherein said cache memory control section which is in the system in the act state outputs, when the write back processing is completed, a second command representative of completion of the write back processing to said first bus, and said system control section which is in the system in the act state instructs the other system to change over the state from the standby state to the act state over said system confounding line based on the second command.

24. A dual system according to claim 5, wherein each of said first system and said second system further includes a first signal line for interconnecting said main memory and said system control section, said cache memory control section which is in the system in the act state outputting a second command representative of completion of the write back processing to said first bus when the write back processing is completed, said main memory which is in the system in the act state asserting said first signal line based on the second command, said system control section which is in the system in the act state instructing the other system to change over the state from the standby state to the act state over said system confounding line when said first signal line asserted.

25. A dual system according to claim 12, wherein each of said first system and said second system further includes a second signal line for interconnecting said main memory and said system control section, said cache memory control section which is in the system in the act state outputting a second command representative of completion of the write back processing to said first bus when the write back processing is completed, said main memory which is in the system in the act state asserting said second signal line based on the second command, said system control section which is in the system in the act state instructing the other system to change over the state from the standby state to the act state over said system confounding line when said second signal is asserted.

* * * * *